United States Patent
Goudy et al.

(10) Patent No.: US 9,620,014 B2
(45) Date of Patent: Apr. 11, 2017

(54) VEHICLE INTERSECTION MONITORING SYSTEM AND METHOD

(71) Applicant: Nissan North America, Inc., Franklin, TN (US)

(72) Inventors: Roy W. Goudy, Farmington Hills, MI (US); Neal Probert, Farmington Hills, MI (US); Andrew Christensen, Livonia, MI (US); Jeremy Chambers, Casco, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 13/689,484

(22) Filed: Nov. 29, 2012

(65) Prior Publication Data
US 2014/0148998 A1    May 29, 2014

(51) Int. Cl.
*G01S 13/93* (2006.01)
*B62D 5/04* (2006.01)
*G08G 1/16* (2006.01)
*B60Q 9/00* (2006.01)

(52) U.S. Cl.
CPC ............ *G08G 1/163* (2013.01); *B60Q 9/008* (2013.01)

(58) Field of Classification Search
CPC ........................... G01S 13/931; B62D 5/0463
USPC .................................................. 701/41, 301
See application file for complete search history.

(56) References Cited

U.S. PATENT DOCUMENTS

| 4,352,088 A | 9/1982 | Tsunoda |
| 4,644,327 A | 2/1987 | Patterson |
| 4,706,072 A | 11/1987 | Ikeyama |
| 5,788,336 A | 8/1998 | Trovato et al. |

(Continued)

FOREIGN PATENT DOCUMENTS

| EP | 1962255 A1 | 8/2008 |
| JP | S59-102634 A | 6/1984 |

(Continued)

OTHER PUBLICATIONS

Kurt, Arda et al., "Hybrid-state driver/vehicle modelling, estimation and prediction", 13th International IEEE Annual Conference on Intelligent Transportation Systems, Madeira Island, Portugal, Paper TA3.4, Sep. 19-22, 2010, pp. 806-811.

(Continued)

*Primary Examiner* — Yazan Soofi
(74) *Attorney, Agent, or Firm* — Global IP Counselors, LLP

(57) ABSTRACT

A vehicle intersection monitoring method includes exchanging host vehicle information and remote vehicle information between a host vehicle and a remote vehicle, identifying a road intersection based on at least one of the host vehicle information and the remote vehicle information, and selecting an intersection scenario from a plurality of intersection scenarios based on the host vehicle information and the remote vehicle information. The method further includes monitoring, by operation of a processor, a location relationship between the host vehicle and the remote vehicle according to an algorithm that is determined based on the selected intersection scenario, to determine whether a possibility of contact between the host vehicle and the remote vehicle exists proximate to the intersection, and performing a threat mitigation operation while the possibility of contact exists.

24 Claims, 39 Drawing Sheets

(56) References Cited

U.S. PATENT DOCUMENTS

| | | | |
|---|---|---|---|
| 5,845,250 | A | 12/1998 | Vogten |
| 5,939,976 | A | 8/1999 | Sasaki et al. |
| 5,940,010 | A * | 8/1999 | Sasaki et al. ............ 340/901 |
| 5,979,586 | A | 11/1999 | Farmer et al. |
| 6,008,741 | A | 12/1999 | Shinagawa et al. |
| 6,366,207 | B1 | 4/2002 | Murphy |
| 6,615,137 | B2 | 9/2003 | Lutter et al. |
| 6,700,504 | B1 * | 3/2004 | Aslandogan et al. ....... 340/901 |
| 6,720,898 | B1 * | 4/2004 | Ostrem ................. 341/144 |
| 6,791,471 | B2 | 9/2004 | Wehner et al. |
| 6,810,328 | B2 * | 10/2004 | Yokota et al. ............ 701/414 |
| 7,274,288 | B2 | 9/2007 | Nagata |
| 8,000,897 | B2 * | 8/2011 | Breed et al. ............. 701/301 |
| 8,175,796 | B1 | 5/2012 | Blackburn et al. |
| 8,340,894 | B2 | 12/2012 | Yester |
| 8,466,807 | B2 * | 6/2013 | Mudalige ................ 340/903 |
| 8,548,729 | B2 | 10/2013 | Mizuguchi |
| 8,577,550 | B2 | 11/2013 | Lu et al. |
| 8,587,418 | B2 | 11/2013 | Mochizuki et al. |
| 8,639,426 | B2 | 1/2014 | Dedes et al. |
| 8,717,192 | B2 | 5/2014 | Durekovic et al. |
| 2003/0060980 | A1 * | 3/2003 | Prakah-Asante ...... G08G 1/166 701/301 |
| 2003/0191586 | A1 * | 10/2003 | Miller .................. G08G 1/163 701/301 |
| 2004/0078133 | A1 * | 4/2004 | Miller ................ B60K 31/0008 701/301 |
| 2009/0033540 | A1 * | 2/2009 | Breed et al. ................ 342/29 |
| 2009/0140887 | A1 * | 6/2009 | Breed et al. ............... 340/990 |
| 2009/0198412 | A1 | 8/2009 | Shiraki |
| 2010/0169009 | A1 * | 7/2010 | Breed et al. ............... 701/208 |
| 2012/0016581 | A1 | 1/2012 | Mochizuki et al. |
| 2012/0218093 | A1 * | 8/2012 | Yoshizawa et al. ......... 340/435 |
| 2013/0116915 | A1 | 5/2013 | Ferreira et al. |
| 2013/0179047 | A1 | 7/2013 | Miller et al. |
| 2013/0278440 | A1 | 10/2013 | Rubin et al. |

FOREIGN PATENT DOCUMENTS

| | | |
|---|---|---|
| JP | S61-253238 A | 11/1986 |
| JP | 2000-127796 A | 5/2000 |
| JP | 2001-118199 A | 4/2001 |
| JP | 2003-51099 A | 2/2003 |
| WO | 03091966 A1 | 11/2003 |

OTHER PUBLICATIONS

Kurt, Arda (dissertation), "Hybrid-state system modelling for control, estimation and prediction in vehicular autonomy", presented in Partial Fulfillment of the Requirements for the Degree Doctor of Philosophy in the Graduate School of the Ohio State University, Mar. 2012, UMI/Proquest Pub. No. 3497707, 136 pages (total).

John Jacob Winters, An Investigation of Auditory Icons and Brake Response Times in a Commercial Truck-Cab Environment (Virginia Polytechnic Institute and State Univ. 1998).

Driver Focus-Telematics Working Group, Statement of Principles, Criteria and Verification Procedures on Driver Interactions with Advanced In-vehicle Information and Communication Systems (Version 2.0, 2002).

John L. Campbell et al., Comprehension Testing of Active Safety Symbols (SAE International 2004).

Pontus Larsson et al., Emotional and Behavioral Response to Auditory Icons and Earcons in Driver-vehicle Interfaces (Sweden, Paper No. 09-0104).

M.L. Cummings et al., Effects of Single versus Multiple Warnings on Driver Performance (Human Factors and Ergonomics Society 2011).

Michael A. Nees & Bruce N. Walker, Auditory Displays for In-vehicle Technologies (Human Factors and Ergonomics Society 2011).

Kathleen A. Harder, John Bloomfield, and Benjamin J. Chibak, The Effectiveness of Auditory Side- and Forward-Collision Avoidance Warnings in Winter Driving Conditions (Minnesota Department of Transportation, Report No. MN/RC 2003-14,2003).

* cited by examiner

SCENARIO 1

SCENARIO 9

SCENARIO 10

SCENARIO 26

VEHICLE INTERSECTION MONITORING SYSTEM AND METHOD

CROSS-REFERENCE TO RELATED APPLICATIONS

Related subject matter is disclosed in a U.S. patent application entitled "Vehicle Intersection Monitoring System and Method", in a U.S. patent application entitled "Vehicle Intersection Warning System and Method", and in a U.S. patent application entitled "Vehicle Intersection Monitoring System and Method", all of these applications being filed concurrently herewith and being incorporated by reference herein.

BACKGROUND

Field of the Invention

The present invention generally relates to a vehicle intersection monitoring system and method. More particularly, the present invention relates to a system and method which evaluates scenarios in which a host vehicle and a remote vehicle may come in contact at an intersection.

Background Information

In recent years, vehicles have become more equipped with features for improving safety. For example, vehicles can be equipped with a collision warning system that identifies the location of the vehicle and the locations of other nearby vehicles to determine whether the vehicle may come into contact with any of the other vehicles. The possibility of contact between vehicles can be particularly high at road intersections in which the travel paths of the vehicle and other nearby vehicles may intersect. If the possibility of contact exists, the system can issue a warning to the driver so that the driver can take the appropriate action Accordingly, a need exists for an improved vehicle collision warning system.

SUMMARY

In accordance with one aspect of the present invention, a vehicle intersection monitoring method is provided. The method comprises exchanging host vehicle information and remote vehicle information between a host vehicle and a remote vehicle, identifying a road intersection based on at least one of the host vehicle information and the remote vehicle information, and selecting an intersection scenario from a plurality of intersection scenarios based on the host vehicle information and the remote vehicle information. The method further comprises monitoring, by operation of a processor, a location relationship between the host vehicle and the remote vehicle according to an algorithm that is determined based on the selected intersection scenario, to determine whether a possibility of contact between the host vehicle and the remote vehicle exists proximate to the intersection, and performing a threat mitigation operation while the possibility of contact exists.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the disclosed embodiments are provided for illustration only and not for the purpose of limiting the invention as defined by the appended claims and their equivalents.

Figure 1:
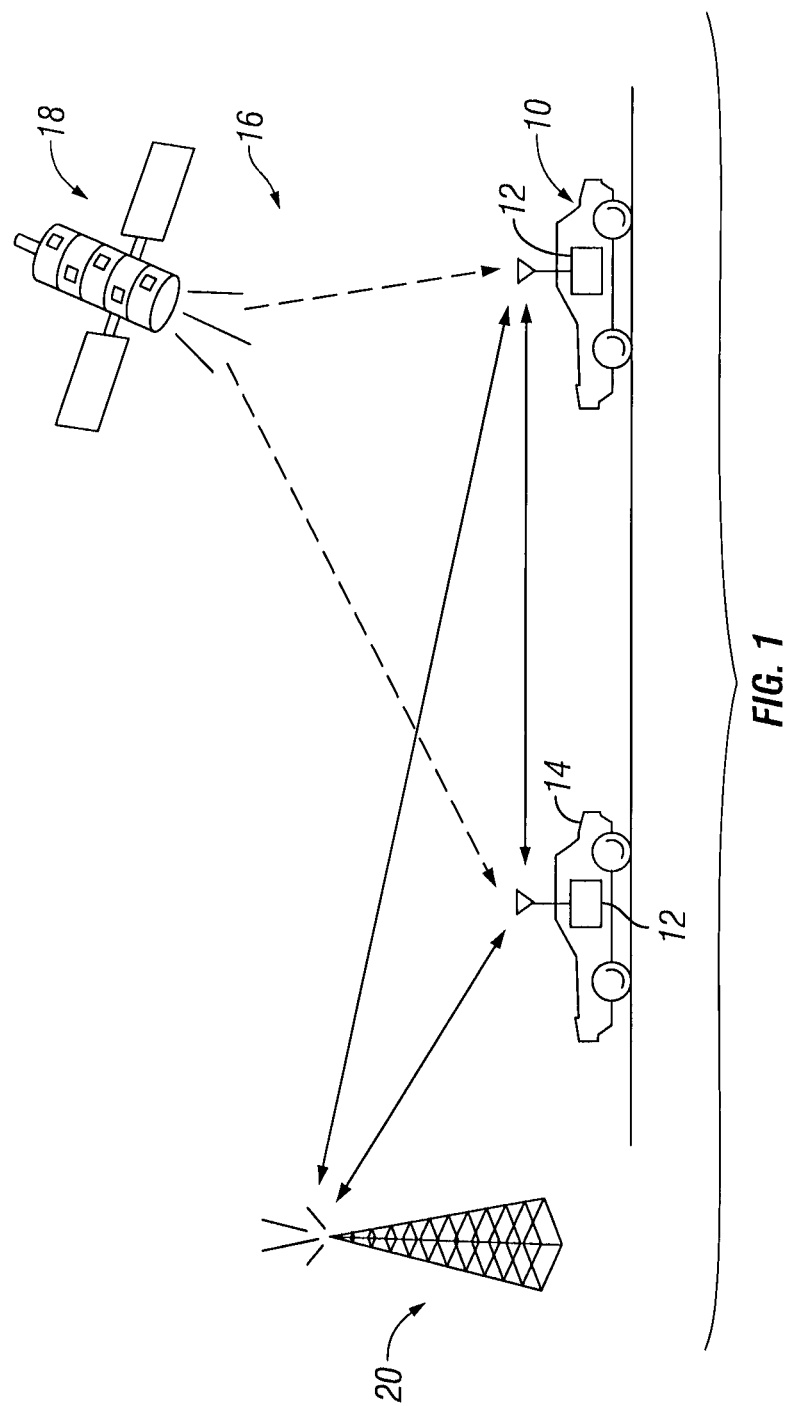
FIG. 1 is a block diagram illustrating an example of a host vehicle equipped with an intersection monitoring system according to embodiments disclosed herein in relation to a remote vehicle and components of a global positioning system (GPS)

FIG. 1 is a block diagram illustrating a host vehicle (HV) 10 that is equipped with a vehicle intersection monitoring system 12 according to a disclosed embodiment. The vehicle intersection monitoring system 12 communicates with at least one remote vehicle (RV) 14 that can also include a vehicle intersection monitoring system 12. Alternatively, the remote vehicle 14 can include another type of two-way communication system, such as an adaptive cruise control system, that is capable of communicating information about at least the location and speed of the remote vehicle 14 as understood in the art.

The vehicle intersection monitoring system 12 of the host vehicle 10 and the remote vehicle 14 communicates with a two-way wireless communications network 16. The two-way wireless communications network 16 can include one or more global positioning satellites 18 (only one shown) and one or more roadside units 20 (only one shown) that send and receive signals to and from the vehicle intersection monitoring system 12 of the host vehicle 10 and the remote vehicle 14.

Figure 2:
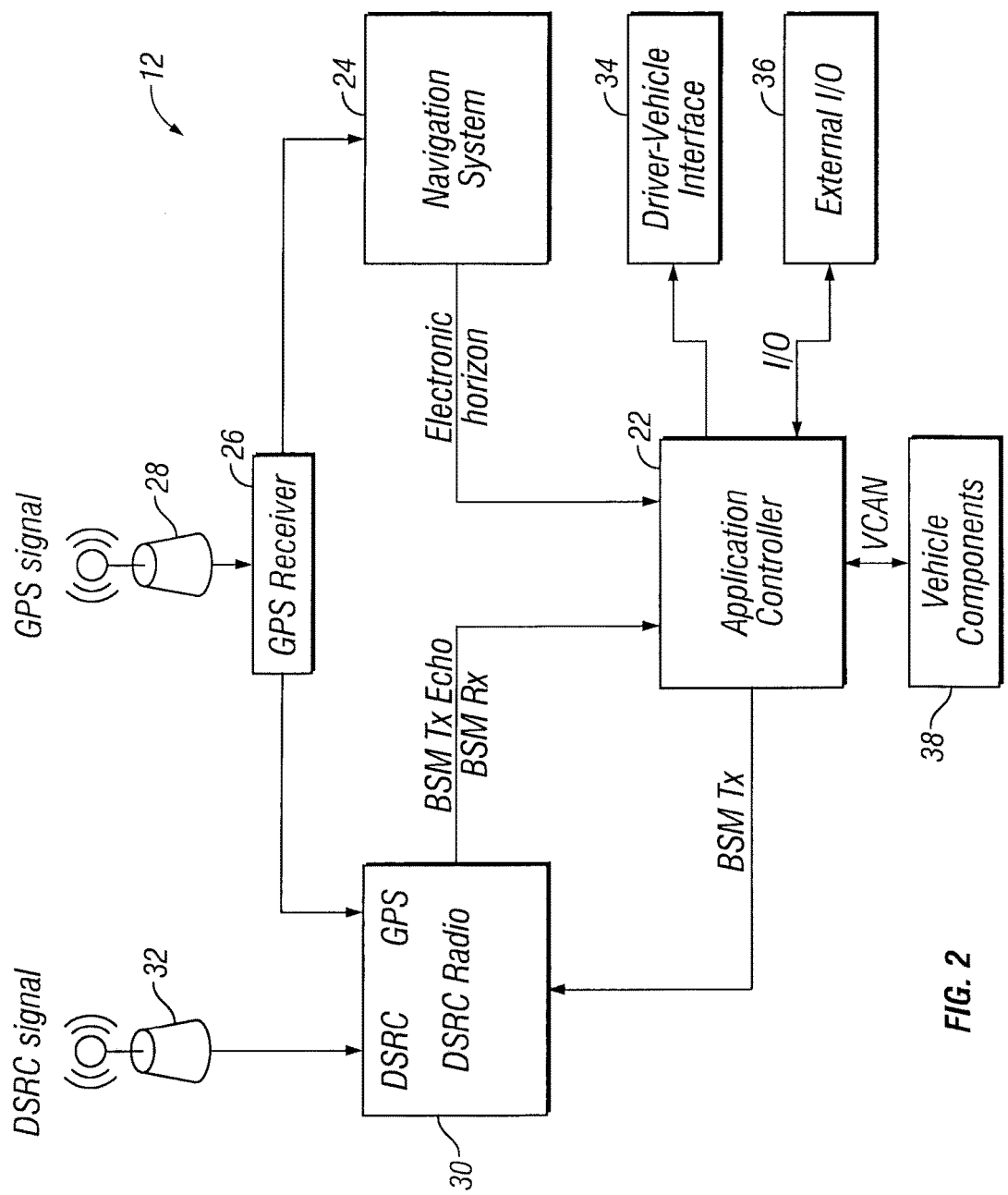
FIG. 2 is a block diagram of exemplary components of an intersection monitoring system according to disclosed embodiments.
Figure 3:
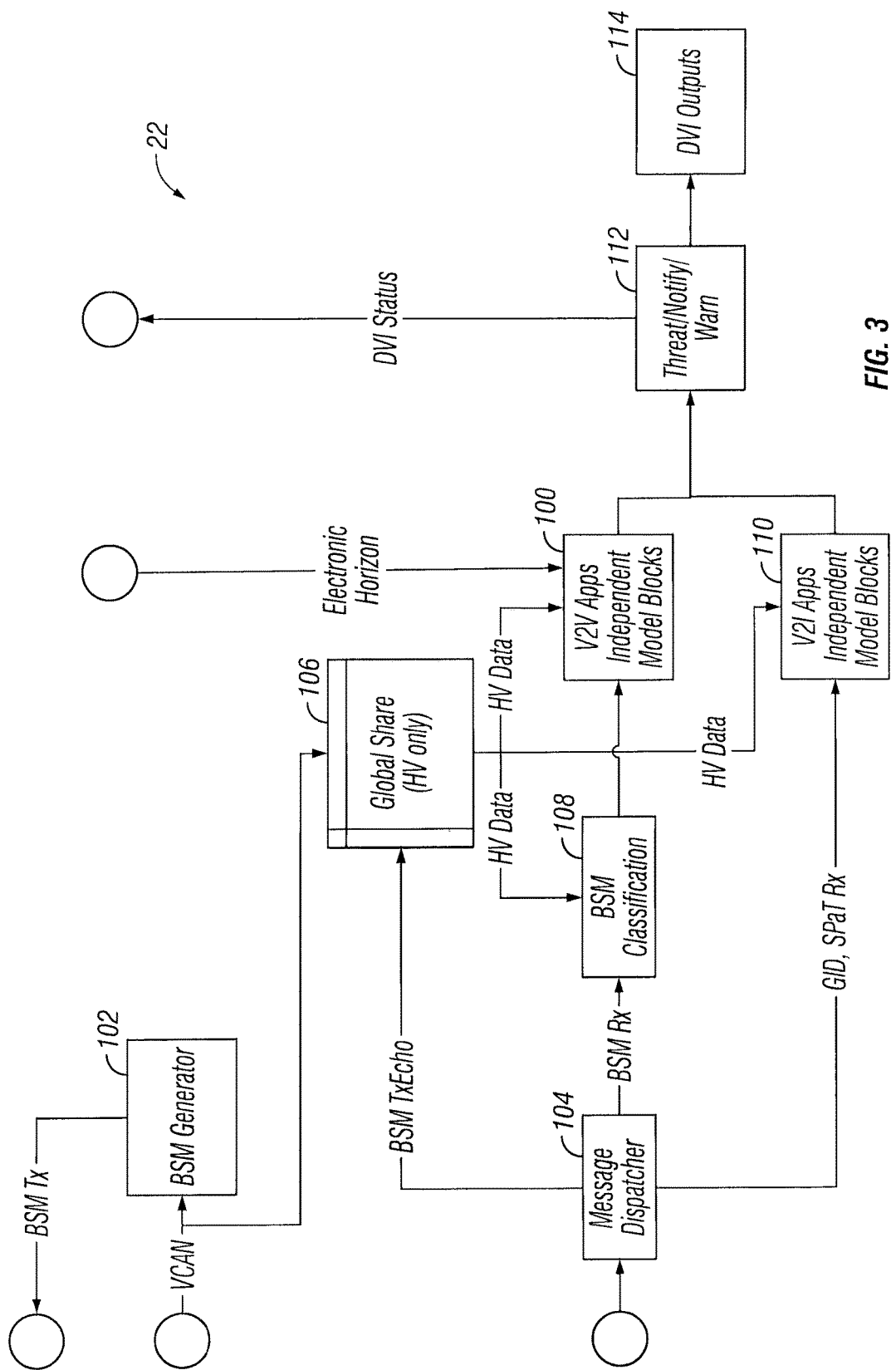
FIG. 3 is a block diagram of exemplary components included in the application controller of the intersection monitoring system as shown in FIG. 2.

As shown in more detail in FIGS. 2 and 3, the vehicle intersection monitoring system 12 includes an application controller 22 that can be referred to simply as a controller 22. The controller 22 preferably includes a microcomputer with a control program that controls the components of the vehicle intersection monitoring system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to control the vehicle intersection monitoring system 12 in accordance with the flow charts of FIGS. 31, 32 and 34 through 38 as discussed below. It will be apparent to those skilled in the art from this disclosure that the precise structure and algorithms for the controller 22 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 22 can communicate with the other components of the vehicle intersection monitoring system 12 discussed herein via, for example a controller area network (CAN) bus or in any other suitable manner as understood in the art.

As further shown in FIG. 2, the vehicle intersection monitoring system 12 includes a navigation system 24. In this example, the navigation system 24 includes a global positioning system (GPS) that receives signals from the two-way wireless communications network 16 via a GPS receiver 26 that is coupled to a GPS antenna 28. The GPS receiver 26 can be, for example, any Wide Area Augmentation System (WAAS) enabled National Marine Electronics Association (NMEA) output receiver as known in the art. However, the navigation system 24 can include any other suitable navigation system as understood in the art. The controller 22 can receive electronic horizon information including, for example, augmented digital map data, from the navigation system 24. As shown in FIG. 3, a vehicle-to-vehicle (V2V) application 100, for example, running on the controller 22 can receive and process the electronic horizon information and host vehicle data, such as information included in the CAN messages as shown in Table 1, as discussed in more detail below. The electronic horizon information will thus enable the controller 22 to detect intersections, in particular, upcoming intersections at which the host vehicle 10 will arrive, from the map data. For example, the electronic horizon information informs the application ECU of an approaching intersection ahead within 300 meters of the center of the intersection. The controller 22 can thus provide details on the intersection. Thus, the controller 22 performs an operation of identifying a road intersection relating to the host vehicle heading and the remote vehicle heading as discussed in more detail below. The identifying can include determining a location of the road intersection based on navigation map data as mentioned above. Moreover, as discussed herein, the determining of the presence of the road intersection includes determining whether the host vehicle 10 and the remote vehicle 14 are travelling on converging paths based on the host vehicle information, the remote vehicle information, or both.

The intersection monitoring system 12 further includes a communication device 30. In this example, the communication device 30 includes a dedicated short range communications (DSRC) device, which can also be referred to in the art as a wireless safety unit (WSU). However, the communication device 30 can be any suitable type of two-way communication device that is capable of communicating with the two-way wireless communications network 16. In this example, the communications device 30 is coupled to a DSRC antenna 32 to receive 5.9 GHz DSRC signals from the two-way wireless communications network 16. These DSRC signals can include basic safety messages (BSM) that include information which, under certain circumstances, warns drivers of potential crashes in time for the driver of the host vehicle 10 to take appropriate action to avoid the crash. In the disclosed embodiments, a BSM includes information in accordance with SAE Standard J2735 as can be appreciated by one skilled in the art. Also, the GPS antenna 28 and the DSRC antenna 32 can be configured as a dual frequency DSRC and GPS antenna as understood in the art.

As further illustrated, the communications device 30 receives GPS signals from the GPS antenna 20. The communication device 30 also receives BSM transmissions (BSM Tx) from the controller 22 to be transmitted via the DSCR antenna 32 for receipt by other vehicles, such as a remote vehicle 14, as discussed in more detail below. For example, at a certain timing (e.g., every 100 msec), a BSM generator 102 (see FIG. 3) running on the controller 22 can collect the data to assemble a packet to transmit a BSM Tx to the communication device 30 for transmission. The BSM generator 102 can collect this data in the form of CAN messages that are communicated over the CAN bus of the host vehicle 10 or in any other suitable manner. For instance, the CAN messages can be communicated from the components of the vehicle 10 over the CAN bus at a certain timing, such as every 20 msec. The BSM generator 102 can thus assembly the data packet and send the data packet to the communication device 30 via, for example, user data protocol (UDP) or in any other suitable manner. Table 1 below describes examples of CAN messages.

TABLE 1

Examples of CAN Message

| Signal Name | CAN Name | Resolution | Offset |
|---|---|---|---|
| Acceleration (G) | LONG_ACC | 0.001 | −2.048 |
| Acceleration (G) | TRANS_ACC | 0.001 | −2.048 |
| Yaw Rate (deg/s) | YAW_RATE | 0.1 | −204.8 |
| Vehicle Speed (km/h) | VSO | 0.01 | 0 |
| Low Beam | HL_LOW_REQ | — | — |
| High Beam | HL_HIGH_REQ | — | — |
| Turn Signal | TURN_IND | — | — |
| Brake Status | CABRESW | — | — |
| Front Wiper | FR_WIP_REQ | — | — |
| Throttle Pos (%) | APSI_A | 0.39216 | 0 |
| Steering Wheel Angle (deg) | STRANGLE | 0.1 | 0 |
| Transmission | CURGP | — | — |
| TCS Status | TCSACT | — | — |
| VDC Status | VDCACT | — | — |
| VDC On/Off | OFF_SW | — | — |
| ABS Status | ABSACT | — | — |

Accordingly, each BSM either transmitted by the host vehicle 10 or transmitted by a remote vehicle 14 can include the following information pertaining to the vehicle issuing the BSM: a temporary vehicle ID, vehicle latitude, vehicle longitude, vehicle elevation, position accuracy, vehicle speed, vehicle heading, vehicle steering wheel angle, vehicle acceleration (e.g., lateral, longitudinal, vertical and yaw rate), vehicle brake status and vehicle size, to name a few. Naturally, each BSM can include additional or fewer data as necessary or desired.

Table 2 below provides examples of certain vehicle data specifications relating to features of the host vehicle 10 and remote vehicle 14 on which data included in the BSMs is based.

TABLE 2

Exemplary Vehicle Data Specifications

| Data Element | Element Specifications |
| --- | --- |
| Transmission State | Ability to differentiate between neutral, park, forward and reverse |
| Vehicle Speed | 0.02 m/s resolution |
| Steering Wheel Angle | 1.5 degree resolution |
| Vehicle Lateral Acceleration | 0.01 m/s$\hat{}$2 resolution |
| Vehicle Longitudinal Acceleration | 0.01 m/s$\hat{}$2 resolution |
| Vehicle Yaw Rate | 0.01 deg/sec resolution |
| Brake Application Status | Ability to determine if brakes are applied |
| Vehicle Length | 0.01 m resolution |
| Vehicle Width | 0.1 m resolution |

Table 3 below provides examples of desired resolution of measurement data that is, for example, included in the BSMs.

TABLE 3

Exemplary Positioning Data Specifications

| Data Element | Element Specifications |
| --- | --- |
| Position Latitude | 0.1 µdegree resolution |
| Position Longitude | 0.1 µdegree resolution |
| Vehicle Heading | 0.0125 deg resolution |

As further illustrated, the communication device 30 provides an echo of the above BSM Tx (BSM Tx Echo) to the controller 22 via, for example, a UDP port, with GPS information included in the BSM Tx Echo message. In this example, a message dispatcher 104 running on the controller 22 sends the BSM Tx Echo message to a global share application 106 running on the controller 22.

In addition, the communication device 30 receives BSMs (BSM Rx) that were transmitted by remote vehicles 14 within a certain range of the host vehicle 10. The communication device 30 provides received BSMs to the controller 22 via, for example, a UDP port. The message dispatcher 104 in this example sends the BSM Rx to a BSM classification application 108 running on the controller 22. The BSM classification application 108 also receives host vehicle data, such as information included in the CAN messages as shown in Table 1. The BSM classification application 108 can extract information from BSMs that were received from remote vehicles 14 within a certain range of the host vehicle 10, such as within 300 meters of the host vehicle 10 or at any other suitable distance from the host vehicle 10.

Accordingly, by exchanging the BSMs, the host vehicle 10 and the remote vehicle 14 exchange host vehicle information and remote vehicle information between each other, with the host vehicle information including information pertaining to a host vehicle location, a host vehicle heading and a host vehicle intended next maneuver and the remote vehicle information including information pertaining to a remote vehicle location, a remote vehicle heading and a remote vehicle intended next maneuver. As discussed herein, the intended next maneuver of the remote vehicle 14 can be determined based on a condition of a turn signal on the remote vehicle 14. Similarly, the intended next maneuver of the host vehicle 10 can be determined based on a condition of a turn signal on the host vehicle 10. Alternatively, the intended next maneuver of the remote vehicle 14 can be determined based on a set navigation route for the remote vehicle 14 that can be set by, for example, the navigation system 24 on the remote vehicle 14. Also, the intended next maneuver of the host vehicle 10 can be determined based on a set navigation route for the host vehicle 10 that can be set by, for example, the navigation system 24 on the host vehicle 10. As discussed in more detail below, the intended next maneuver of the remote vehicle 14 can be determined as a straight movement of the remote vehicle 14 at the intersection, a left turn of the remote vehicle 14 at the intersection or a right turn of the remote vehicle 14 at the intersection. Similarly, the intended next maneuver of the host vehicle 10 can be determined as a straight movement of the host vehicle 10 at the intersection, a left turn of the host vehicle 10 at the intersection or a right turn of the host vehicle 10 at the intersection.

The BSM classification application 108 can also, for example, cache BSM messages received from one or more remote vehicles 14 in a cache table, which can also be referred to as a lookup table. The cache table in this example can include up to 16 entries. However, the cache table can be any suitable size. The cache table can include information representing the host vehicle intended next maneuver; the remote vehicle intended next maneuver; the host vehicle location, the remote vehicle location and any other suitable information included in the BSMs which can then be retrieved for use as discussed herein. Also, the controller 22 can receive and process BSMs from many remote vehicles 14 at the same time. For example, the controller 22 can receive and process BSMs from 100 remote vehicles 14, or any other suitable number of remote vehicles 14, at the same time. Upon receiving a BSM from a remote vehicle 14, the controller 22 can determine whether there is a possibility that remote vehicle 14 may contact thus host vehicle 10 and thus represents a potential threat vehicle (TV) to the host vehicle 10. If the remote vehicle 14 does not represent a threat, the controller 22 can, for example, discard the data included in the BSM. The controller 22 can also discard a BSM from the cached after a period of time, for example, 0.5 seconds or any suitable length of time.

As further shown in FIG. 3, the message dispatcher 104 can send geometric intersection description (GID) information and signal phase and timing (SPaT) information that is included, for example, in the GPS information received by the communication device 30 to a vehicle-to-interface (V2I) application 110 running on the controller 22. The V2I application 110 also receives host vehicle data, such as information included in the CAN messages as shown in Table 1.

As further shown in FIG. 2, the vehicle intersection monitoring system 12 includes a driver-vehicle interface (DVI) 34 and an external input/output (I/O) 36. As discussed in more detail below, if there are any remote vehicles 14 that the controller 22 identifies as potential threat vehicles requiring DVI action, the controller 22 can send threat information, such as a UDP broadcast packet, to the DVI 34 via the CAN bus for example. For example, as shown in FIG. 3, a threat/notify/warn application 112 running on the controller 22 receives information from the V2V application 100 and the V2I application 110. The V2V application 100 generates this information based on the BSM information received from the BSM classification application 108, the electronic horizon information, and the host vehicle data as discussed above. The V2I application 110 generates information based on the host vehicle data, GID information, and SPaT information as discussed above.

The threat information generated by the threat/notify/warn application 112 can list all of the identified remote vehicles 14 that are threat vehicles and include BSM information from the remote vehicles 14 that are threat vehicles and the types of alerts and warnings attributed to those remote vehicles 14. As shown in FIG. 3, threat/notify/warn application 112 can issue DVI status information, and can further issue DVI outputs via, for example, a DVI output application 114 running on the controller 22. The DVI 34 can provide an alert and warning information to the driver based on the threat information as discussed in more detail below. The alert can be a visual alert, and audible alert, a tactile alert, or any combination of these types of alerts. The warnings should convey high urgency causing the driver to immediately pause before making the decision to proceed through an intersection. In addition, the warnings should be noticeable to the driver regardless of their head position and distraction level. Thus, the warnings should be distinguishable from ambient noise and so on.

For example, an auditory signal can be emitted as a warning from a speaker mounted in front of the driver on the instrument panel. The warning can be about 1 second in length and can include a car horn icon immediately followed by a "warning" spearcon which is created by speeding up a spoken phrase in particular ways. The sound level of the auditory warning is set at a level that is noticeable against ambient road noise and radio. The visual warning is presented using the DVI display described above on, for example, the instrument panel near the drivers forward eye gaze position and includes multiple visual icons corresponding to the different warning scenarios. The auditory warning conveys high urgency and can be the primary warning causing the driver to immediately pause. In addition to the auditory warning, the visual display is also intended to get the driver's attention and communicates the nature of the warning to the driver once the potential threat has passed. Also, for people with hearing impairment, the DVI display is can serve as the primary source of warning due its location and the large size of the display.

The controller 22 can also send messages to actuate other advance driver assistance system (ADAS) applications. The controller 22 can also exchange data with an external device via the I/O 36.

In addition, as discussed in more detail below, the controller 22 can issue commands via the CAN bus, for example, to other vehicle components 38 when the controller 22 determines that one or more of the remote vehicles 14 is a potential threat vehicle. For instance, the controller 22 may issue brake commands over the CAN bus to maintain the host vehicle 10 in a stopped state even when the driver releases the brake in the presence of an approaching remote vehicle 14 as discussed in more detail below. The controller 22 may also issue steering commands to change a steering direction of the host vehicle 10 in the presence of an approaching remote vehicle 14 as discussed in more detail below. Thus, the controller 22 performs a threat mitigation operation by altering a trajectory of the host vehicle 10. The altering of the trajectory of the host vehicle 10 can be performed by operating a steering wheel to change a steering direction of the host vehicle 10, operating a brake, accelerator or both to change the speed of the host vehicle, or in any other suitable manner. The other vehicle components 38 can also include one or more safety devices such as a safety belt, an airbag system, and a horn. Thus, the controller 22 can perform a threat mitigation operation by pretensioning a safety belt, deploying an airbag, operating a horn in the host vehicle, or any of these functions.

Examples of operations performed by the intersection monitoring system 12 to determine whether a warning should be provided in view of different scenarios in which the host vehicle 10 and remote vehicle 14 are approaching or at an intersection. FIGS. 4 through 30 are exemplary diagrams illustrating different intersection scenarios that are handled by the intersection monitoring system 12 according to disclosed embodiments. That is, based on the travelling conditions of the host vehicle 10 and remote vehicle 14 (straight, left turn or right turn), there are 27 total intersection scenarios. Out of those 27 scenarios, there are a total of 14 scenarios can result in the host vehicle 10 and remote vehicle 14 coming in contact with each other. The intersection monitoring system 12 can thus issue a warning to the host vehicle 10 during any of these 14 scenarios depending on the operating condition of the host vehicle 10 and the remote vehicle 14 as discussed in more detail below. In this example, the intersection monitoring system 12 determines whether the host vehicle 10 and remote vehicle 14 are travelling straight, turning left or turning right based on the condition of the turn signals of the host vehicle 10 and the remote vehicle 14. The turn signal conditions of the host vehicle 10 and the remote vehicle 14 can be contained in the information included in the BSMs transmitted by the host vehicle 10 and remote vehicle 14 as discussed above.

In this example, the controller 22 can refer to a truth table as shown in Table 4 to determine which of the 27 scenarios exists. The controller 22 can thus determine from the truth table whether the remote vehicle (RV) 14 is a threat vehicle (TV) that may come in contact with the host vehicle 10.

TABLE 4

Threat Use Case Truth Table

|  |  | AB | | | |
| --- | --- | --- | --- | --- | --- |
|  |  | 00 | 01 | 11 | 10 |
| CDEF | 0000 | 0 | 1 | 0 | X |
|  | 0001 | 1 | 1 | 1 | X |
|  | 0011 | 1 | 1 | 0 | X |
|  | 0010 | X | X | X | X |
|  | 0110 | X | X | X | X |
|  | 0100 | 1 | 0 | 1 | X |
|  | 0101 | 1 | 1 | 0 | X |
|  | 0111 | 1 | 1 | 0 | X |
|  | 1111 | 1 | 0 | 0 | X |
|  | 1110 | X | X | X | X |
|  | 1100 | 0 | 1 | 0 | X |
|  | 1101 | 0 | 0 | 0 | X |
|  | 1001 | X | X | X | X |
|  | 1011 | X | X | X | X |
|  | 1010 | X | X | X | X |
|  | 1000 | X | X | X | X |

According to the truth table, the travel condition of the host vehicle 10 is represented by the two digit binary code AB. That is, code AB=00 indicates that the host vehicle 10 intends to travel straight through the intersection, code AB=01 indicates that the host vehicle 10 intends to turn left at the intersection, and code AB=10 indicates that the host vehicle 10 intends to turn right at the intersection. The code AB=11 is not used. Furthermore, the travel condition of the remote vehicle 14 is represented by the four digit binary code CDEF.

Examples of the relationships between the host vehicle 10 and the remote vehicle 14 based on their respective intentions at the intersection are shown in FIGS. 4 through 30 and represented in Tables 5 through 7 below. In Table 5, the host vehicle 10 intends to travel straight through the intersection, and the different intentions of the remote vehicle 14 are represented by the different codes CDEF as explained in Table 5. Thus, each of the six digit binary codes ABCDEF is a combination of the two digit code AB and the four digit code CDEF as indicated. The controller 22 therefore determines whether a threat of contact between the host vehicle 10 and remote vehicle 14 exists for each scenario, as represented by a binary 0 for no threat and a binary 1 for a possible threat.

TABLE 5

Host Vehicle Travelling Straight

| Host Vehicle | Code AB | Remote Vehicle | Code CDEF | Full Code ABCDEF | Threat |
|---|---|---|---|---|---|
| Straight | 00 | Straight/Opposite | 0000 | 000000 | 0 |
| Straight | 00 | Straight/Left | 0001 | 000001 | 1 |
| Straight | 00 | Straight/Right | 0011 | 000011 | 1 |
| Straight | 00 | Left turn/Opposite | 0100 | 000100 | 1 |
| Straight | 00 | Left turn/Left | 0101 | 000101 | 1 |
| Straight | 00 | Left turn/Right | 0111 | 000111 | 1 |
| Straight | 00 | Right turn/Opposite | 1100 | 001100 | 0 |
| Straight | 00 | Right turn/Left | 1101 | 001101 | 0 |
| Straight | 00 | Right turn/Right | 1111 | 001111 | 1 |

Figure 4:
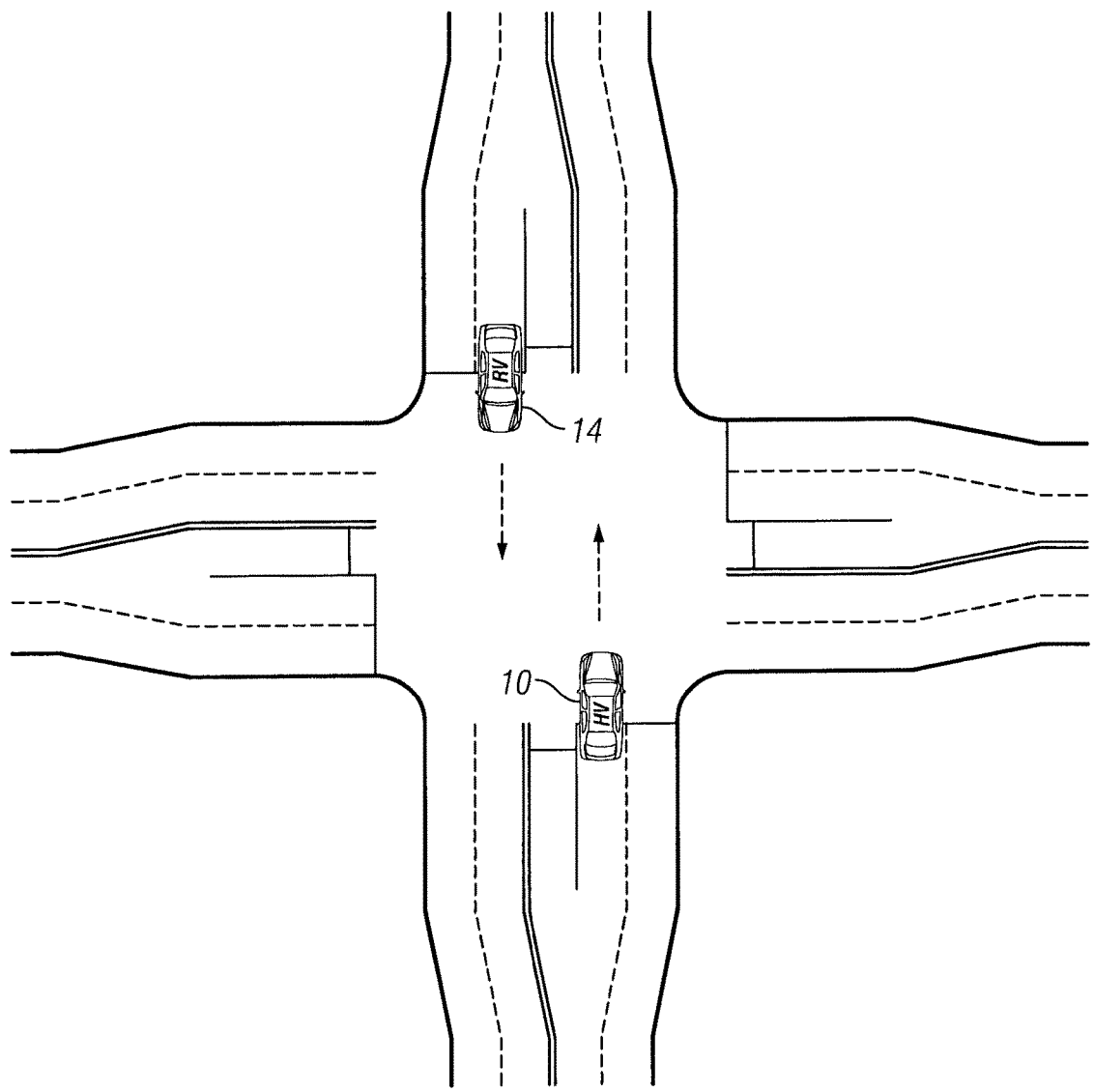
FIGS. 4 through 30 are exemplary diagrams illustrating different intersection scenarios that are handled by the intersection monitoring system according to disclosed embodiments.

These nine different scenarios are shown graphically in FIGS. 4 through 12. For purposes of these examples, the remote vehicle (RV) 14 is referred to as a threat vehicle (TV) whenever a threat of contact between the host vehicle 10 and remote vehicle 14 exists (i.e. when the threat condition is indicated as 1). That is, FIG. 4 illustrates Scenario 1 where the host vehicle 10 and remote vehicle 14 are each intending to travel straight through the intersection parallel to each other in opposite directions. Therefore, no threat of contact exists between the host vehicle 10 and the remote vehicle 14, and the threat condition is indicated as 0 in Table 5.

Figure 5:
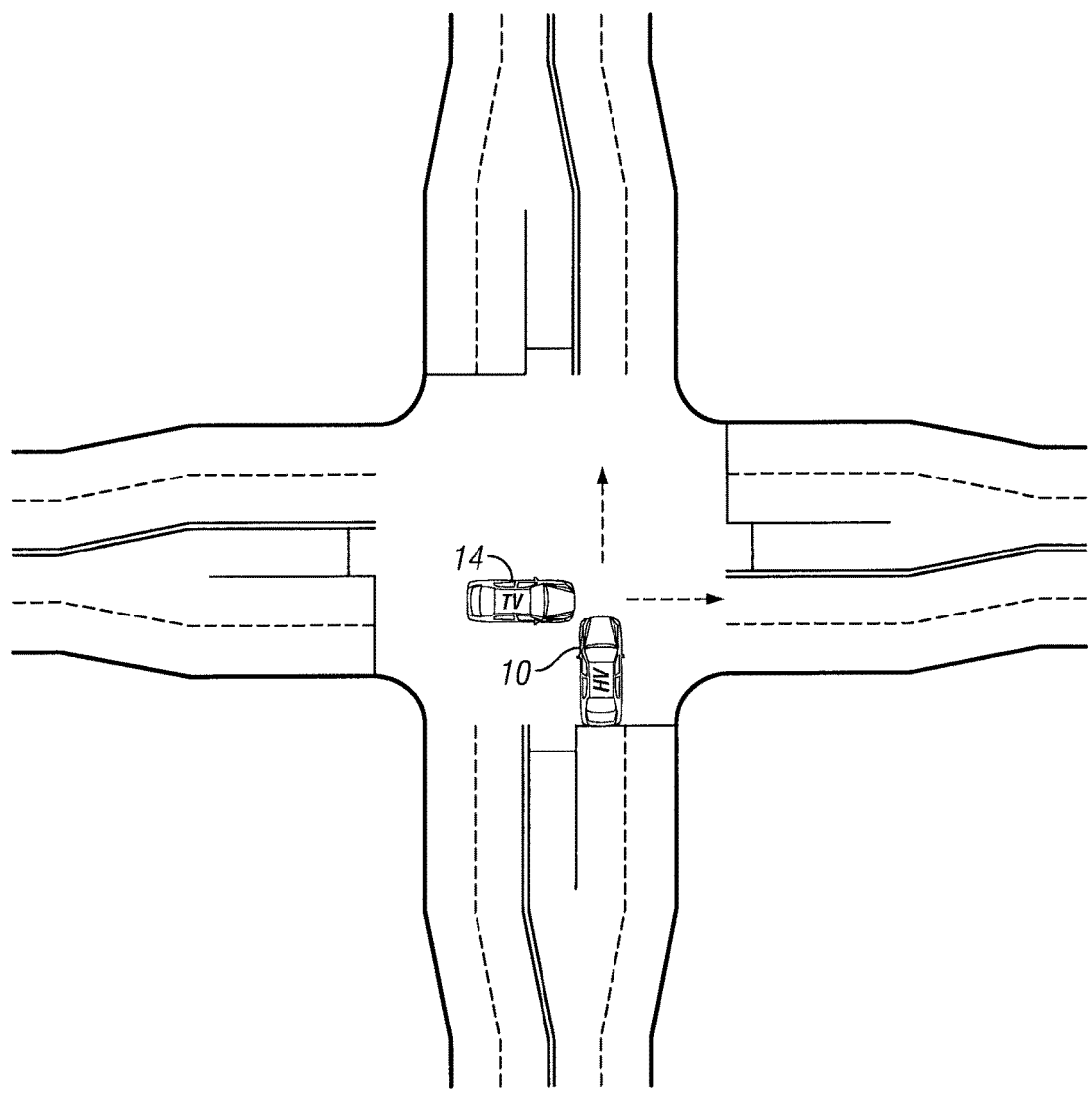
Figure 6:
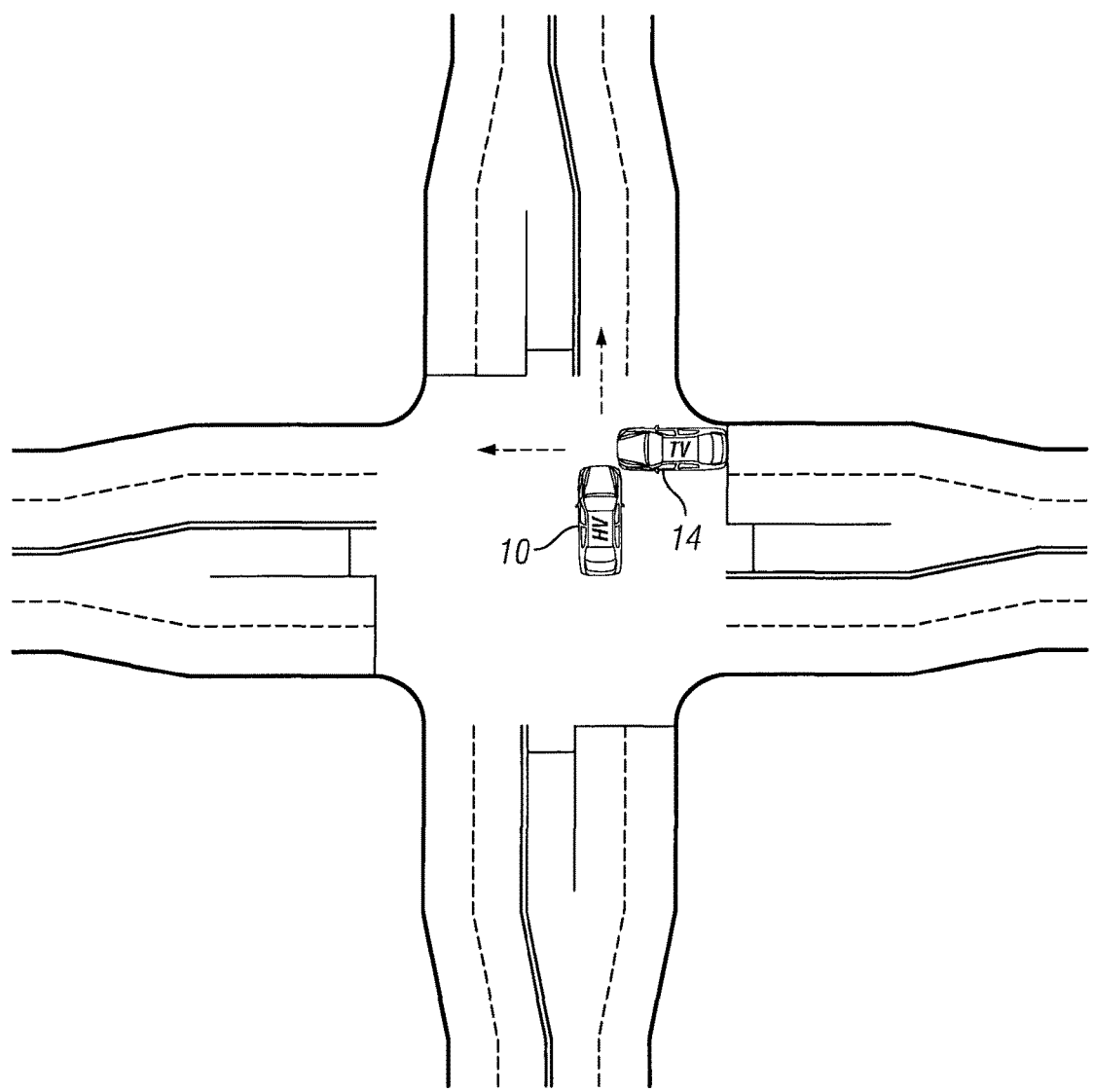

However, FIG. 5 illustrates Scenario 2 where the host vehicle 10 is intending to travel straight through the intersection and the remote vehicle 14 is intending to travel straight through the intersection in a direction from the left of the host vehicle 10 which will intersect the travel path of the host vehicle 10. Therefore, a threat of contact exists between the host vehicle 10 and the remote vehicle 14, and the threat condition is indicated as 1 in Table 5. Similarly, FIG. 6 illustrates Scenario 3 where the host vehicle 10 is intending to travel straight through the intersection and the remote vehicle 14 is intending to travel straight through the intersection in a direction from the right of the host vehicle 10 which will intersect the travel path of the host vehicle 10. Therefore, a threat of contact exists between the host vehicle 10 and the remote vehicle 14, and the threat condition is indicated as 1 in Table 5.

Figure 7:
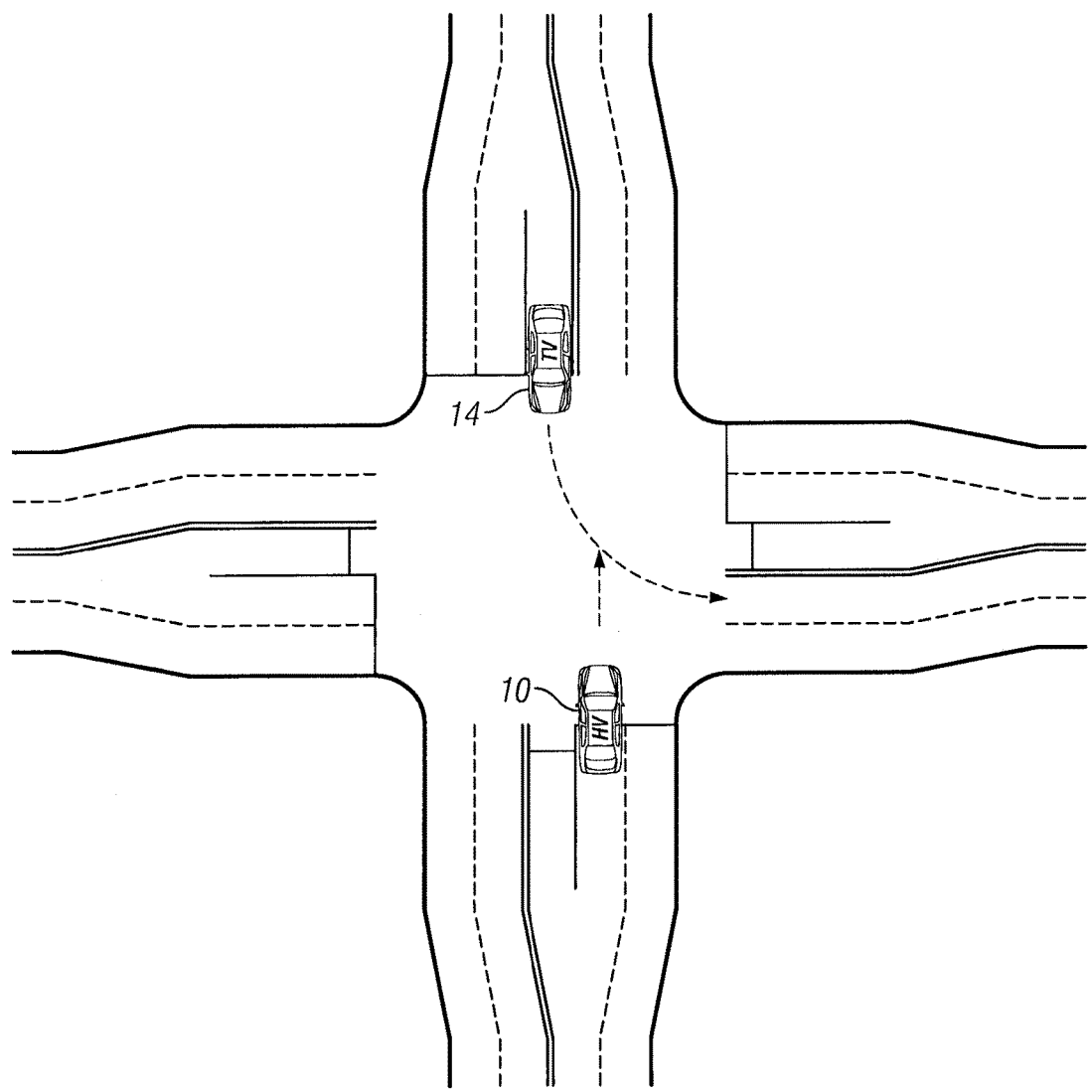
Figure 8:
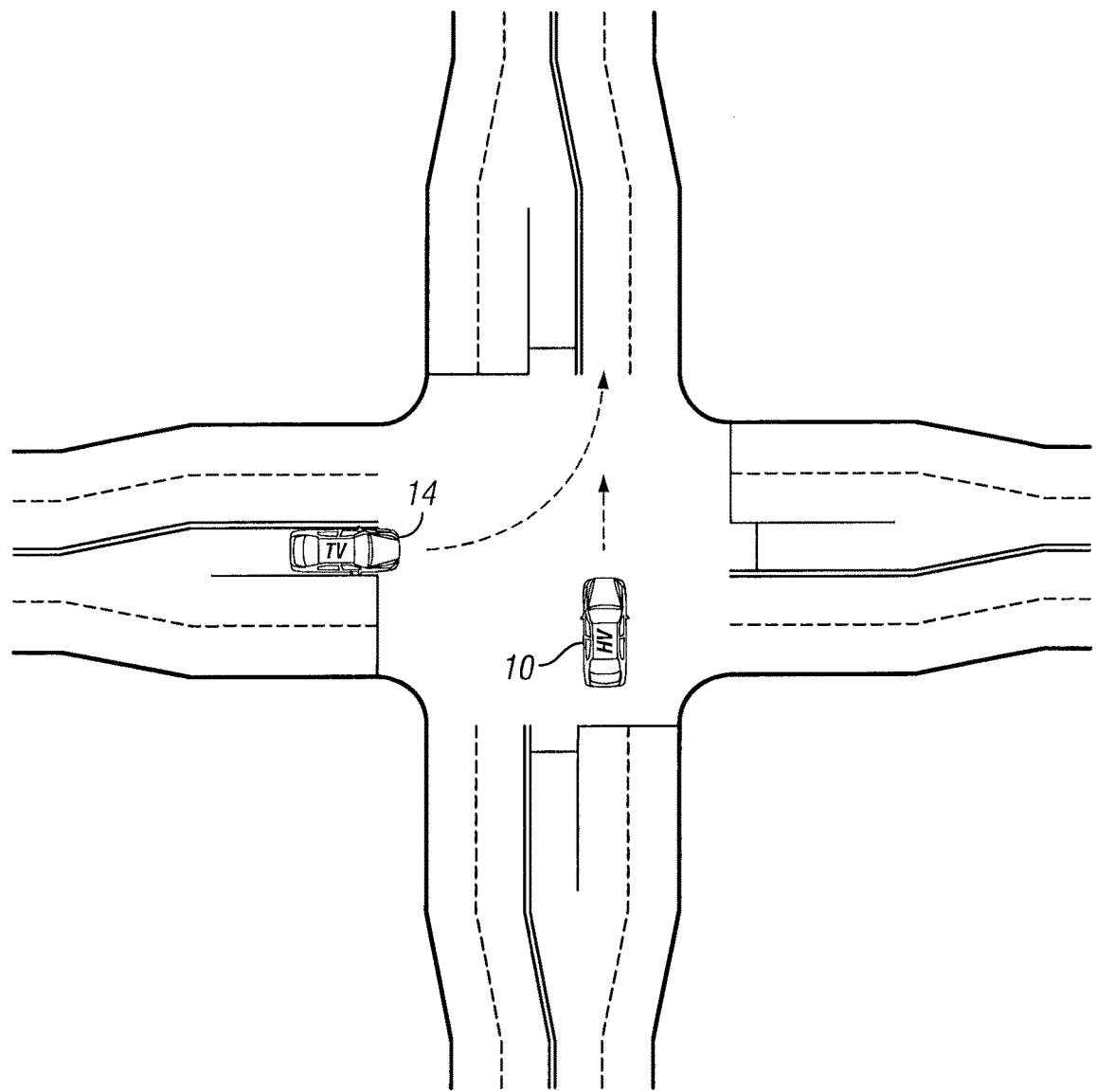
Figure 9:
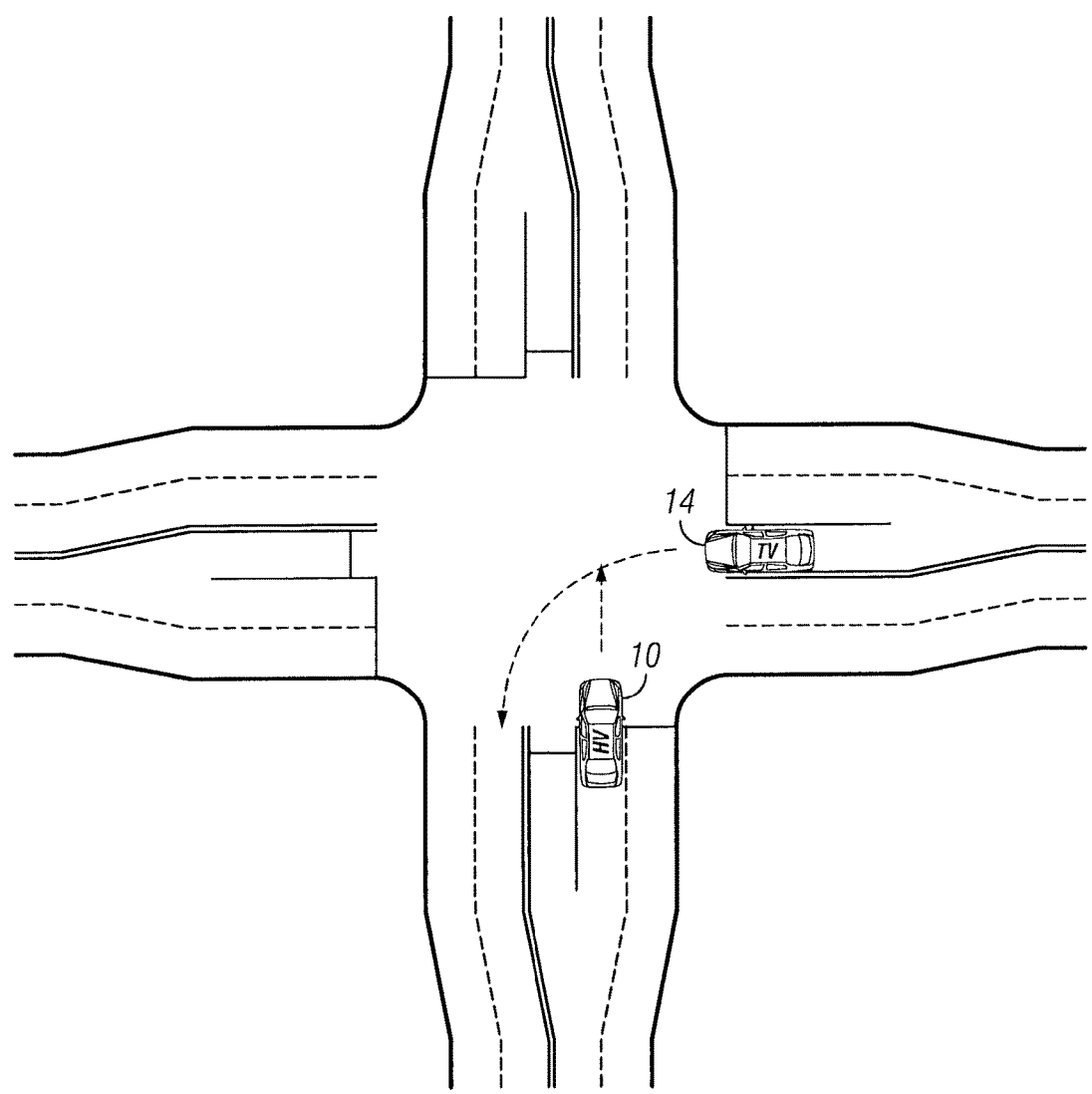

FIG. 7 illustrates Scenario 4 where the host vehicle 10 is intending to travel straight through the intersection and the remote vehicle 14 is travelling in a direction opposite to the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 5. FIG. 8 illustrates Scenario 5 where the host vehicle 10 is intending to travel straight through the intersection and the remote vehicle 14 is travelling in a direction from the left of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 5. FIG. 9 illustrates Scenario 6 where the host vehicle 10 is intending to travel straight through the intersection and the remote vehicle 14 is travelling in a direction from the right of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 5.

Figure 10:
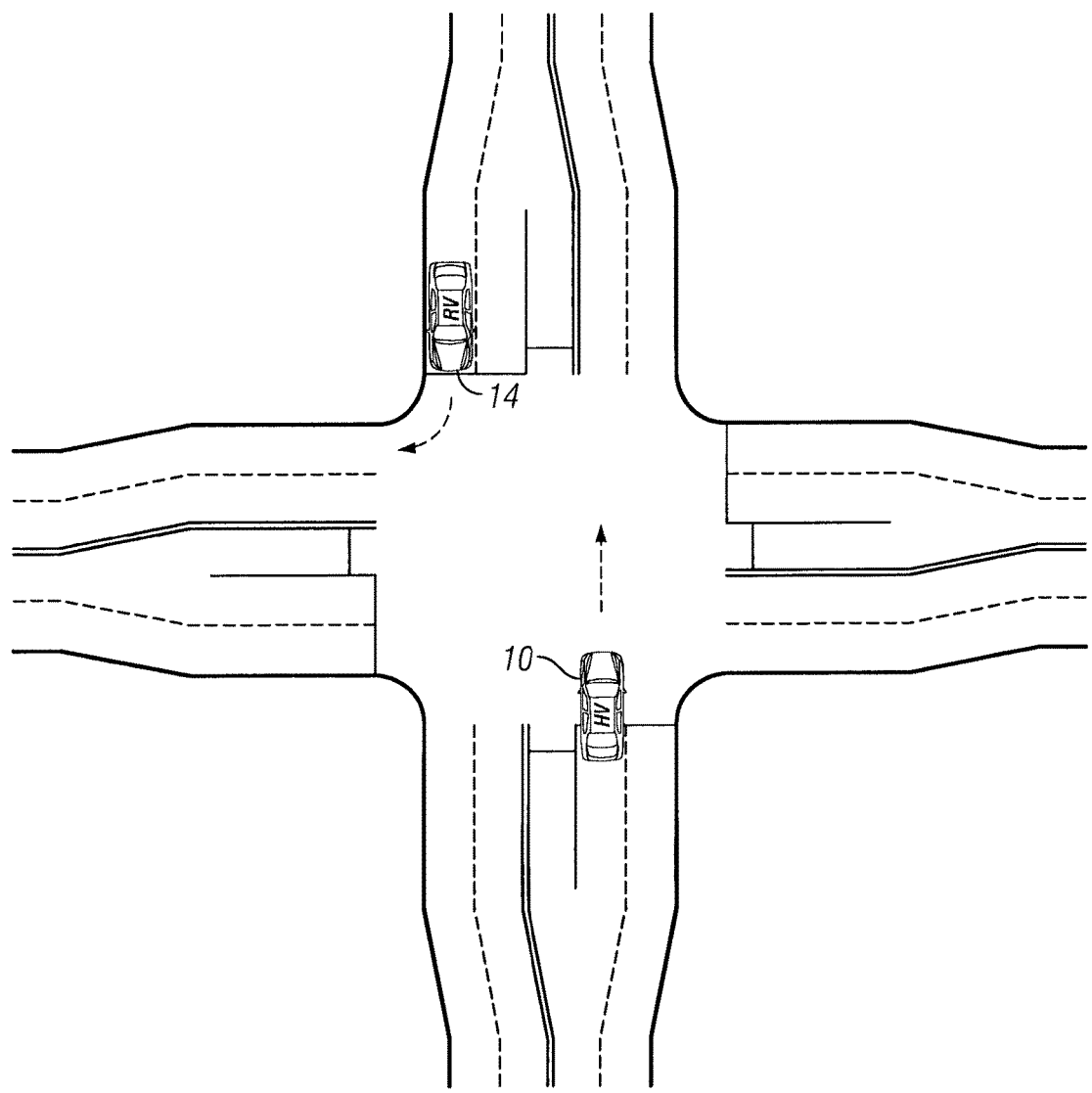
Figure 11:
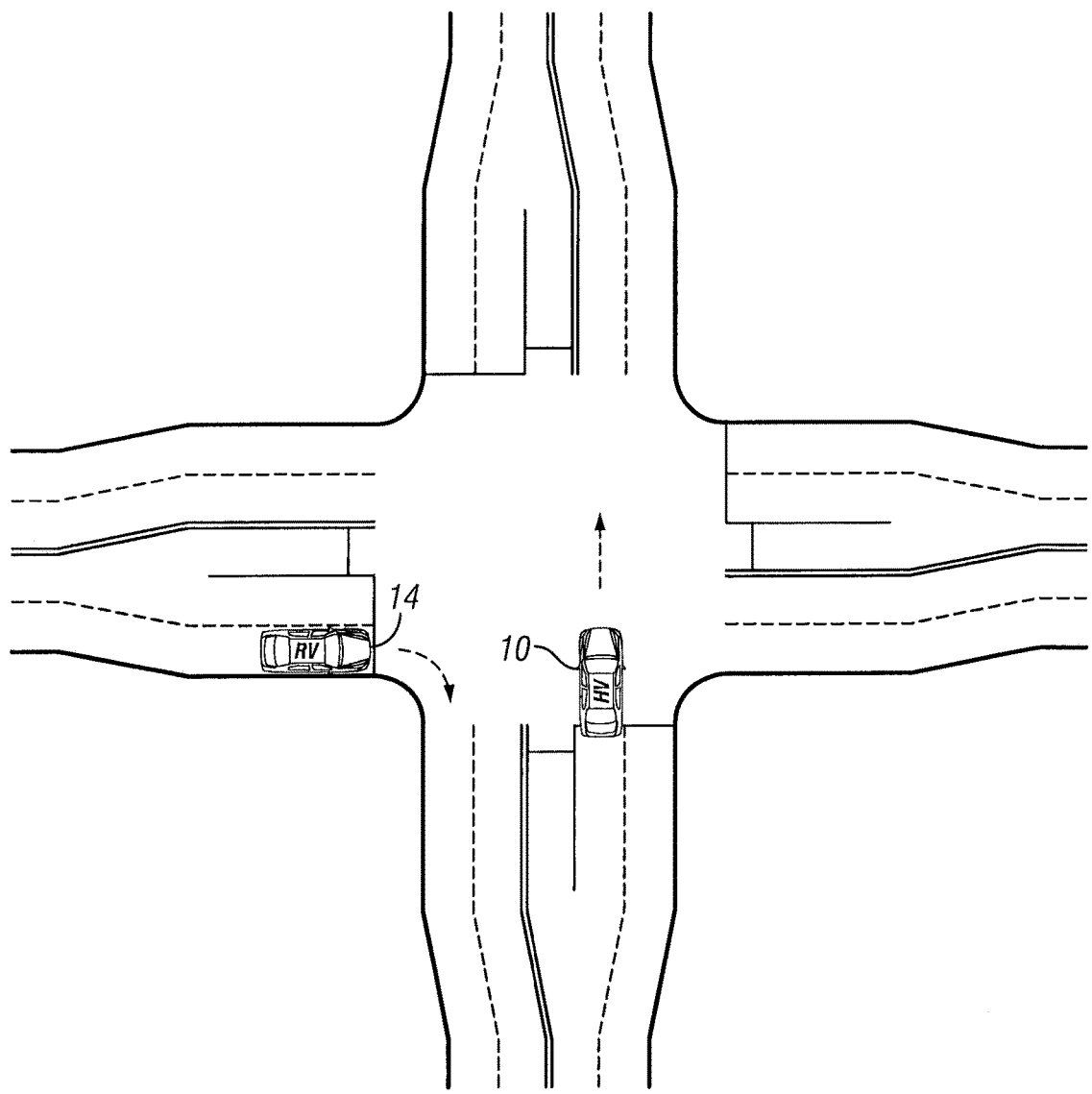
Figure 12:
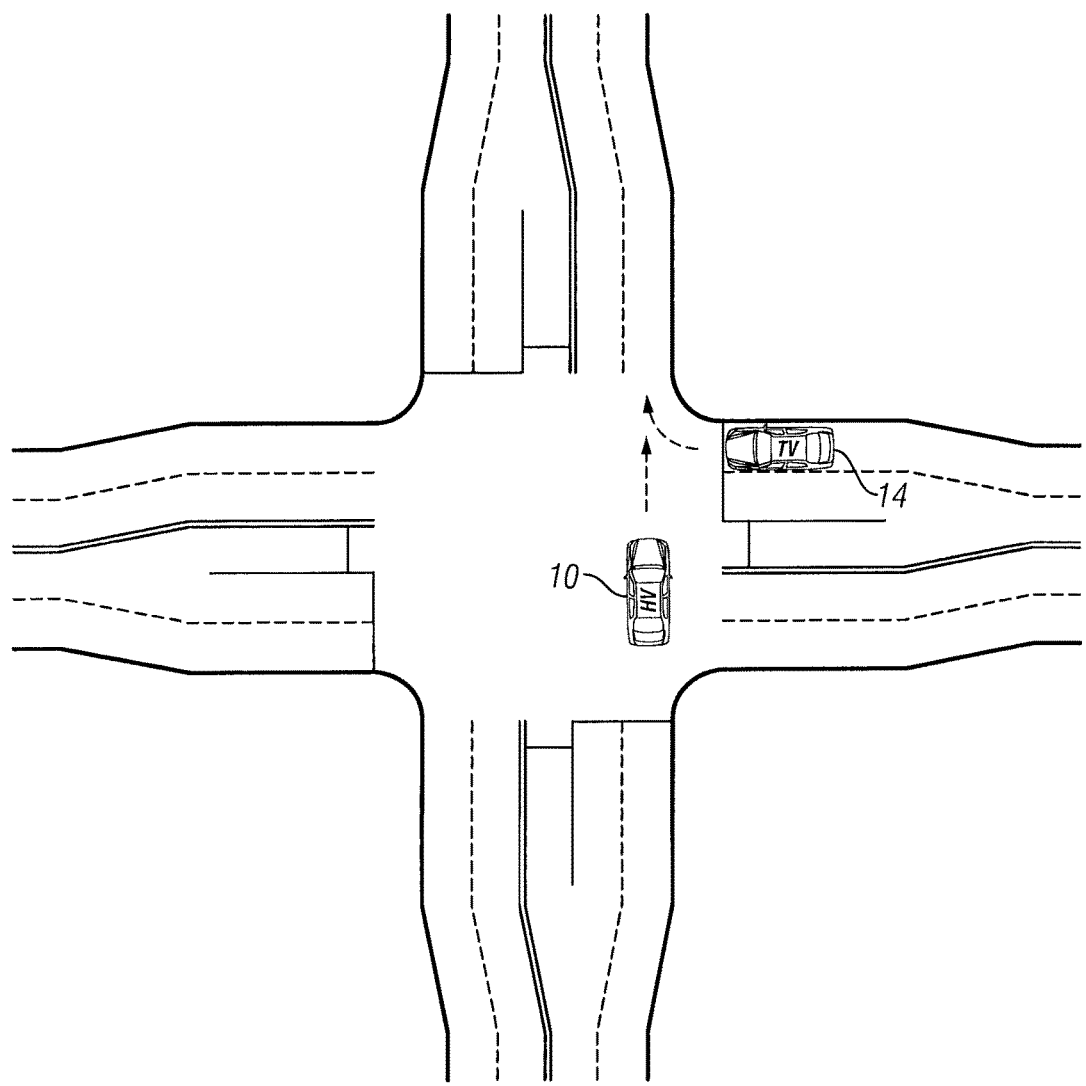

FIG. 10 illustrates Scenario 7 where the host vehicle 10 is intending to travel straight through the intersection and the remote vehicle 14 is travelling in a direction opposite to the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 5. FIG. 11 illustrates Scenario 8 where the host vehicle 10 is intending to travel straight through the intersection and the remote vehicle 14 is travelling in a direction from the left of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 5. FIG. 12 illustrates Scenario 9 where the host vehicle 10 is intending to travel straight through the intersection and the remote vehicle 14 is travelling in a direction from the right of the host vehicle 10 and intending to turn right through the intersection in a direction which will intersect the travel path of the host vehicle 10. Therefore, a threat of contact exists between the host vehicle 10 and the remote vehicle 14, and the threat condition is indicated as 1 in Table 5.

In Table 6, the host vehicle 10 intends to turn left through the intersection, and the different intentions of the remote vehicle 14 are represented by the different codes CDEF as explained in Table 6. The controller 22 therefore determines whether a threat of contact between the host vehicle 10 and remote vehicle 14 exists for each scenario, as represented by a binary 0 for no threat and a binary 1 for a possible threat.

TABLE 6

Host Vehicle Turning Left

| Subject Vehicle | Code AB | Remote Vehicle | Code CDEF | Full Code ABCDEF | Threat |
|---|---|---|---|---|---|
| Left turn | 01 | Straight/Opposite | 0000 | 010000 | 1 |
| Left turn | 01 | Straight/Left | 0001 | 010001 | 1 |
| Left turn | 01 | Straight/Right | 0011 | 010011 | 1 |
| Left turn | 01 | Left turn/Opposite | 0100 | 010100 | 0 |
| Left turn | 01 | Left turn/Left | 0101 | 010101 | 1 |
| Left turn | 01 | Left turn/Right | 0111 | 010111 | 1 |
| Left turn | 01 | Right turn/Opposite | 1100 | 011100 | 1 |

TABLE 6-continued

Host Vehicle Turning Left

| Subject Vehicle | Code AB | Remote Vehicle | Code CDEF | Full Code ABCDEF | Threat |
|---|---|---|---|---|---|
| Left turn | 01 | Right turn/Left | 1101 | 011101 | 0 |
| Left turn | 01 | Right turn/Right | 1111 | 011111 | 0 |

Figure 13:
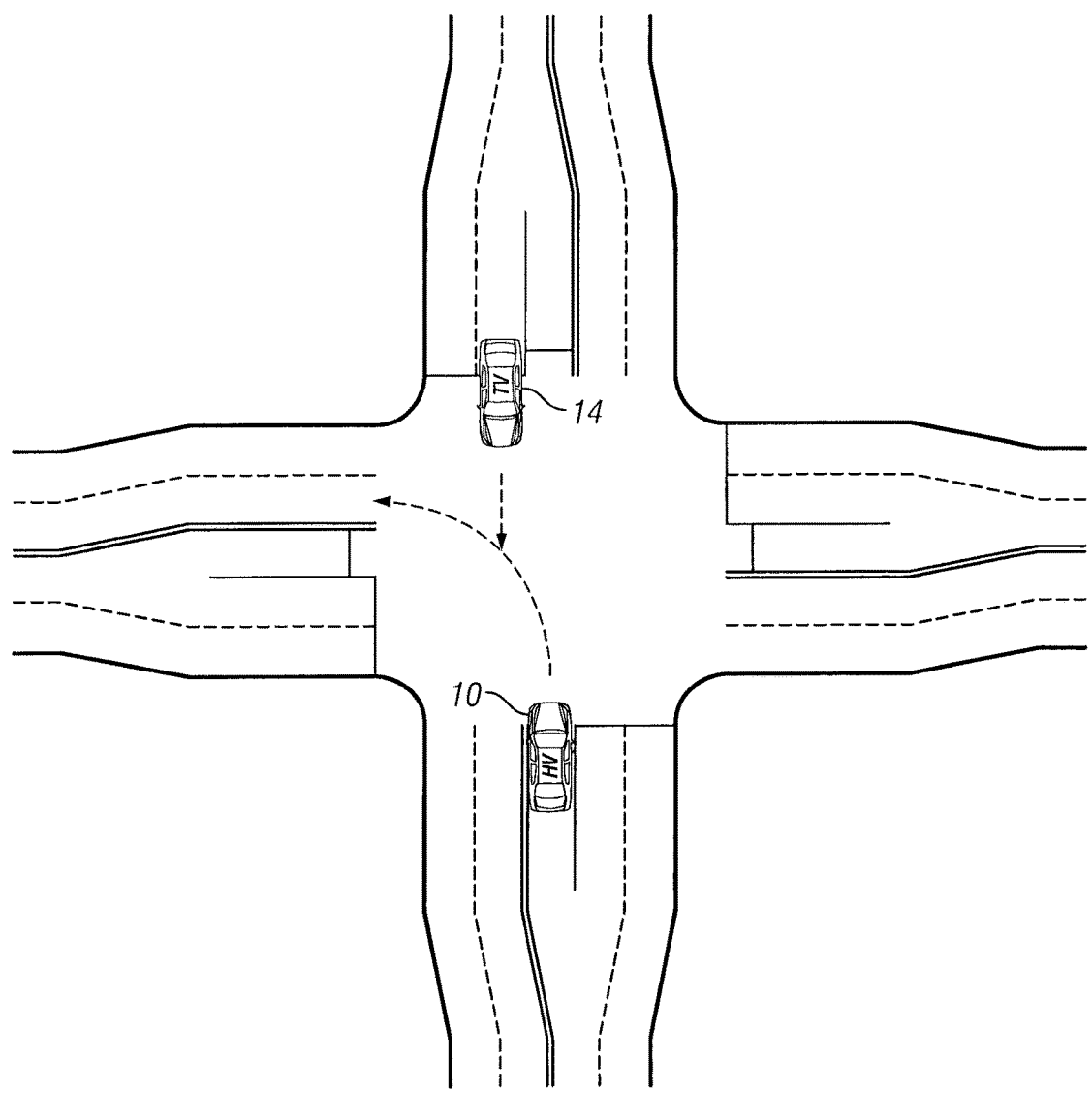

These nine different scenarios are shown graphically in FIGS. 13 through 21. FIG. 13 illustrates Scenario 10 where the host vehicle 10 and remote vehicle 14 are travelling in opposite directions to each other, with the remote vehicle 14 intending to travel straight through the intersection and the host vehicle 10 intending to turn left in the intersection across the path of remote vehicle 14. Therefore, a threat of contact exists between the host vehicle 10 and the remote vehicle 14, and the threat condition is indicated as 1 in Table 6.

Figure 14:
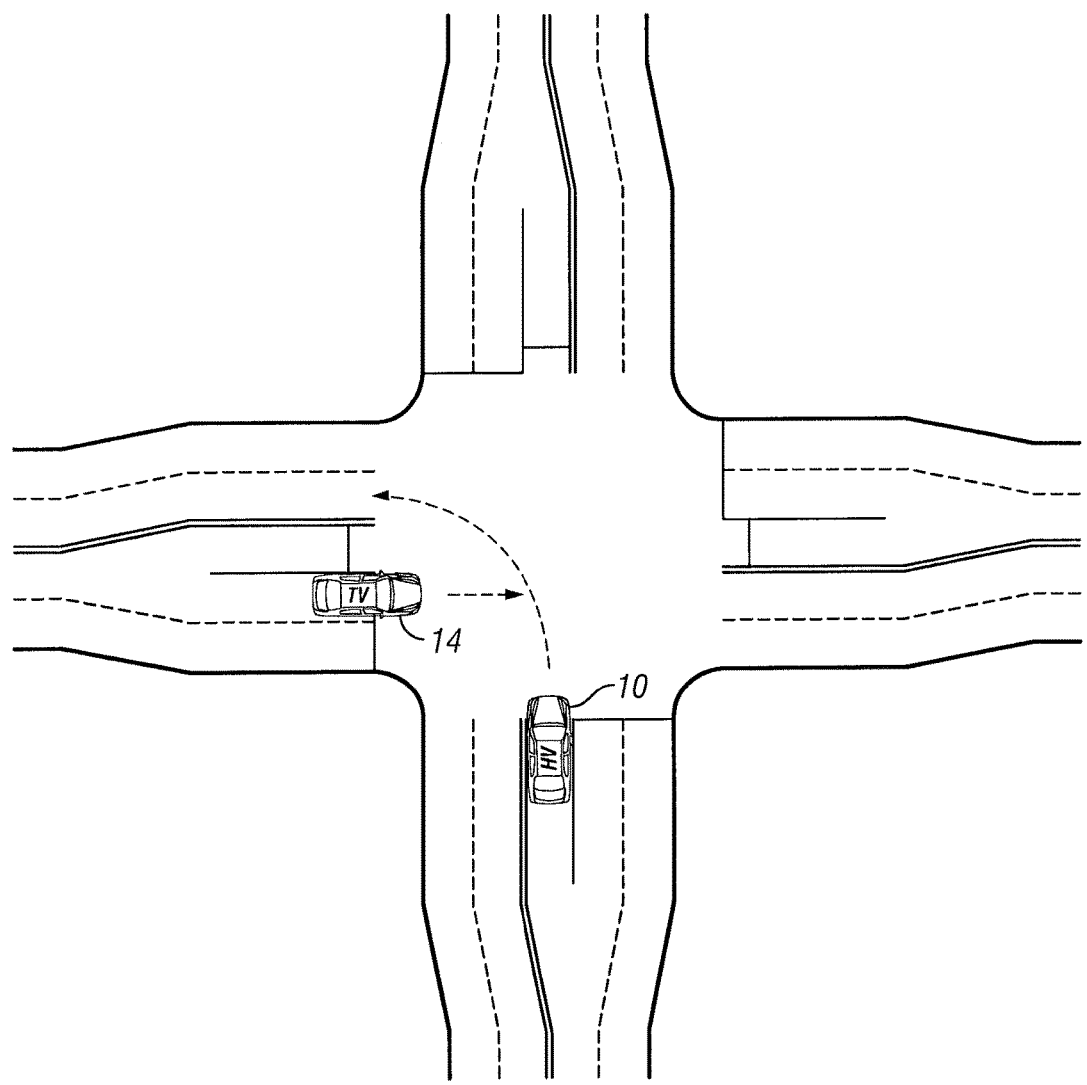
Figure 15:
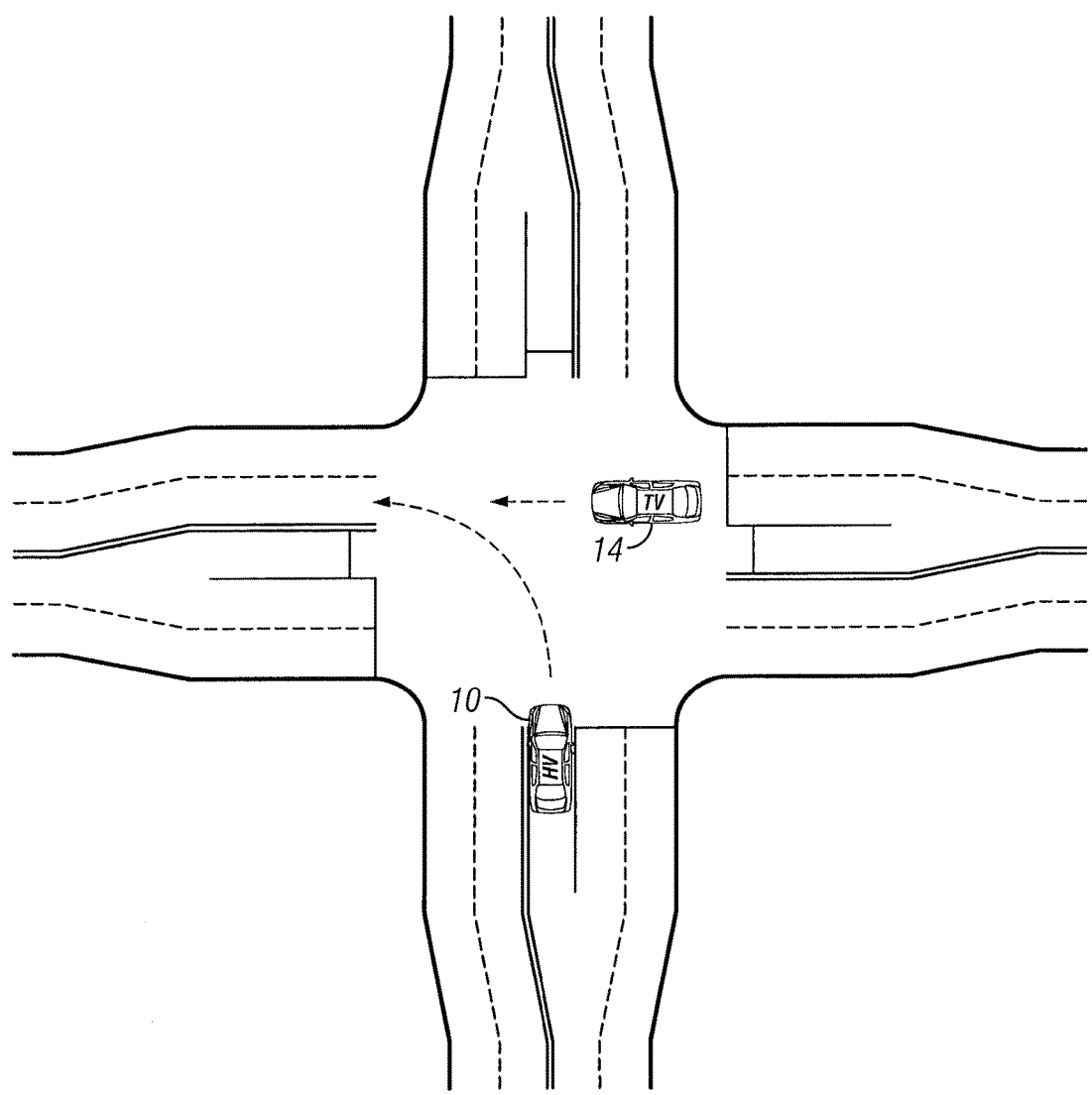

FIG. 14 illustrates Scenario 11 where the host vehicle 10 is intending to turn left through the intersection and the remote vehicle 14 is intending to travel straight through the intersection in a direction from the left of the host vehicle 10 which will intersect the travel path of the host vehicle 10. Therefore, a threat of contact exists between the host vehicle 10 and the remote vehicle 14, and the threat condition is indicated as 1 in Table 6. Similarly, FIG. 15 illustrates Scenario 12 where the host vehicle 10 is intending to turn left through the intersection and the remote vehicle 14 is intending to travel straight through the intersection in a direction from the right of the host vehicle 10 which will intersect the travel path of the host vehicle 10. Therefore, a threat of contact exists between the host vehicle 10 and the remote vehicle 14, and the threat condition is indicated as 1 in Table 6.

Figure 16:
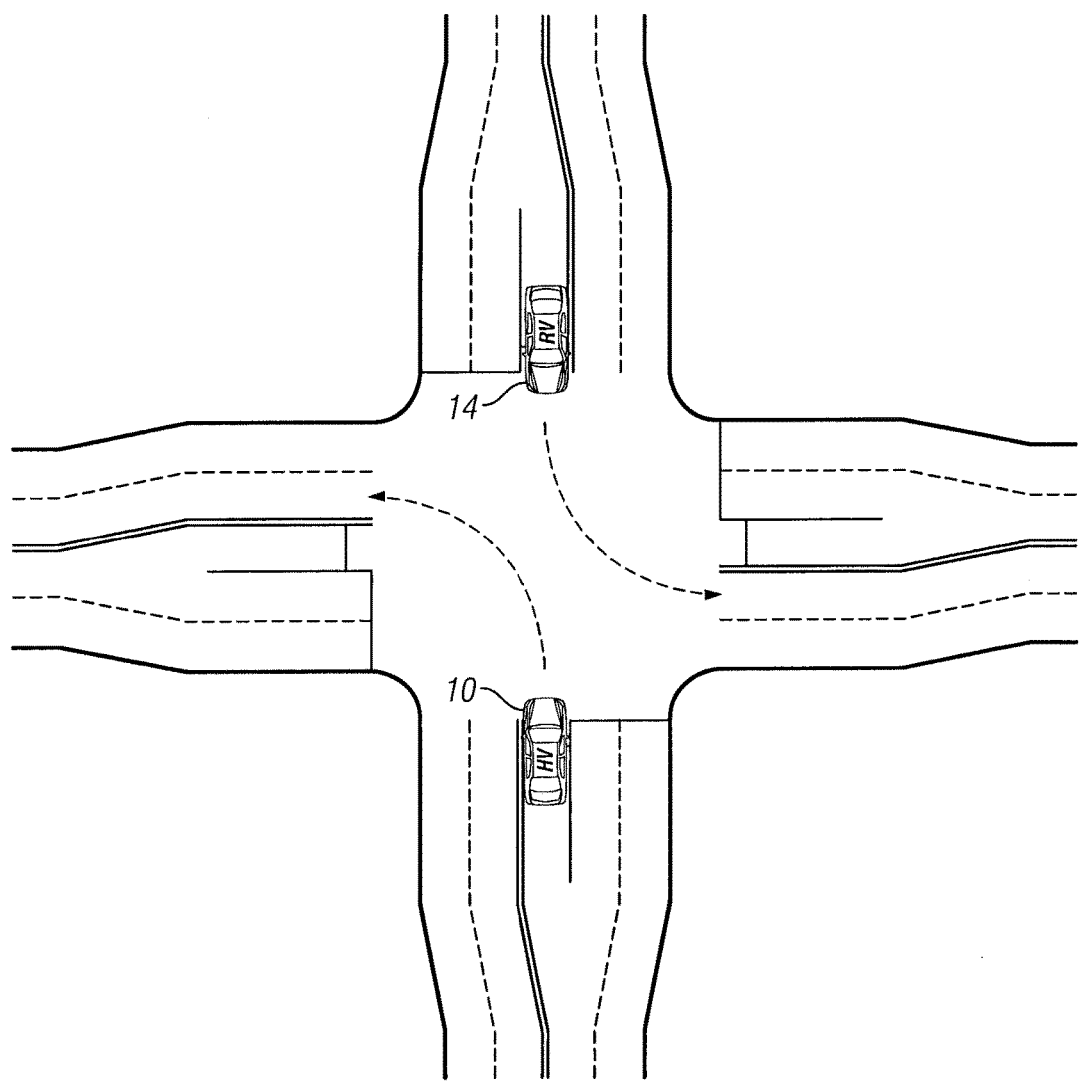
Figure 17:
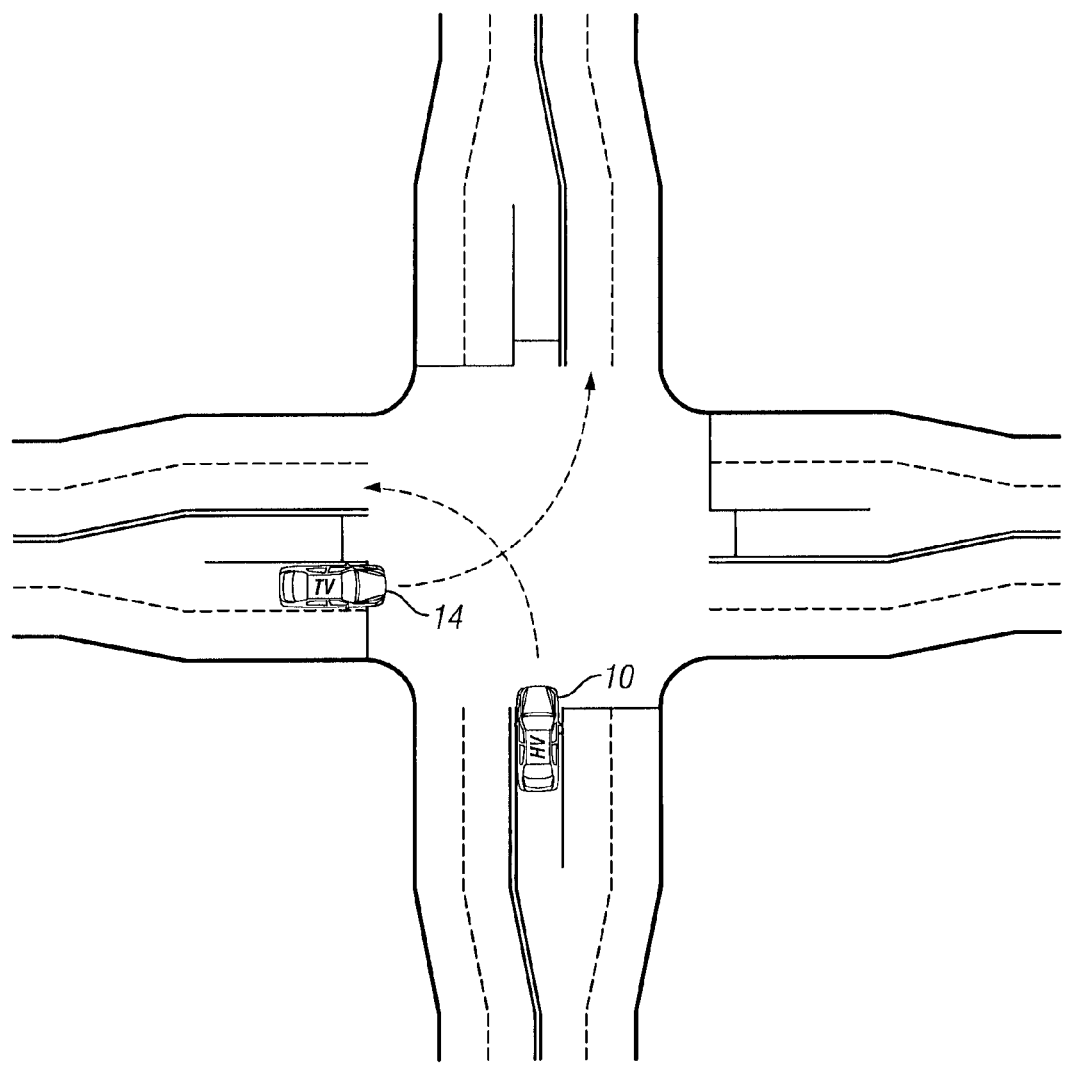
Figure 18:
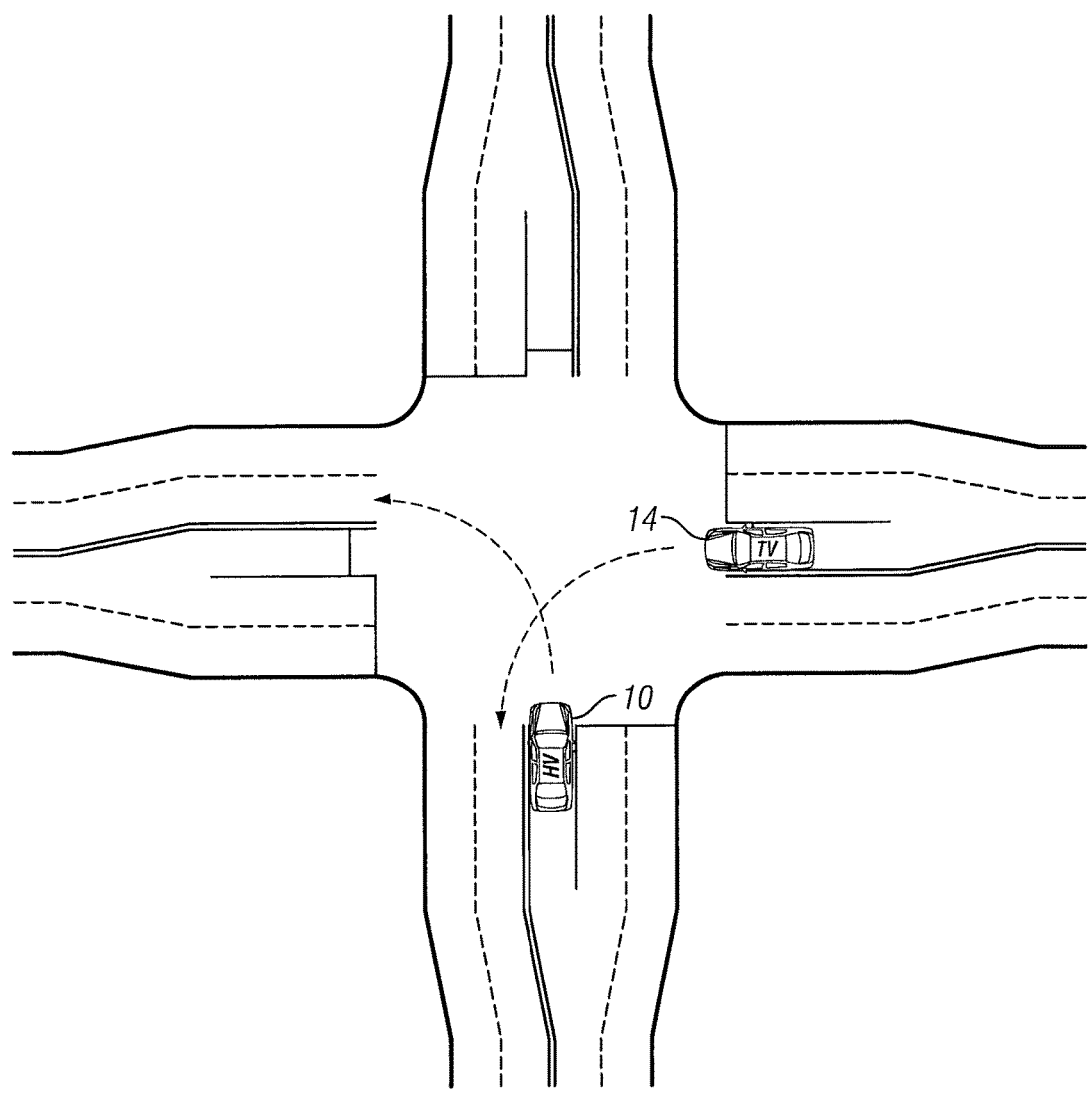

FIG. 16 illustrates Scenario 13 where the host vehicle 10 is intending to turn left through the intersection and the remote vehicle 14 is travelling in a direction opposite to the host vehicle 10 and intending to turn left through the intersection in a direction which will not intersect the travel path of the host vehicle 10. Therefore, no threat of contact exists between the host vehicle 10 and the remote vehicle 14, and the threat condition is indicated as 0 in Table 6. FIG. 17 illustrates Scenario 14 where the host vehicle 10 is intending to turn left through the intersection and the remote vehicle 14 is travelling in a direction from the left of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 6. FIG. 18 illustrates Scenario 15 where the host vehicle 10 is intending to turn left through the intersection and the remote vehicle 14 is travelling in a direction from the right of the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 6.

Figure 19:
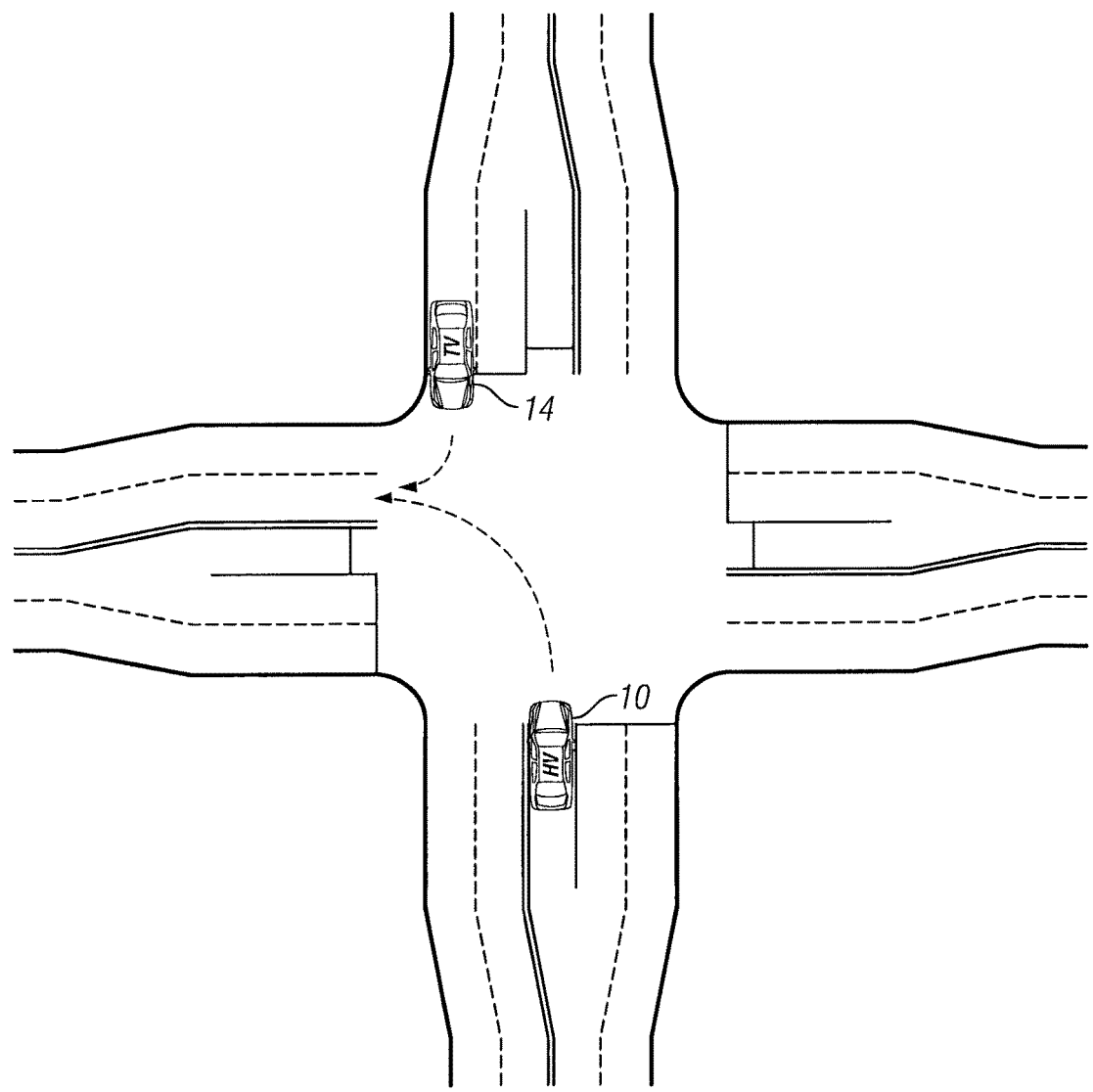
Figure 20:
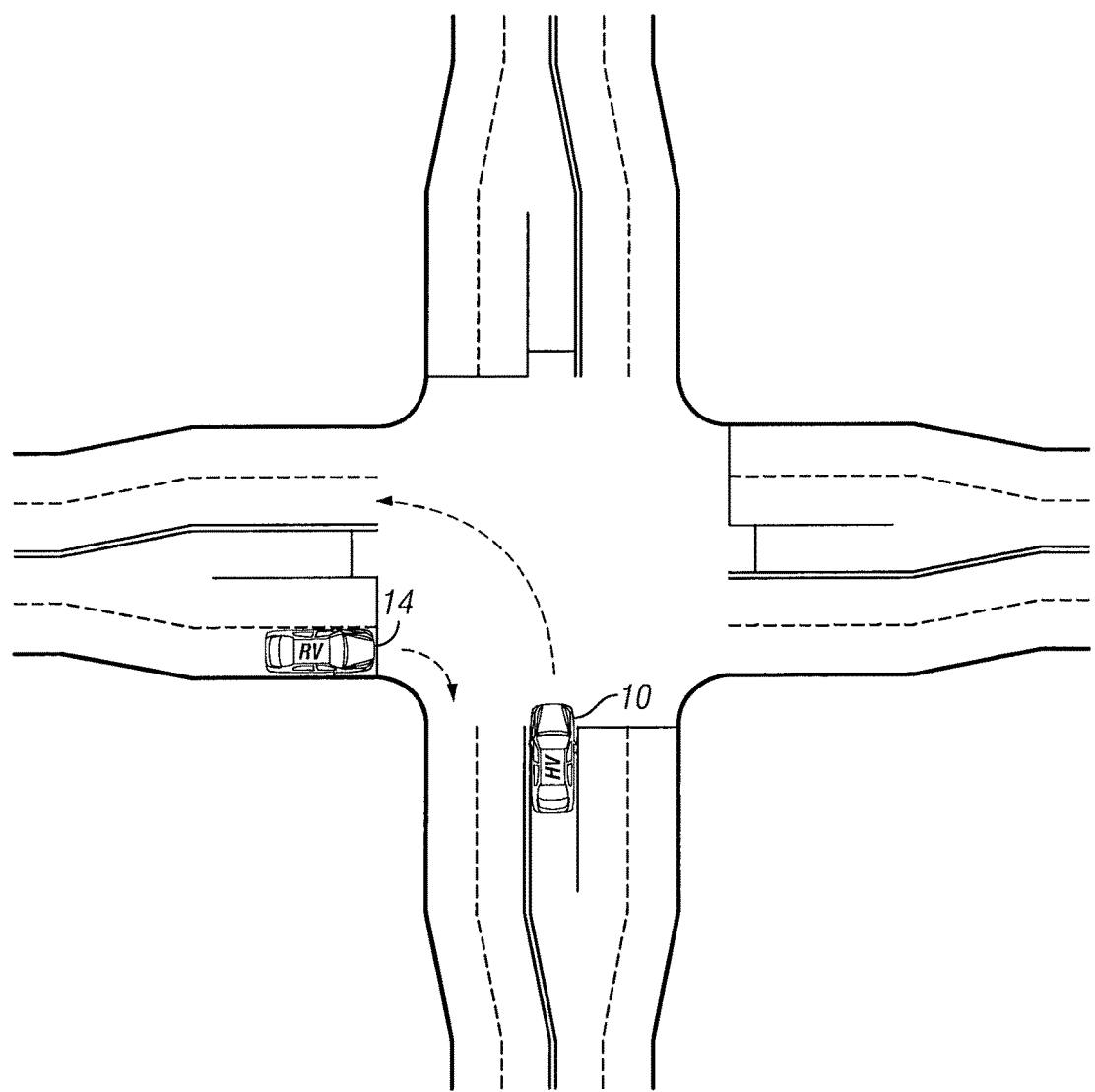
Figure 21:
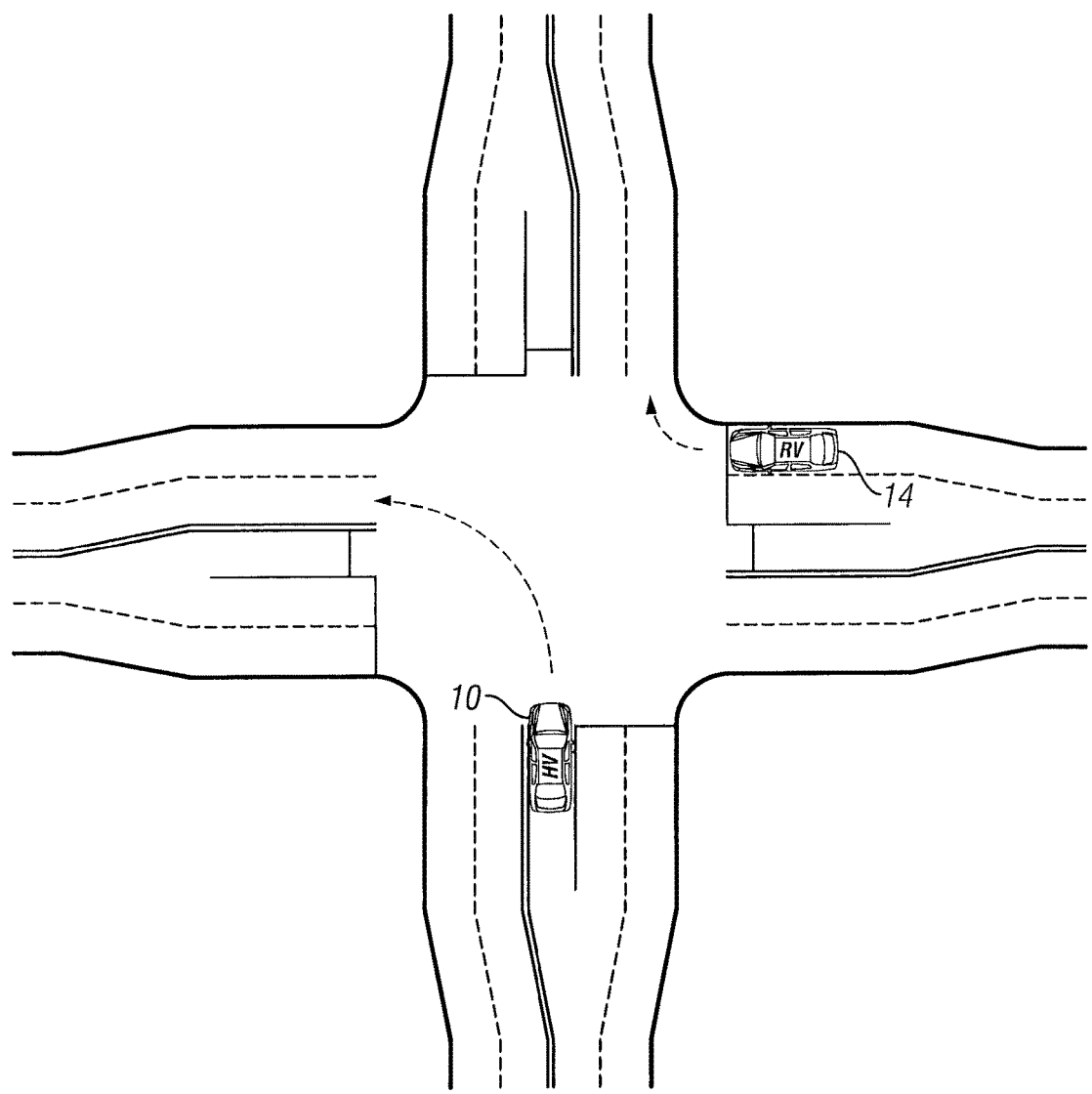

FIG. 19 illustrates Scenario 16 where the host vehicle 10 is intending to turn left through the intersection and the remote vehicle 14 is travelling in a direction opposite to the host vehicle 10 and intending to turn right through the intersection in a direction which will intersect the travel path of the host vehicle 10. Therefore, a threat of contact exists between the host vehicle 10 and the remote vehicle 14, and the threat condition is indicated as 1 in Table 6. FIG. 20 illustrates Scenario 17 where the host vehicle 10 is intending to turn left through the intersection and the remote vehicle 14 is travelling in a direction from the left of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 6. FIG. 21 illustrates Scenario 18 where the host vehicle 10 is intending to turn left through the intersection and the remote vehicle 14 is travelling in a direction from the right of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 6.

In Table 7, the host vehicle 10 intends to turn right through the intersection, and the different intentions of the remote vehicle 14 are represented by the different codes CDEF as explained in Table 7. The controller 22 therefore determines whether a threat of contact between the host vehicle 10 and remote vehicle 14 exists for each scenario, as represented by a binary 0 for no threat and a binary 1 for a possible threat.

TABLE 7

Host Vehicle Turning Right Use Cases

| Subject Vehicle | Code AB | Remote Vehicle | Code CDEF | Full Code ABCDEF | Threat |
|---|---|---|---|---|---|
| Right turn | 11 | Straight/Opposite | 0000 | 110000 | 0 |
| Right turn | 11 | Straight/Left | 0001 | 110001 | 1 |
| Right turn | 11 | Straight/Right | 0011 | 110011 | 0 |
| Right turn | 11 | Left turn/Opposite | 0100 | 110100 | 1 |
| Right turn | 11 | Left turn/Left | 0101 | 110101 | 0 |
| Right turn | 11 | Left turn/Right | 0111 | 110111 | 0 |
| Right turn | 11 | Right turn/Opposite | 1100 | 111100 | 0 |
| Right turn | 11 | Right turn/Left | 1101 | 111101 | 0 |
| Right turn | 11 | Right turn/Right | 1111 | 111111 | 0 |

Figure 22:
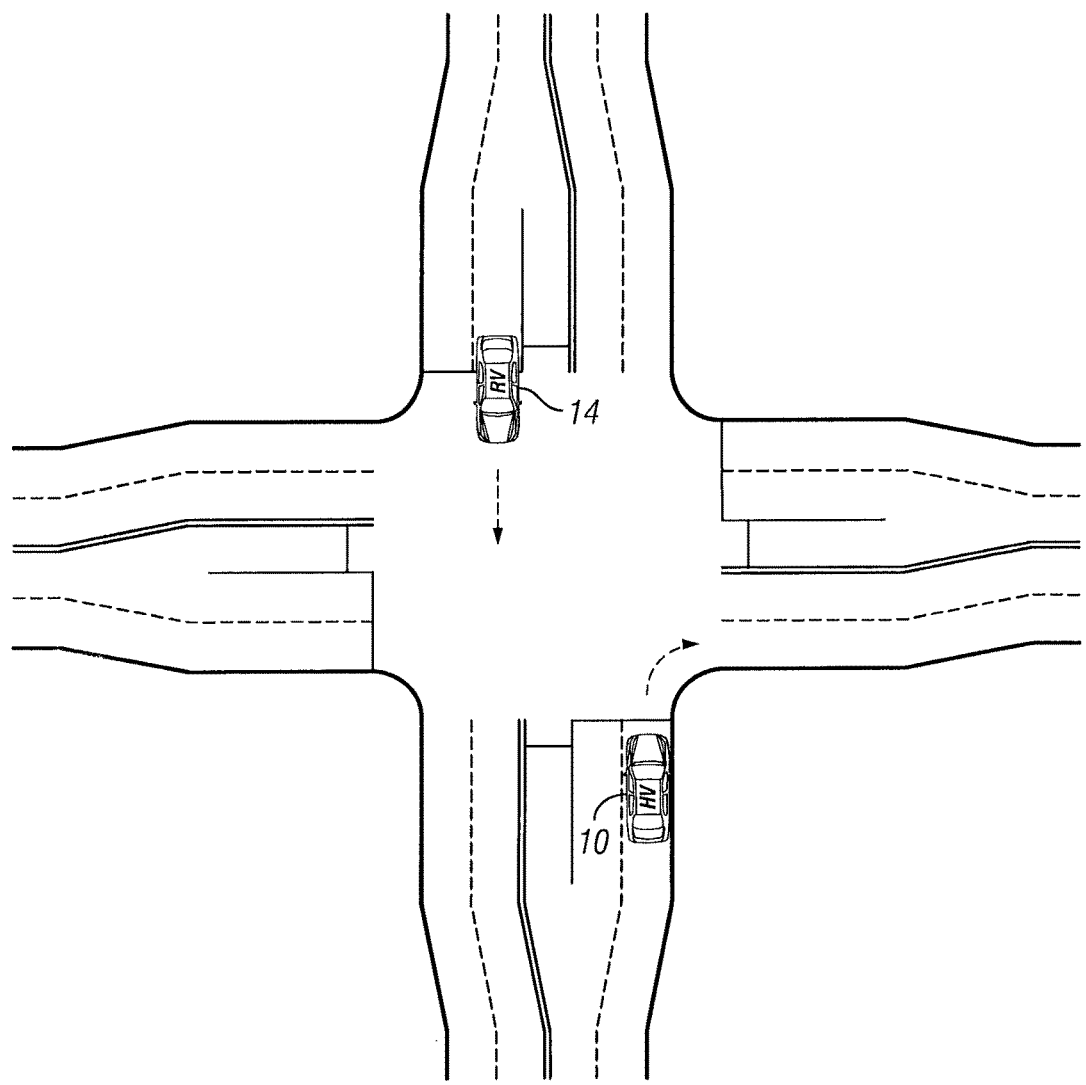

These nine different scenarios are shown graphically in FIGS. 22 through 30. FIG. 22 illustrates Scenario 19 where the host vehicle 10 and remote vehicle 14 are travelling in opposite directions to each other, with the remote vehicle 14 intending to travel straight through the intersection and the host vehicle 10 intending to turn right in the intersection without crossing the path of remote vehicle 14. Therefore, no threat of contact exists between the host vehicle 10 and the remote vehicle 14, and the threat condition is indicated as 0 in Table 7.

Figure 23:
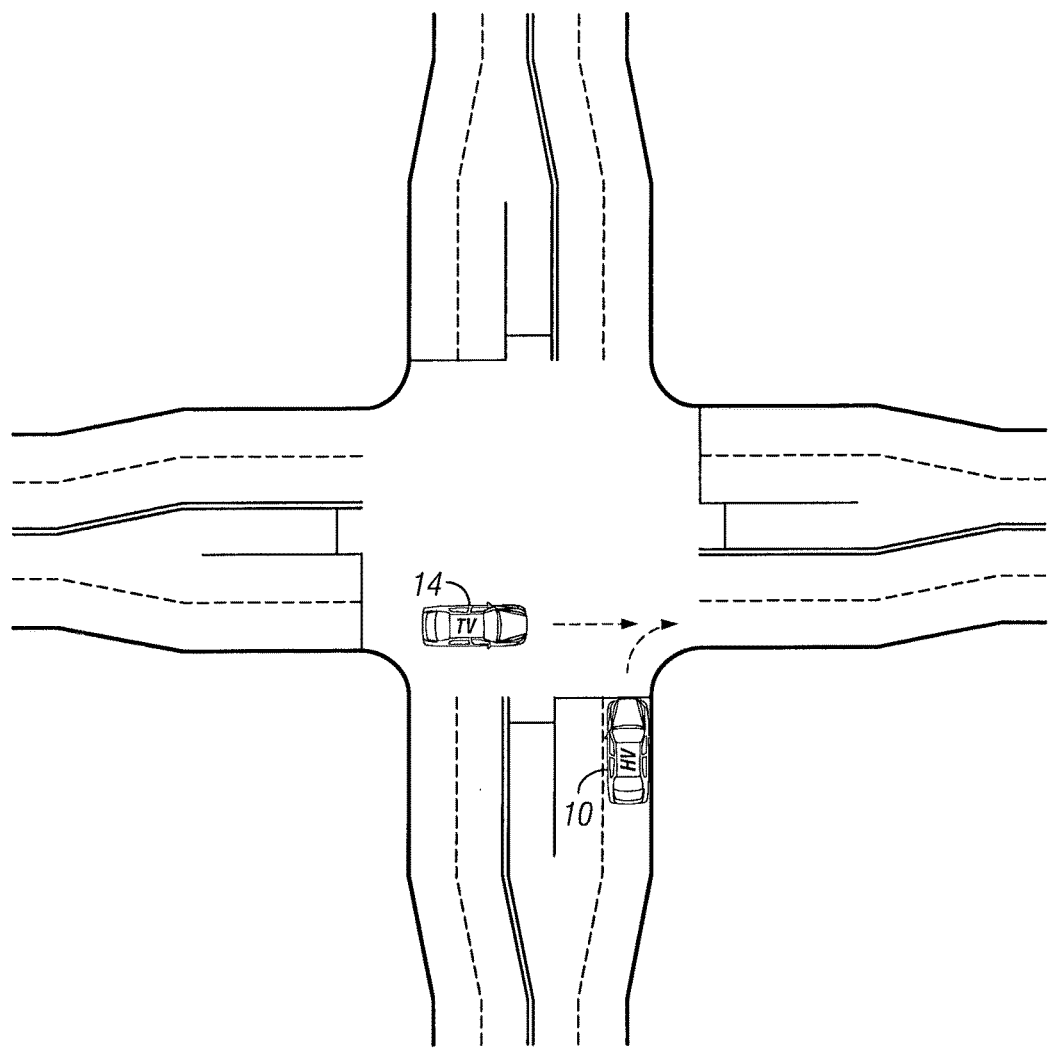
Figure 24:
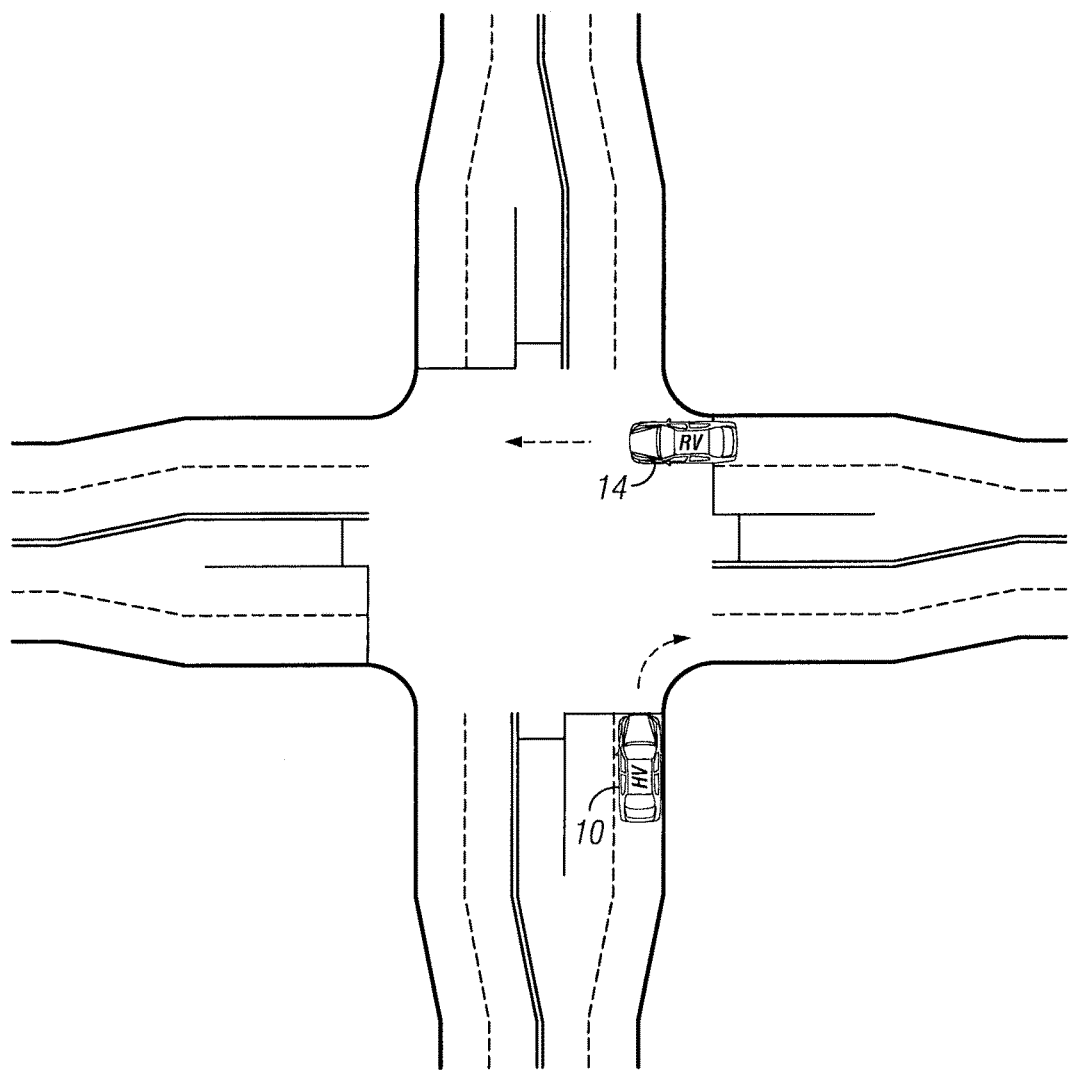

However, FIG. 23 illustrates Scenario 20 where the host vehicle 10 is intending to turn right through the intersection and the remote vehicle 14 is intending to travel straight through the intersection in a direction from the left of the host vehicle 10 which will intersect the travel path of the host vehicle 10. Therefore, a threat of contact exists between the host vehicle 10 and the remote vehicle 14, and the threat condition is indicated as 1 in Table 7. Similarly, FIG. 24 illustrates Scenario 21 where the host vehicle 10 is intending to turn right through the intersection and the remote vehicle 14 is intending to travel straight through the intersection in a direction from the right of the host vehicle 10 which will not intersect the travel path of the host vehicle 10. Therefore, no threat of contact exists between the host vehicle 10 and the remote vehicle 14, and the threat condition is indicated as 0 in Table 7.

Figure 25:
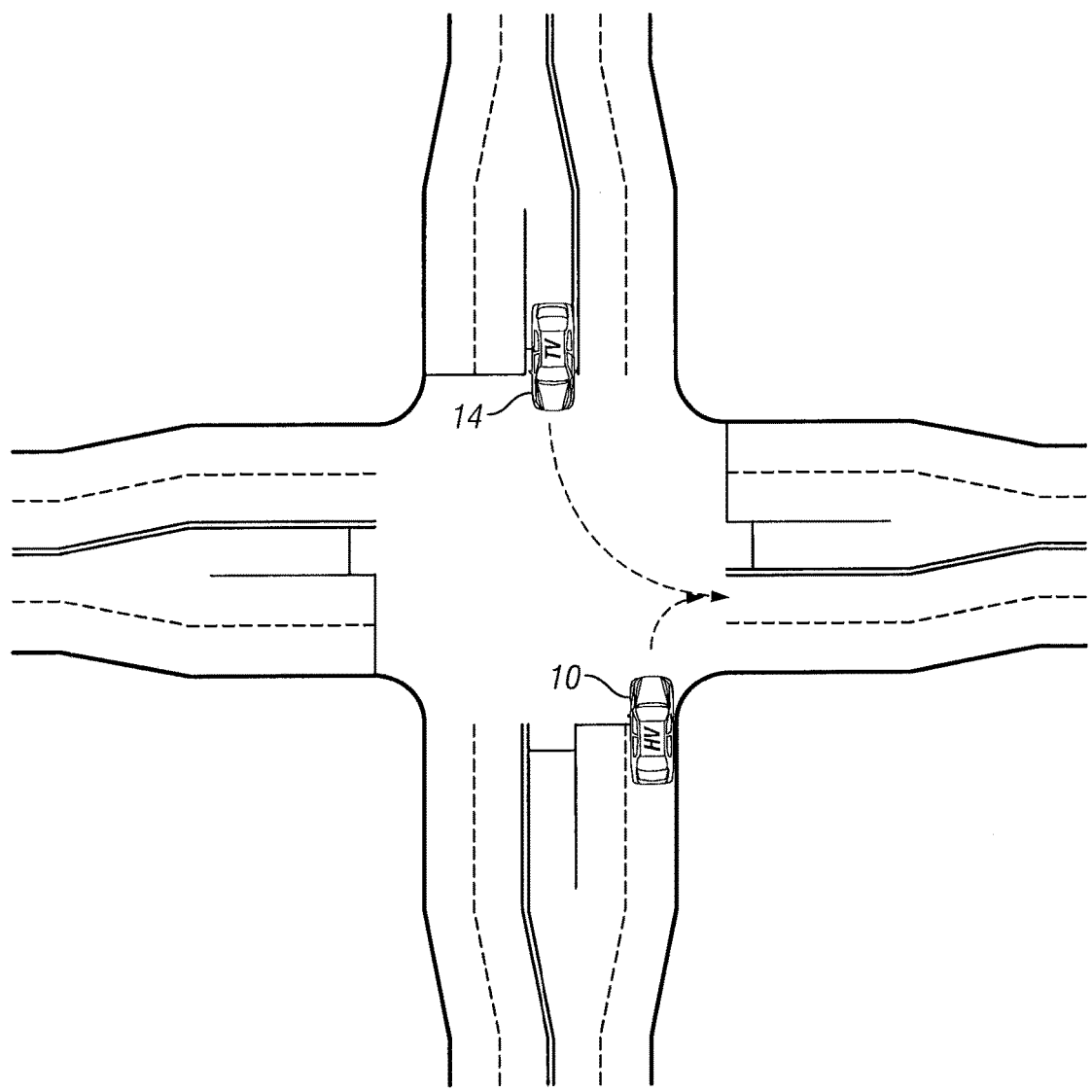
Figure 26:
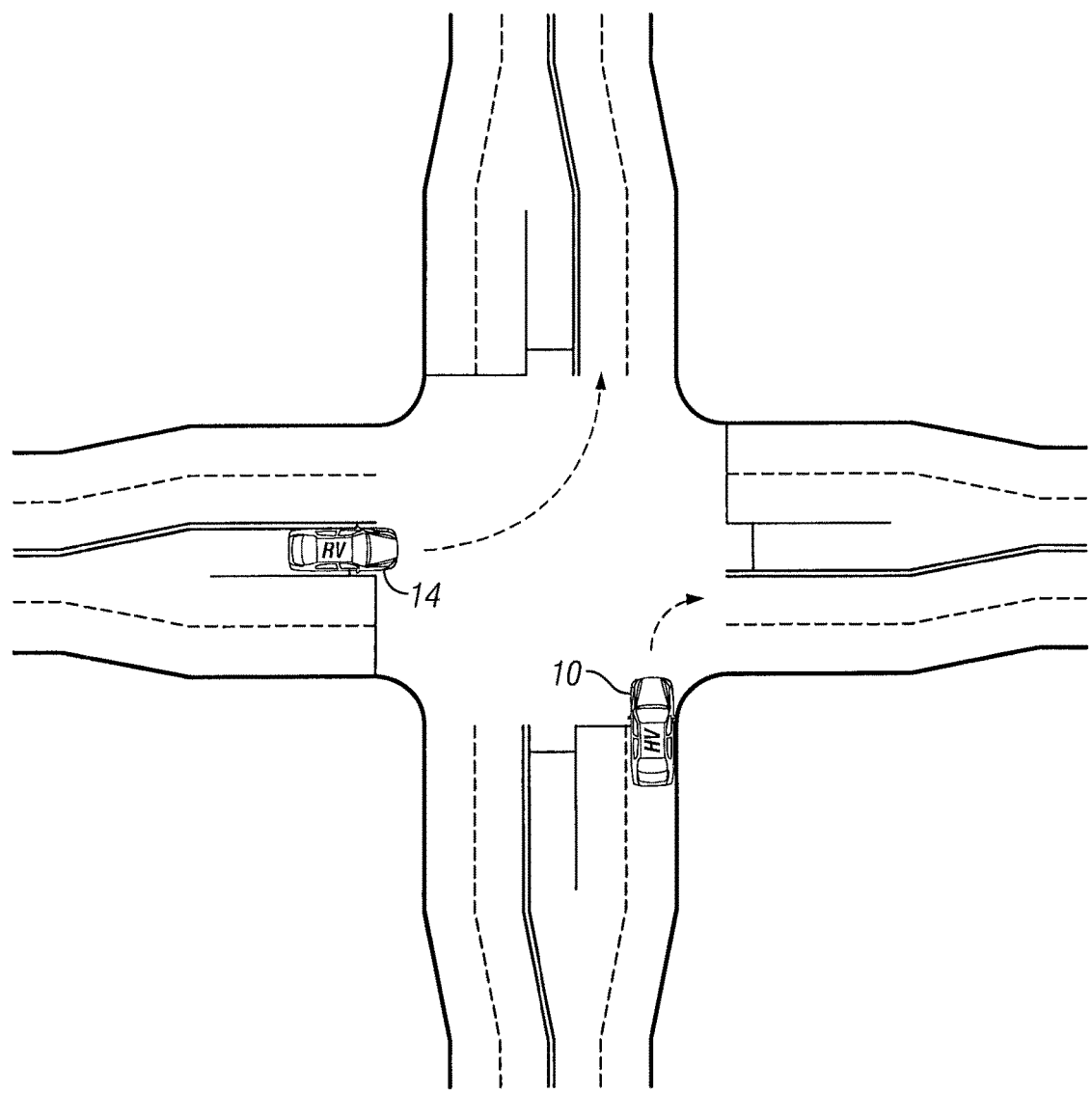
Figure 27:
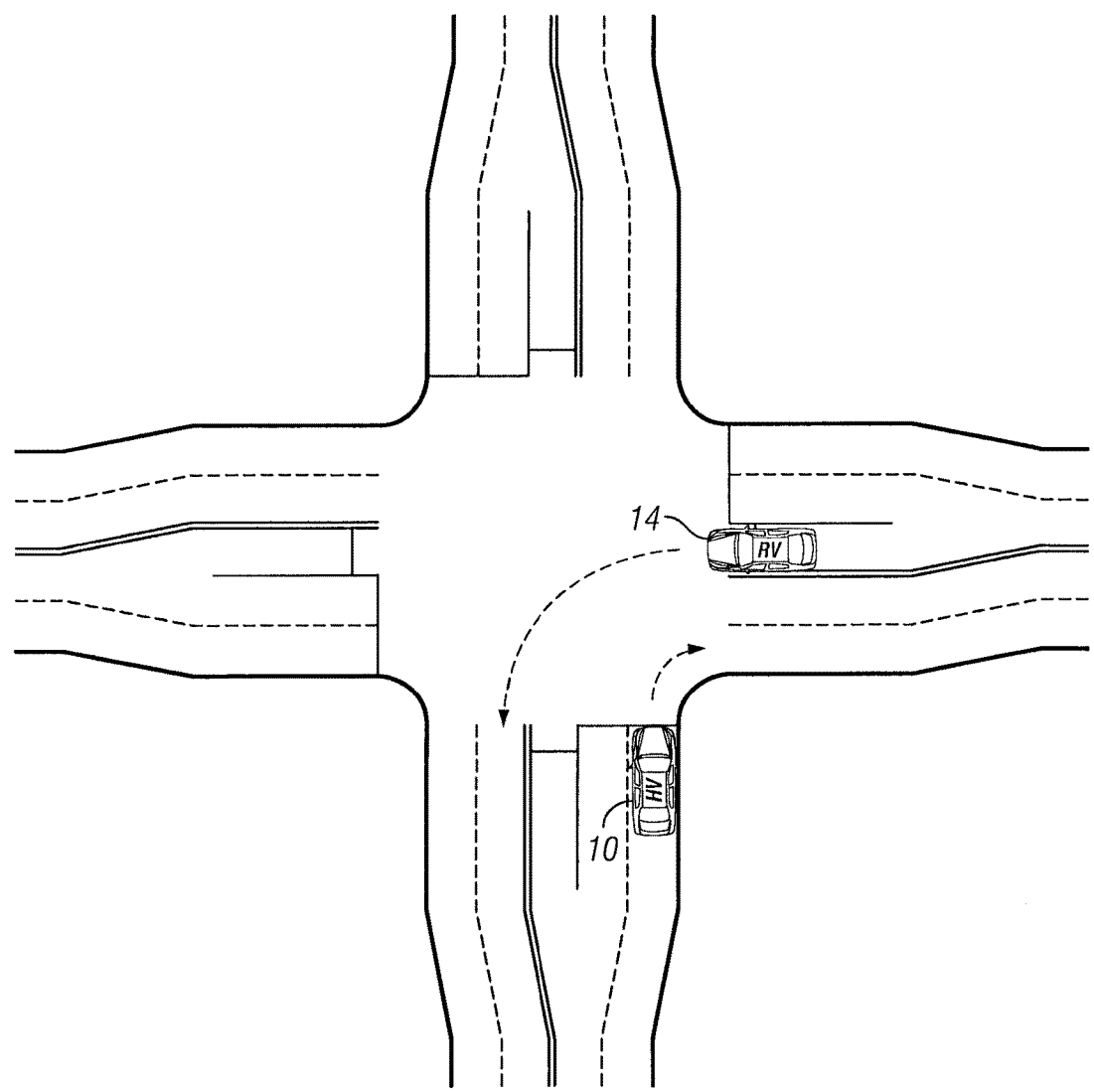

FIG. 25 illustrates Scenario 22 where the host vehicle 10 is intending to turn right through the intersection and the remote vehicle 14 is travelling in a direction opposite to the host vehicle 10 and intending to turn left through the intersection in a direction which will intersect the travel path of the host vehicle 10. Therefore, a threat of contact exists between the host vehicle 10 and the remote vehicle 14, and the threat condition is indicated as 1 in Table 7. FIG. 26 illustrates Scenario 23 where the host vehicle 10 is intending to turn right through the intersection and the remote vehicle 14 is travelling in a direction from the left of the host vehicle 10 and intending to turn left through the intersection in a direction which will not intersect the travel path of the host vehicle 10. Therefore, no threat of contact exists between the host vehicle 10 and the remote vehicle 14, and the threat condition is indicated as 0 in Table 7. FIG. 27 illustrates Scenario 24 where the host vehicle 10 is intending to turn right through the intersection and the remote vehicle 14 is travelling in a direction from the right of the host vehicle 10 and intending to turn left through the intersection in a direction which will not intersect the travel path of the host vehicle 10. Therefore, no threat of contact exists between the host vehicle 10 and the remote vehicle 14, and the threat condition is indicated as 0 in Table 7.

Figure 28:
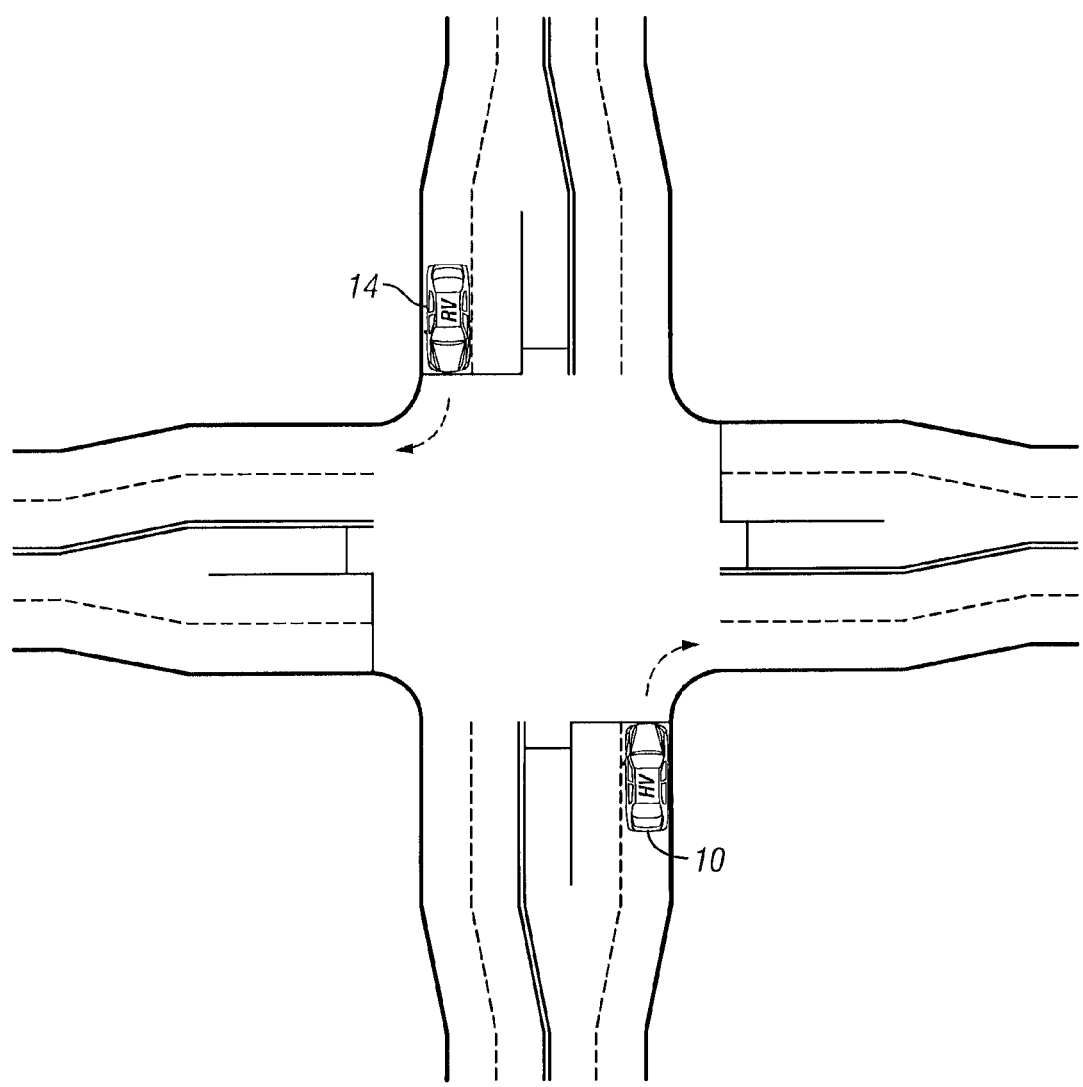
Figure 29:
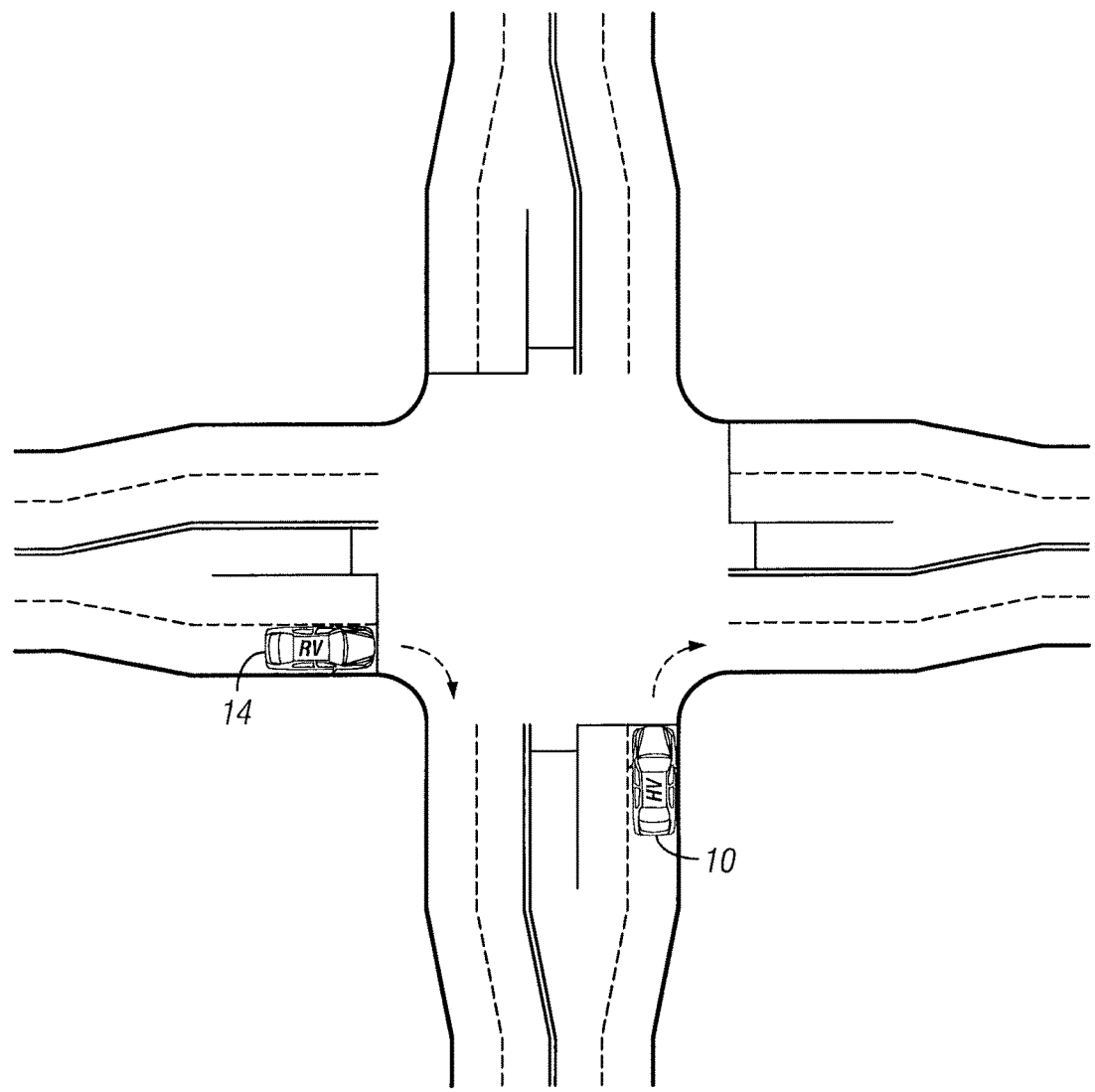
Figure 30:
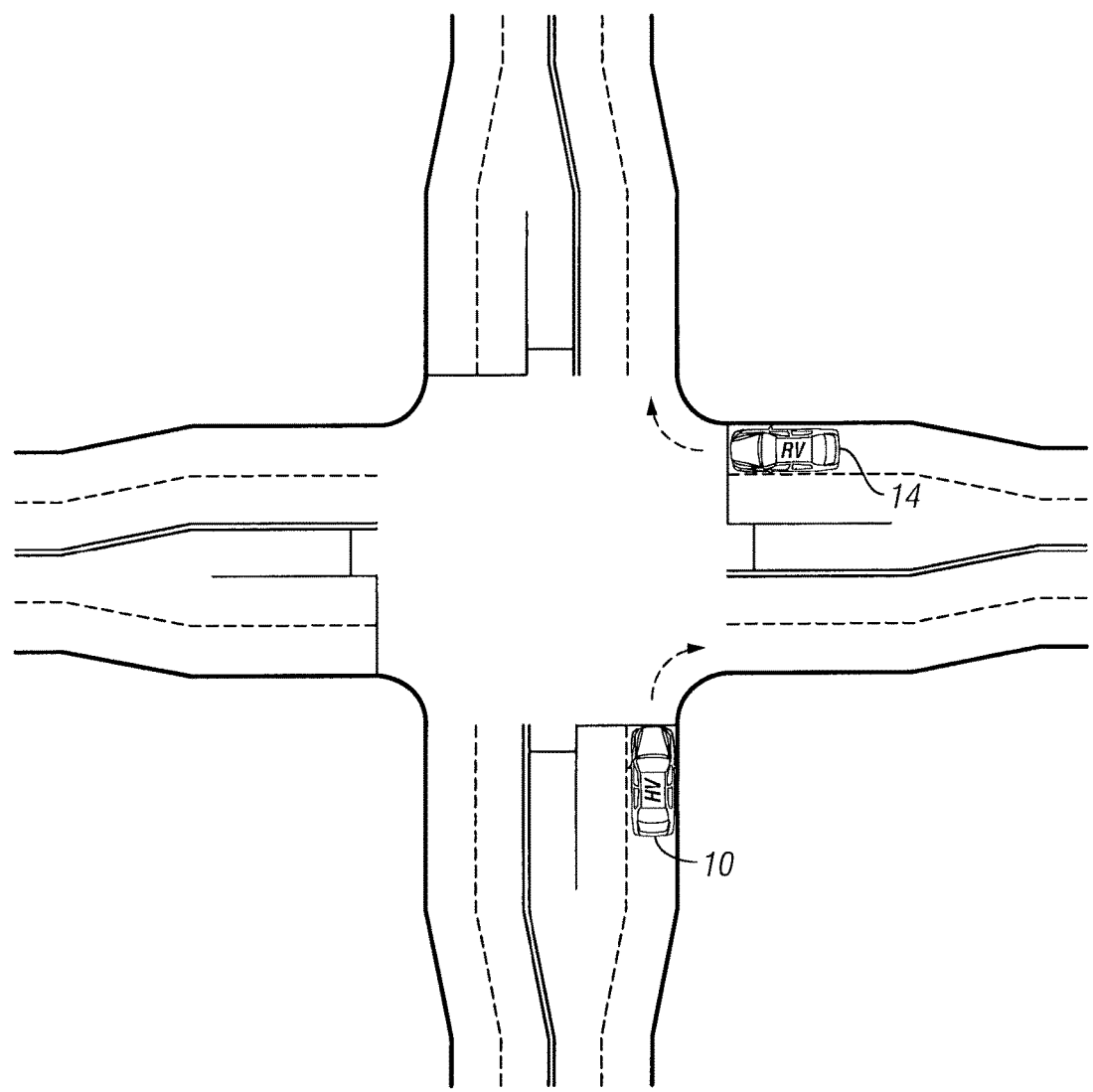

FIG. 28 illustrates Scenario 25 where the host vehicle 10 is intending to turn right through the intersection and the remote vehicle 14 is travelling in a direction opposite to the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 7. FIG. 29 illustrates Scenario 26 where the host vehicle 10 is intending to turn right through the intersection and the remote vehicle 14 is travelling in a direction from the left of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 7. FIG. 30 illustrates Scenario 27 where the host vehicle 10 is intending to turn right through the intersection and the remote vehicle 14 is travelling in a direction from the right of the host vehicle 10 and intending to turn right through the intersection in a direction which will not intersect the travel path of the host vehicle 10. Therefore, no threat of contact exists between the host vehicle 10 and the remote vehicle 14, and the threat condition is indicated as 0 in Table 7.

An example of operations performed by the intersection monitoring system 12 to identify the scenarios shown in FIGS. 4 through 30 as discussed above will now be described. These operations can be performed by the controller 22 in this example.

Figure 31:
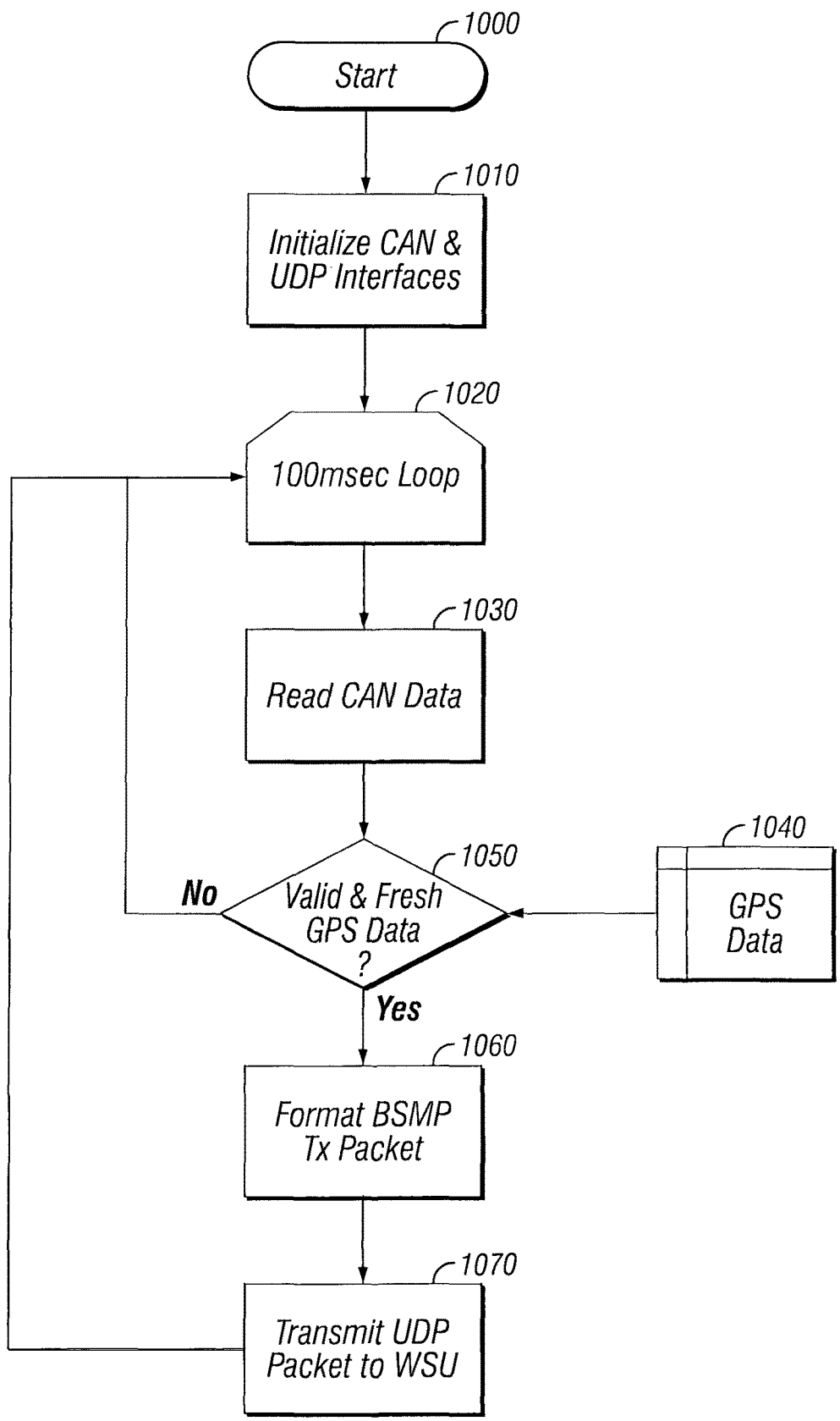
FIG. 31 is a flowchart illustrating exemplary operations that are performed by the intersection monitoring system to transmit information pertaining to the host vehicle.

The flowchart of FIG. 31 illustrates an example of a process for transmitting a BSM that can include information pertaining to a vehicle which is used to identify the scenarios as discussed above. In this example, it is assumed that the controller 22 is in the intersection monitoring system 12 included in the host vehicle 10 so that the host vehicle 10 can transmit a BSM.

When the process begins in step 1000, the controller 22 initializes the CAN and the UDP interfaces discussed above with regard to FIGS. 2 and 3 in step 1010. The process then enters a processing loop beginning in step 1020. As discussed above, the processing loop repeats, for example, every 100 msec so that the controller 22 can collect the data to assemble a packet to transmit a BSM Tx to the communication device 30 (WSU) for transmission. For example, the controller 22 reads the CAN data in step 1030, and receives GPS data in step 1040 as discussed above with regard to FIGS. 2 and 3. The controller 22 then determines in step 1050 whether the GPS data is valid and fresh, for example, the GPS data is non-zero with a fix and is less than 250 msec old. If the GPS data is not valid or fresh, the processing repeats the loop beginning at step 1020. However, if the GPS data is valid and fresh, the processing continues to step 1060 where the BSM Tx packet is formatted as a UDP packet. In step 1070, the UDP packet is then sent to the communication device 30 (WSU) for transmission.

Figure 32:
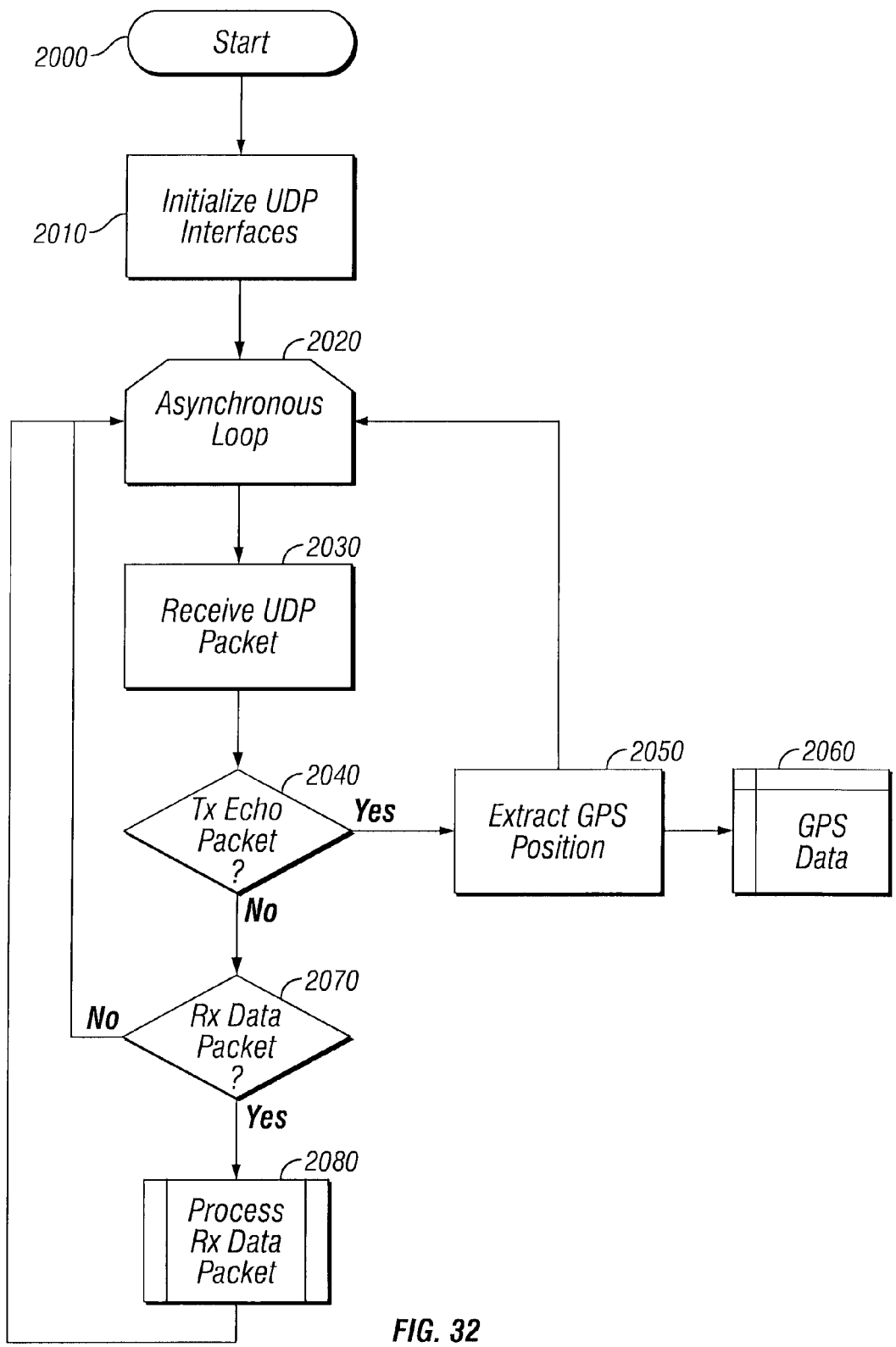
FIG. 32 is a flowchart illustrating exemplary operations that are performed by the intersection monitoring system to receive information pertaining to the remote vehicle.

The flowchart of FIG. 32 illustrates an example of a process for receiving a BSM that can include information pertaining to a vehicle which is used to identify the scenarios as discussed above. In this example, it is assumed that the controller 22 is in the intersection monitoring system 12 included in the host vehicle 10 so that the host vehicle 10 can receive a BSM.

When the process begins in step 2000, the controller 22 initializes the UDP interfaces discussed above with regard to FIGS. 2 and 3 in step 2010. The process then enters a processing loop beginning in step 2020. The controller 22 receives a BSM in the form of a UDP packet in step 2030. The controller 22 then determines in step 2040 whether the UDP packet is a BSM Tx Echo packet. If the UDP packet is a BSM Tx Echo packet, the controller 22 extracts GPS position information in step 2050 and creates GPS position data in step 2060.

However, if the UDP packet is determined to not be a BSM Tx Echo packet in step 2040, the processing continues to step 2070. In step 2070, the processing determines whether the UDP packet is a BSM Rx data packet, that is, a received BSM message. If the UDP packet is determined not to be a BSM Rx data packet in step 2070, the processing repeats beginning at step 2020. However, if the UDP packet is determined to be a BSM Rx data packet in step 2070, the processing continues to step 2080 where the controller processes the BSM Rx data packet as discussed above with regard to FIGS. 2 and 3. In particular, the controller 22 can extract the GPS and BSM information from the data packet to use that information to identify the scenario as discussed above with regard to FIGS. 4 through 30.

Figure 33:
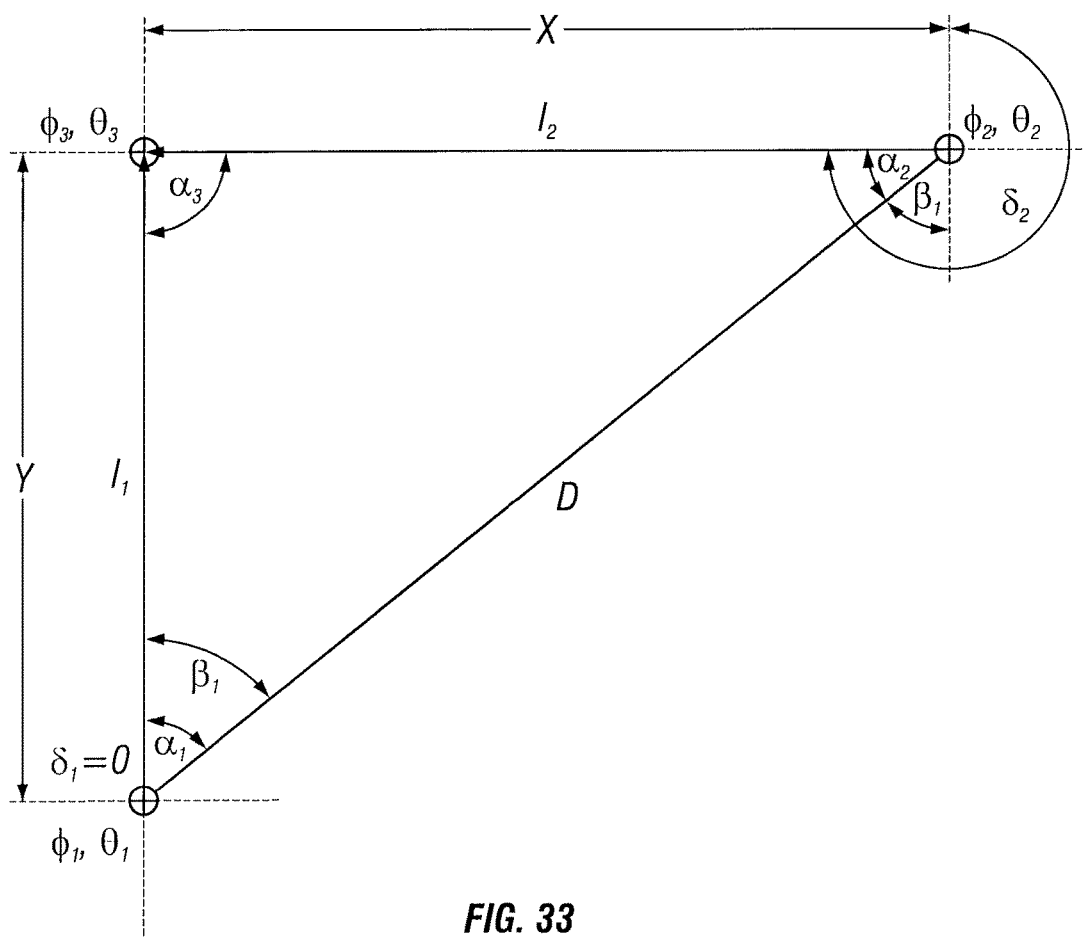
FIG. 33 is a diagram illustrating an example of the relative positions of the host vehicle and the remote vehicle with respect to each other.

FIG. 33 is a diagram illustrating the relationship between the location of the host vehicle 10 and the location of the remote vehicle 14 and the manner in which a point of contact of the host vehicle 10 and the remote vehicle 14 can be calculated based on the respective speed and heading of the host vehicle 10 and the remote vehicle 14. In this example, $\phi_1$ can represent the latitude of the host vehicle 10, $\theta_1$ represents the longitude of the host vehicle 10, $\phi_2$ can represent the latitude of the remote vehicle 14 and $\theta_2$ represents the longitude of the remote vehicle 14. All of the values for the latitude and longitude can be expressed in radians.

Also, $\delta_1$ can represent the heading of the host vehicle 10, $v_1$ can represent the speed of the host vehicle 10, $\delta_2$ can represent the heading of the remote vehicle 14, and $v_2$ can represent the speed of the remote vehicle 10. As discussed above, the heading and speed information for a vehicle, such as the host vehicle 10 and remote vehicle 14, can be obtained from the BSM that the vehicle transmits. Thus, in this example, the heading and speed of the host vehicle 10 can be obtained from the message BSM Tx transmitted by the host vehicle 10 and the heading and speed of the remote vehicle 14 can be obtained from the message BSM Rx that was transmitted by the remote vehicle 14 and received by the host vehicle 10. For heading, the convention used is as follows: 0 degrees for north, 90 degrees for east, 180 degrees for south, and 270 degrees for west. Also, $l_1$ can represent the travel path of the host vehicle 10, $l_2$ can represent the travel path of the remote vehicle 14 and D represents the relative distance between the host vehicle 10 and the remote vehicle 14. In addition, X represents the east-west distance between two points, Y represents the north-south distance between two points, $\alpha_1$ represents the angle between the travel path $l_1$ and the line representing the relative distance D, $\alpha_2$ represents the angle between the travel path $l_2$ and the line representing the relative distance D, $\alpha_3$ represents the angle between travel path $l_1$ and travel path $l_2$, and angle $\beta_1$ represents the arc cosine of Y divided by D. Furthermore, $\phi_c$ can represent the latitude at which the paths of the host vehicle 10 and the remote vehicle 14 cross, and $\theta_c$ can represent the longitude at which the paths of the host vehicle 10 and the remote vehicle 14 cross An example of the process that can be performed by the controller 22 to identify the scenario as discussed above with regard to FIGS. 4 through 30 will now be described with regard to the flowcharts in FIGS. 34 through 38. It should be noted that the information pertaining to the host vehicle 10 and the remote vehicle 14 used in this process can be obtained from the BSMs as discussed above.

Figure 34:
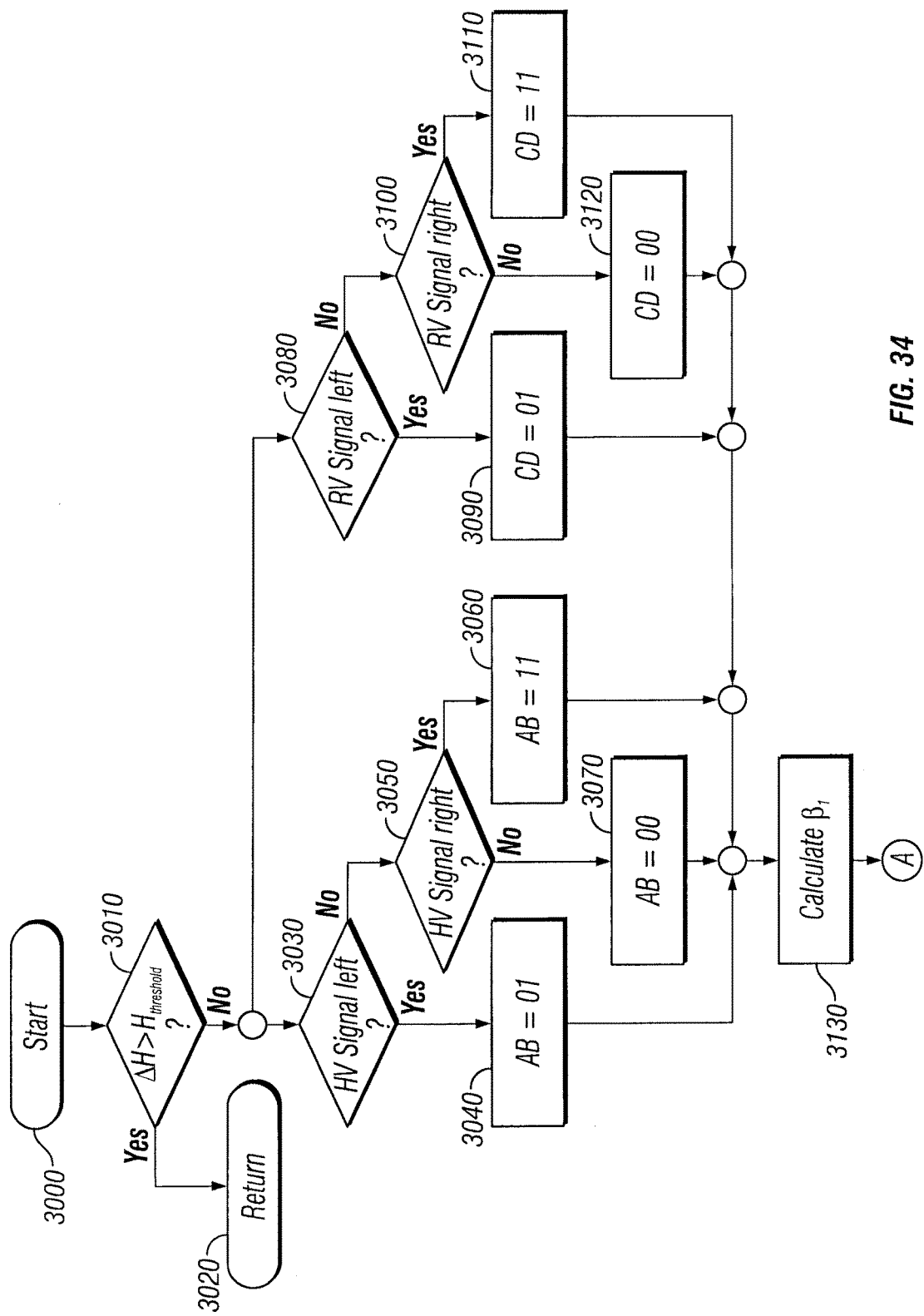
FIG. 34 is a flowchart illustrating exemplary operations for determining the intent of the host vehicle and the remote vehicle.
Figure 34:
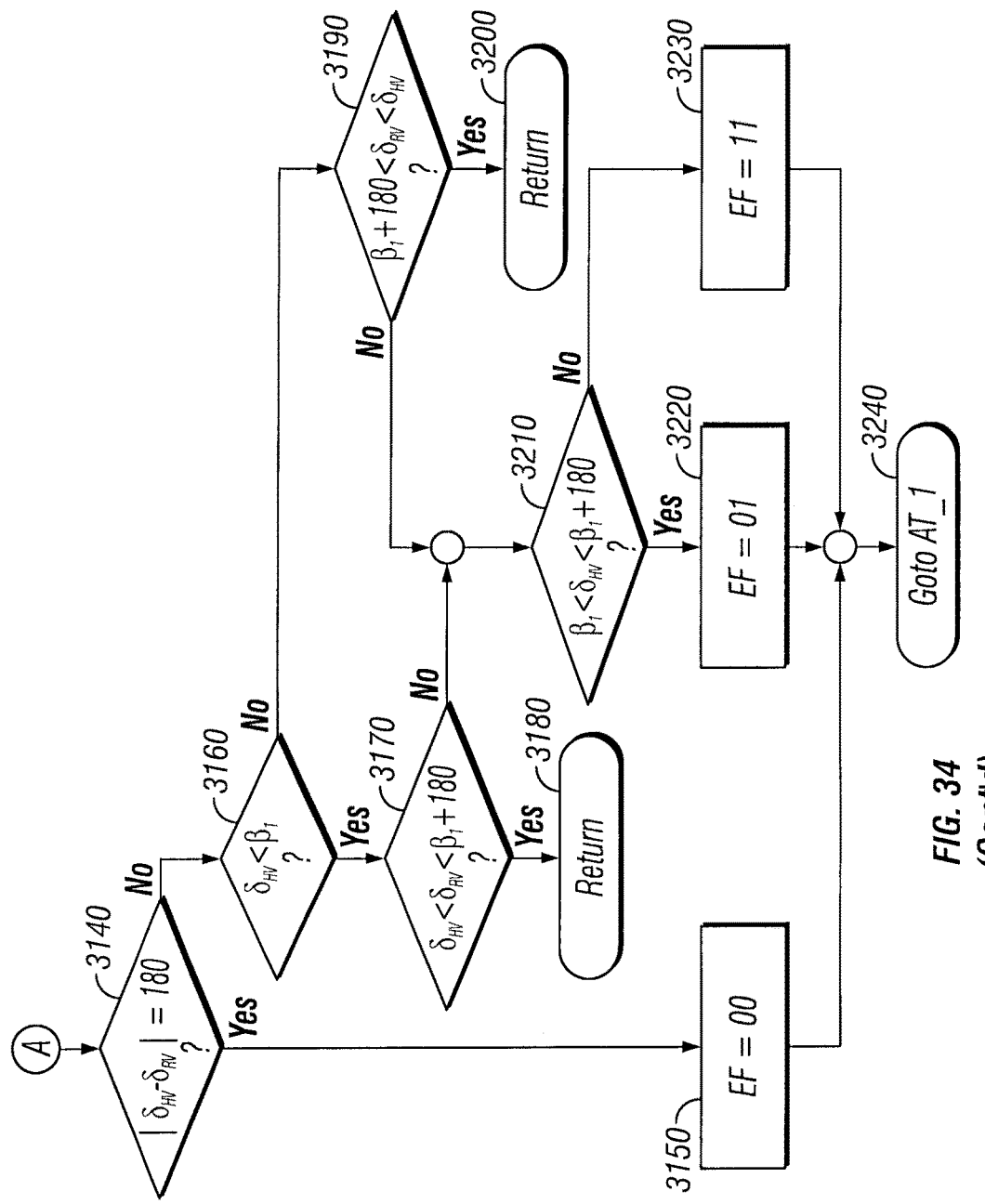

As shown in the flowchart of FIG. 34, when the process begins in step 3000, the controller 22 determines from the location information pertaining to the host vehicle 10 and the remote vehicle 14 whether a difference in elevation ΔH between the host vehicle 10 and the remote vehicle 14 is above a threshold $H_{threshold}$ in step 3010. In other words, $H_{threshold}$ represents the threshold value that determines whether the remote vehicle 14 should be considered to be a possible threat vehicle. In this example, the value of $H_{threshold}$=14 ft.±1 ft. However, the value of $H_{threshold}$ can be any suitable value. Therefore, if the processing determines in step 3010 that the host vehicle 10 and the remote vehicle 14 are at different elevations, the processing determines that the remote vehicle 14 is not a threat to the host vehicle 10 (e.g., the remote vehicle 14 will pass above the host vehicle 10 on an overpass). Hence, the processing can end in step 3020 and return to the beginning in step 3000. Accordingly, the processing refrains from performing a threat mitigation operation as discussed herein.

However, if the difference in elevation ΔH between the host vehicle 10 and the remote vehicle 14 is not above the threshold $H_{threshold}$, the processing continues to determine whether the left or right turn signals of the host vehicle 10 and the remote vehicle 14 (represented at threat vehicle TV) indicate that either of the vehicles 10 or 14 intend to turn left or right. In step 3030, the processing determines whether the left turn signal of the host vehicle 10 is activated. If the left turn signal of the host vehicle 10 is activated, the processing continues to step 3040 where the values of binary code AB discussed above with regard to the truth table in Table 4 are set to 01. However, if the left turn signal of the host vehicle 10 is not activated, the processing continues from step 3030 to step 3050.

In step 3050, the processing determines whether the right turn signal of the host vehicle 10 is activated. If the right turn signal of the host vehicle 10 is activated, the processing continues to step 3060 where the values of binary code AB are set to 11. However, if the right turn signal of the host vehicle 10 is not activated, the processing continues from step 3050 to step 3070 where the values of the binary code AB are set to 00, thus indicating that the host vehicle 10 intends to travel straight without turning.

In step 3080, the processing determines whether the left turn signal of the remote vehicle 14 is activated. If the left turn signal of the remote vehicle 14 is activated, the processing continues to step 3090 where the values of binary code CD discussed above with regard to the truth table in Table 4 are set to 01. However, if the left turn signal of the remote vehicle 14 is not activated, the processing continues from step 3080 to step 3100.

In step 3100, the processing determines whether the right turn signal of the remote vehicle 14 is activated. If the right turn signal of the remote vehicle 14 is activated, the processing continues to step 3110 where the values of binary code CD are set to 11. However, if the right turn signal of the remote vehicle 14 is not activated, the processing continues from step 3100 to step 3120 where the values of the binary code CD are set to 00, thus indicating that the remote vehicle 14 intends to travel straight without turning.

After completing the above processing to determine the values for binary codes AB and CD, the processing continues to step 3130 where the angle $\beta_1$ shown in FIG. 33 is calculated according to the following equation $$\beta_1 = \arccos\left(\frac{Y}{D}\right) = \arccos\left(\frac{(\phi_b - \phi_a)}{\sqrt{(\theta_b - \theta_a)^2 \cos^2\phi_a + (\phi_b - \phi_a)^2}}\right)$$

where $\phi_a$ equals $\phi_1$, $\phi_b$ equals $\phi_2$, $\theta_a$ equals $\theta_1$ and $\theta_b$ equals $\theta_2$ discussed above.

The processing then continues to step 3140 where the absolute value of the difference between the heading $\delta_1$ of the host vehicle 10, represented in this flowchart by $\delta_{HV}$, and the heading $\delta_2$ of the remote vehicle 14, represented in this flowchart by $\delta_{RV}$, is calculated. If the absolute value of the difference is equal to 180 degrees, the processing continues to step 3150 where the value of the binary code EF discussed above with regard to the truth table in Table 4 are set to 00. This indicates that the host vehicle 10 and the remote vehicle 14 are travelling toward each other.

However, if the processing determines in step 3140 that the absolute value of the difference is not equal to 180, the processing continues to step 3160. In step 3160, the processing determines whether the heading of the host vehicle is less than the angle $\beta_1$. If the heading of the host vehicle is less than the angle $\beta_1$, the processing determines in step 3170 whether the heading of the host vehicle 10 is less than the heading of the remote vehicle 14 which is less than the angle $\beta_1$+180. If the result of step 3170 is yes, the processing returns at step 3180 to step 3000 because the remote vehicle 14 is determined to not be a threat vehicle to the host vehicle 10.

However, if the heading of the host vehicle is not less than the angle $\beta_1$, the processing proceeds from step 3160 to step 3190 and determines whether the heading of the host vehicle 10 is greater than the heading of the remote vehicle 14 which is greater than the angle $\beta_1$+180. If the result of step 3190 is yes, the processing returns at step 3200 to step 3000 because the remote vehicle 14 is determined to not be a threat vehicle to the host vehicle 10.

However, if the result of either step 3170 or 3190 is no, the processing continues from either of those steps to step 3210. In step 3210, the processing determines whether the heading of the host vehicle 10 is between the angle $\beta_1$ and the value of angle $\beta_1+180$. If the result of step 3210 is yes, the processing continues to step 3220 and sets the value of binary codes EF to 01, indicating that the remote vehicle 14 is coming toward the host vehicle 10 from the left of the host vehicle 10. However, if the result of step 3210 is no, the processing continues to step 3230 and sets the value of binary codes EF to 11, indicating that the remote vehicle 14 is coming toward the host vehicle 10 from the right of the host vehicle 10.

Figure 35:
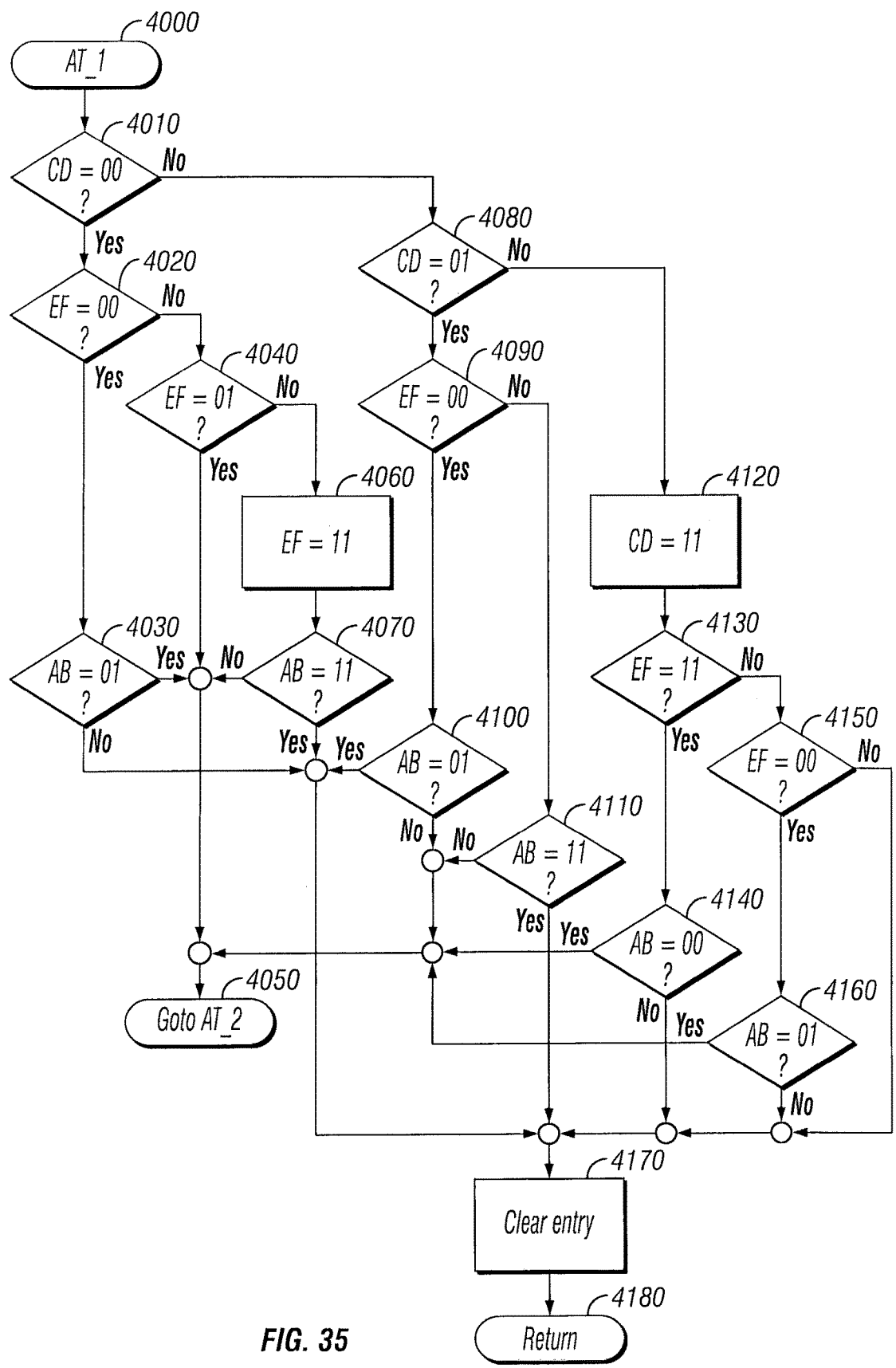
FIGS. 35 and 36 are flowcharts illustrating exemplary operations for determining an intersection scenario based on the host vehicle information and the remote vehicle information.

After completing the above processing in either of steps 3150, 3220 or 3230, the processing continues at step 3240 to the flowchart shown in FIG. 35. In the flowchart shown in FIG. 35, the processing determines the type of scenario that exists as shown in FIGS. 4 through 30 and discussed above.

Beginning in step 4000, the processing determines in step 4010 whether the binary codes CD are equal to 00. If they are, the processing determines in step 4020 whether the binary codes EF are equal to 00. If so, the processing determines in step 4030 whether the binary codes AB are equal to 01. Also, if the processing determines in step 4020 that the binary codes EF are not equal to 00, the processing determines in step 4040 whether the binary codes EF are equal to 01. If the processing determines in step 4030 that the binary codes AB are equal to 01, or the processing determines in step 4040 that the binary codes EF are equal to 01, the processing continues to step 4050 where the processing will proceed to the flowchart shown in FIG. 36 as discussed below.

However, if the processing determines in step 4040 that the binary codes EF are not equal to 01, then the processing concludes in step 4060 that the binary codes EF are equal to 11. After doing so, the processing determines in step 4070 whether the binary codes AB are equal to 11. If not, the processing proceeds to step 4050 and to the flowchart in FIG. 36.

Turning back to step 4010, if the processing determines that the binary codes CD are not equal to 00, the processing continues to step 4080 where the processing determines if the values of CD are equal to 01. If so, the processing continues to step 4090 to determine whether the binary codes EF are equal to 00. If the binary codes EF are equal to 00, the processing determines in step 4100 whether the binary codes AB are equal to 01. However, if the processing determines in step 4090 that the binary codes EF are not equal to 00, the processing determines in step 4110 whether the binary codes AB are equal to 11.

Turning back to step 4080, if the binary codes CD are not equal to 01, the processing concludes in step 4120 that the binary codes CD are equal to 11. The processing continues to step 4130 to determine whether the binary codes EF are equal to 11. If so, the processing determines in step 4140 whether the binary codes AB are equal to 00. However, if it is determined in step 4130 that the binary codes EF are not equal to 11, the processing determines in step 4150 whether the binary bodes EF are equal to 00. If so, the processing determines in step 4160 whether the binary codes AB are equal to 01.

As can be appreciated from the flowchart in FIG. 35, if step 4030 determines that the binary codes AB are not equal to 01, or step 4070 determines that binary codes AB are equal to 11, or step 4110 determines that the binary codes AB are equal to 11, or step 4140 determines that the binary codes AB are not equal to 00, or step 4150 determines that the binary codes EF are not equal to 00, or step 4160 determines that binary codes AB are not equal to 01, the processing continues to step 4170. In step 4170, the processing concludes that none of the scenarios shown in the truth table in Table 4 are met by the processing performed in the flowchart of FIG. 34. Thus, the processing returns at step 4180 to step 3000 and repeats as discussed above. In addition, if step 4030 determines that the binary codes AB are equal to 01, or step 4070 determines that binary codes AB are not equal to 11, or step 4110 determines that the binary codes AB are not equal to 11, or step 4140 determines that the binary codes AB are equal to 00, or step 4160 determines that binary codes AB are equal to 01, the processing continues to step 4050 and to the flowchart in FIG. 36.

Figure 36:
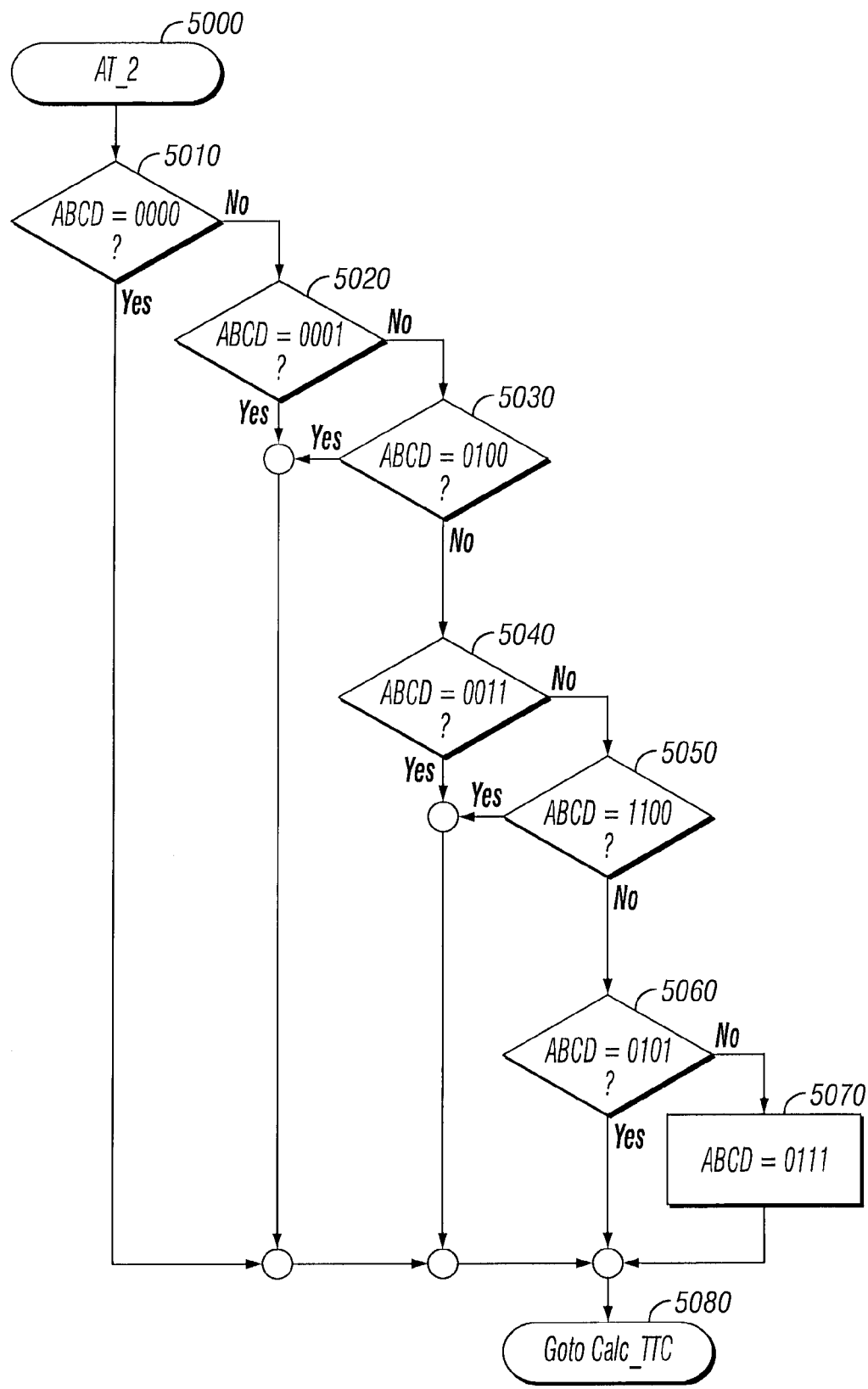

Beginning at step 5000 in the flowchart of FIG. 36, the processing determines in step 5010 whether the binary codes ABCD are equal to 0000. If not, the processing determines in step 5020 whether the binary codes ABCD are equal to 0001. If not, the processing determines in step 5030 whether the binary codes ABCD are equal to 0001. If not, the processing determines in step 5040 whether the binary codes ABCD are equal to 0011. If not, the processing determines in step 5050 whether the binary codes ABCD are equal to 1100. If not, the processing determines in step 5060 whether the binary codes ABCD are equal to 0101. If not, the processing concludes in step 5070 that the binary codes ABCD are equal to 0111. However, if any of the inquiries in steps 5010 through 5060 are yes, or after step 5070, the processing proceeds to step 5080 and continues to the flowchart shown in FIG. 37. Thus, by performing the operations in FIGS. 31, 32 and 34 through 36, the controller 22 selects an intersection scenario from a plurality of intersection scenarios based on the host vehicle information and the remote vehicle information, and monitors a location relationship between the host vehicle 10 and the remote vehicle 14 according to an algorithm that is determined based on the selected intersection scenario. As discussed above, the selecting of the intersection scenario can include determining, based on the remote vehicle intended next maneuver and the host vehicle intended next maneuver, whether the remote vehicle 14 will be moving left in relation to a path of movement of the host vehicle 10 at the intersection, right in relation to the path of movement of the host vehicle 10 at the intersection or across the path of movement of the host vehicle 10 at the intersection. As can be appreciated from the description herein, the location relationship can be a distance between the host vehicle and the remote vehicle. Naturally, the selecting of the intersection scenario includes eliminating some of the plurality of intersection scenarios based on the host vehicle information and the remote vehicle information as demonstrated above.

Figure 37:
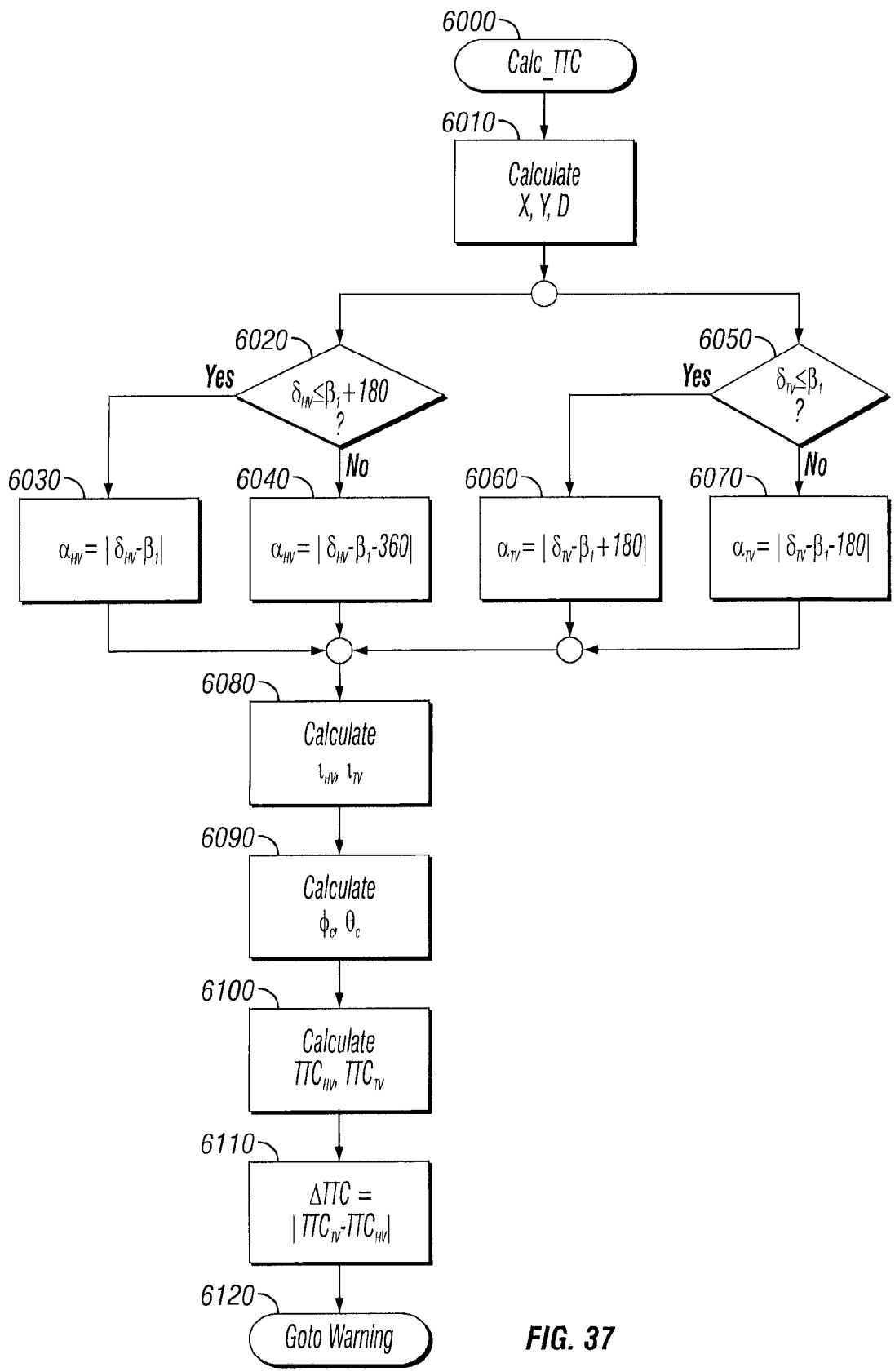
FIG. 37 is a flowchart illustrating exemplary operations for calculating a time to contact between the host vehicle and the remote vehicle.

In the flowchart in FIG. 37, the processing calculates the time to collision (TTC) beginning in step 6000. Thus, the processing determines whether to provide a warning to the host vehicle 10 by evaluating an operating condition of the host vehicle 10 while the possibility of contact exists between the host vehicle 10 and the remote vehicle 14. As will now be discussed, the process determines whether the possibility of contact between the host vehicle 10 and the remote vehicle 14 exists by determining an east-west distance X and a north-south distance Y between the host vehicle 10 and the remote vehicle 14, determining a relative distance between the host vehicle 10 and the remote vehicle 14 based on the east-west distance X and the north-south distance Y, and determining an angle heading between the host vehicle 10 and the remote vehicle 14. That is, the processing in step 6010 calculates the values for X, Y and D as shown in FIG. 33 using the following equations:

$$X = (\theta_2 - \theta_1)\rho = \frac{(\theta_2 - \theta_1)(1-f)r_e\cos\phi_1}{\sqrt{\sin^2\phi_1 + (1-f)^2\cos^2\phi_1}}$$

$$Y = (\theta_2 - \theta_1)r = \frac{(\theta_2 - \theta_1)(1-f)r_e}{\sqrt{\sin^2\phi_1 + (1-f)^2\cos^2\phi_1}}$$

$$D = (1-f)r_e\sqrt{\frac{(\theta_2 - \theta_1)^2\cos^2\phi_1 + (\phi_2 - \phi_1)^2}{\sin^2\phi_1 + (1-f)^2\cos^2\phi_1}}$$

where
$r_e$ represents the radius of the earth, which is $r_e$=6,378,137 m, $$f = \frac{1}{298.257223563},$$

$\phi_1$ can represent the latitude of the host vehicle 10,
$\theta_1$ can represent the longitude of the host vehicle 10,
$\phi_2$ can represent the latitude of the remote vehicle 14, and
$\theta_2$ can represent the longitude of the remote vehicle 14 as discussed above.

The processing then continues to step 6020 where the processing determines whether the heading of the host vehicle 10 $\delta_{HV}$ ($\delta_1$ in FIG. 33) is less than or equal to the angle $\beta_1$+180. If so, the processing continues to step 6030 and calculates the angle $\alpha_{HV}$ ($\alpha_1$ in FIG. 33) as indicated. If not, the processing continues to step 6040 and calculates the angle $\alpha_{HV}$ as indicated. In addition, after completing step 6010 as discussed above, the processing determines in step 6050 whether the heading of the remote vehicle 14 $\delta_{TV}$ ($\delta_2$ in FIG. 33) is less than or equal to the angle $\beta_1$. If so, the processing continues to step 6060 and calculates the angle $\alpha_{TV}$ (a in FIG. 33) as indicated. If not, the processing continues to step 6070 and calculates the angle $\alpha_{TV}$ as indicated.

After completing any of the steps 6030, 6040, 6060 and 6070, the processing continues to step 6080 and calculates the travel path $l_{HV}$ ($l_1$) of the host vehicle 10 and the travel path $l_{HV}$ ($l_2$) of the remote vehicle 14 according to the following equations $$l_1 = D\frac{\sin\alpha_2}{\sin\alpha_3}$$

$$l_2 = D\frac{\sin\alpha_1}{\sin\alpha_3}$$

The processing at step 6090 then calculates the latitude $\phi_c$ at which the paths of the host vehicle 10 and the remote vehicle 14 cross, and the longitude $\theta_c$ at which the paths of the host vehicle 10 and the remote vehicle 14 cross according to the following equations $$\phi_c = \frac{(l_1\cos\delta_1)\sqrt{\sin^2\phi_1 + (1-f)^2\cos^2\phi_1}}{(1-f)r_e} + \phi_1$$

-continued $$\theta_c = \frac{(l_1\sin\delta_1)\sqrt{\sin^2\phi_1 + (1-f)^2\cos^2\phi_1}}{(1-f)r_e\cos\phi_1} + \theta_1$$

where the variables are as discussed above.

Figure 38:
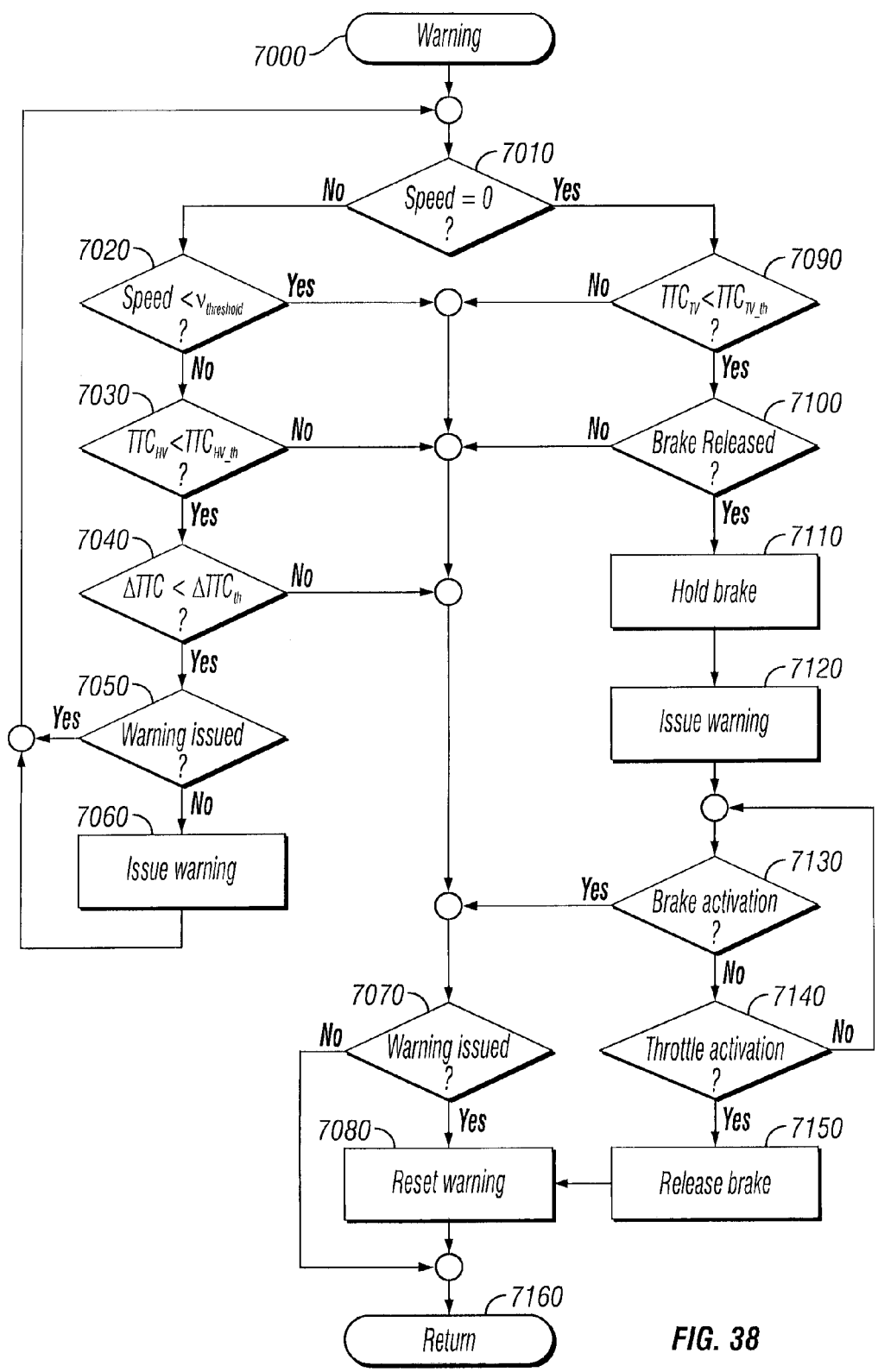
FIG. 38 is a flowchart illustrating exemplary operations for issuing a warning to the host vehicle based on the time to contact determined in FIG. 37.

The processing then continues to step 6100 and calculates the time to collision $TTC_{HV}$ ($TTC_1$) which represents the time until the host vehicle 10 reaches the collision point, and the time to collision $TTC_{TV}$ ($TTC_2$) which represents the time until the remote vehicle 14 reaches the collision point according to the following equations $$TTC_1 = \frac{l_1}{v_1}$$
$$TTC_2 = \frac{l_2}{v_2}$$

where the speed $v_1$ of the host vehicle 10 and the speed $v_2$ of the remote vehicle 14 are included in the respective BSMs transmitted by the host vehicle 10 and the remote vehicle 14. Thus, the monitoring of the location relationship discussed above can include monitoring a time until the host vehicle 10 and the remote vehicle 14 contact each other as the location relationship. In other words, the processing that determines whether the possibility of contact between the host vehicle 10 and the remote vehicle 14 exists includes determining respective times for the host vehicle 10 and the remote vehicle 14 to travel from their respective current locations to a contact location proximate the intersection. The processing then calculates an absolute value of the difference between $TTC_{HV}$ ($TTC_1$) and $TTC_{TV}$ ($TTC_2$) in step 6110, and continues in step 6120 to the process for issuing a warning message as shown in the flowchart of FIG. 38. Accordingly, as can be appreciated from the above, the processing determines whether the possibility of contact between the host vehicle 10 and the remote vehicle 14 exists by calculating a latitude and longitude of a contact location, determining a first time for the host vehicle 10 to travel a first distance from the current location of the host vehicle 10 to the contact location, determining a second time for the remote vehicle 14 to travel a second distance from the current location of the remote vehicle 14 to the contact location, and calculating a difference between the first and second times to determine whether the vehicles 10 and 14 will be at the contact location at the same time. The TTC is calculated to determine the time for warning the driver. For example, approximately 2.5 seconds may be needed to warn the driver to take action, independent of speed. As discussed above, the warning can be an audible warning, a visual warning and a tactile warning at the host vehicle 10 while the process determines that the operating condition of the host vehicle 10 can permit contact between the host vehicle 10 and the remote vehicle 14.

As will now be discussed with regard to FIG. 38, the warning process includes two branches, with one branch controlling warning when the host vehicle 10 is initially in motion and the other warning when the vehicle is initially at a stop.

For the case when the host vehicle 10 is in motion, the process first checks to see if the speed is above a threshold, $v_{threshold}$. In this example, the value of $v_{threshold}$ can be 5 mph or any other suitable speed. If the speed is not above the threshold, the process exits the loop. If the speed is above the threshold, the process determines if the time for the HV to reach the intersection of the two vehicle paths is less than a threshold, $TTC_{HV\_th}$. In this example, the value of $TTC_{HV\_th}$=2 sec.±2 sec. However, the value of $TTC_{HV\_th}$ can be any suitable value. If the time is not less than the threshold, the process exits the loop. However, if the time is less than the threshold, the process determines if the difference between the times for the host vehicle 10 and the remote vehicle 14 (threat vehicle) to reach the intersection of the two vehicle paths is less than a threshold $\Delta TTC_{th}$. In this example, the value of $\Delta TTC_{th}$=2 sec.±1 sec. However, the value of $\Delta TTC_{th}$ can be any suitable value. If the difference is not less than the threshold, the process exits the loop. If the difference is less than the threshold, the process checks the status of the warning. If the warning has not been issued, the process issues the warning then loops back to the beginning and continues to issue the warning until the threat is no longer present. Once the threat is gone, the process resets the warning and exits the loop.

For the case when the host vehicle 10 is stopped, the application first checks to see if the time for the remote vehicle 14 to reach the intersection of the two vehicle paths is less than a threshold $TTC_{TV\_th}$. In this example, the value of $TTC_{TV\_th}$=2 sec.±2 sec. However, the value of $TTC_{TV\_th}$ can be any suitable value. If the time is not less than the threshold, the process exits the loop. If the time is less than the threshold, the application checks to see if the brakes on the host vehicle are applied. If the brakes are applied, the process exits the loop. If the brakes are not applied, the process maintains brake pressure and issues a warning. The process then continuously checks to see if the brakes have been applied. If the brakes have been applied, the application resets the warning and exits the loop. Thus, the process refrains from providing the warning while the evaluating determines that the operating condition indicates that a brake of the host vehicle 10 is in an engaged condition to retain the host vehicle 10 in a stationary position. If the brakes have not been applied, the process checks to see if the throttle is active. If the throttle is not active, the process loops back to check if the brakes have been applied. However, if the throttle is active, the process releases the brakes, resets the warning and exits the loop.

Accordingly, beginning at step 7000, the process determines whether the speed of the host vehicle 10 is 0 in step 7010. If the speed is not 0, the processing determines in step 7020 if the speed of the host vehicle 10 is less than a threshold $v_{threshold}$. If the speed is not less than the threshold $v_{threshold}$, the processing determines in step 7030 whether the time to collision of the host vehicle 10 is less than a time to collision threshold for the host vehicle. If so, the processing determines in step 7040 whether the value $\Delta TTC$ calculated in step 6110 as discussed above is less than a change in the time to collision threshold. If so, the processing determines in step 7050 whether a warning has already been issued. If a warning has already been issued, the processing returns to step 7010 and repeats as discussed above. However, if a warning has not been issued, the processing issues a warning in step 7060 and repeats at step 7010.

Also, if the processing determines in step 7020 that the speed of the host vehicle 10 is not less than a threshold $v_{threshold}$, if the processing determines in step 7030 that the time to collision of the host vehicle 10 is not less than the time to collision threshold for the host vehicle, or the processing in step 7040 determines that the value calculated in step 6110 is not less than the change in the time to collision threshold, the processing continues to step 7070. In step 7070, the processing determines if the warning has been issued. If the warning has not been issued, the processing returns at step 7160 to step 3000 and repeats as discussed above. However, if the warning has been issued, the warning is reset in step 7080 and the processing returns at step 7160 to step 3000 and repeats as discussed above.

Returning to step 7010, if the speed of the host vehicle 10 is determined to be 0, the processing determines in step 7090 whether the time to collision of the remote vehicle 14 is less than a time to collision threshold for the remote vehicle. If so, the processing determines in step 7100 if the brake of the host vehicle 10 has been released. If so, the processing holds the brake in step 7110 and issues a warning in step 7120. This brake hold is characterized as a haptic warning since the driver can override the brake by applying the accelerator, and is not considered active control since it occurs under specific conditions. Thus, the process provides the warning while the evaluating determines that the operating condition indicates that a brake of the host vehicle 10 is in a disengaged condition to enable the host vehicle 10 to move from a stationary position and the possibility of contact exists. In this instance, the warning includes operating the brake to change from the disengaged condition to an engaged condition to retain the host vehicle 10 in a stationary position.

The processing then determines in step 7130 if the brake of the host vehicle 10 has been activated. If the brake has not been activated, the processing determines in step 7140 whether the throttle of the host vehicle 10 has been activated. If the throttle has not been activated, the processing returns to step 7130 and again checks whether the brake has been activated. However, if the throttle has been activated, the processing releases the brake in step 7150 and resets the warning in step 7080. The processing continues to step 7160 and returns to step 3000 as discussed above. In addition, if the processing determines in step 7090 that the time to collision of the remote vehicle 14 is not less than the time to collision threshold for the remote vehicle, or the processing determines in step 7100 that the brake of the host vehicle 10 has not been released, the processing continues to step 7070 and repeats as discussed above.

As can be appreciated from the flowchart in FIG. 38, a determination is made whether to provide a warning for each of the scenarios shown in FIGS. 4 through 30 that may lead to contact between the host vehicle 10 and the remote vehicle 14. For instance, if the brakes of the host vehicle 10 are held and the host vehicle 10 is stopped, no warning needs to be given. However, if the brakes of the host vehicle 10 are released, the host vehicle 10 is stopped, and a remote vehicle 14 (threat vehicle) is approaching, the controller 22 can hold the brakes in a braking state and issue a warning. Also, if the speed of the host vehicle is below threshold where the threat will pass, no warning needs to be issued. Thus, the process refrains from providing the warning while the evaluating determines that the operating condition indicates that a speed of the host vehicle 10 will permit the remote vehicle 14 to pass through the intersection without contacting the host vehicle 10. Furthermore, if the speed of the host vehicle 10 is above a threshold where collision is likely, a warning is issued. Thus, the process provides the warning while the evaluating determines that the operating condition indicates that a speed of the host vehicle 10 can permit the remote vehicle 14 to contact the host vehicle 10. As can also be appreciated from the above, the process performs a threat mitigation operation while a difference between the host vehicle travel time and the remote vehicle travel time is less than a threshold time value. As discussed above, the process can perform a threat mitigation operation by altering a trajectory of the host vehicle 10. The altering of the trajectory of the host vehicle 10 can be performed by operating a steering wheel to change a steering direction of the host vehicle 10, operating a brake, accelerator or both to change the speed of the host vehicle, or in any other suitable manner. The other vehicle components 38 can also include one or more safety devices such as a safety belt, an airbag system, and a horn. Thus, the controller 22 can perform a threat mitigation operation by pretensioning a safety belt, deploying an airbag, operating a horn in the host vehicle, or any of these functions.

The following Tables 8 through 16 summarize the different types of warning conditions that may arise depending on the type of scenario as shown in FIGS. 4 through 30 depending on the state of the host vehicle (HV) 10 and the remote vehicle 14 (threat vehicle TV).

TABLE 8

Initial conditions for Straight Crossing Path Scenarios

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is travelling in an opposite direction to the host vehicle 10 and making a left turn across the path of the host vehicle 10, there are a total of 16 possible combinations with three that could produce a warning in the HV.

TABLE 9

HV Travelling Straight and TV in Opposite Direction Turning Left

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is travelling in a lateral direction to the host vehicle 10 and making a left turn across the path of the host vehicle 10, there are a total of 16 possible combinations with three that could produce a warning in the HV.

TABLE 10

HV Travelling Straight and TV in Lateral Direction Turning Left

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |

TABLE 10-continued

HV Travelling Straight and TV in Lateral Direction Turning Left

| HV | TV | HV Response |
|---|---|---|
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is approaching the intersection from a cross street and making a left turn into the path of the host vehicle 10, there are a total of 16 possible combinations with three that could produce a warning in the HV.

TABLE 11

HV Travelling Straight and TV Turning Left from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is travelling straight and the remote vehicle 14 is approaching the intersection from a cross street and making a right turn into the path of the host vehicle 10, there are a total of 16 possible combinations with three that could produce a warning in the HV.

TABLE 12

HV Travelling Straight and TV Turning Right from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is turning left and the remote vehicle 14 is travelling straight in an opposite direction of the host vehicle 10, there are a total of 16 possible combinations with three that could produce a warning in the HV.

TABLE 13

HV Turning Left and TV Travelling Straight

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is turning left and the remote vehicle 14 is travelling straight from a cross street, there are a total of 16 possible combinations with three that could produce a warning in the HV.

TABLE 14

HV Turning Left and TV Travelling Straight from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is turning left and the remote vehicle 14 is travelling straight from a cross street so that the host vehicle 10 is turning into the path of the remote vehicle 14, there are a total of 16 possible combinations with three that could produce a warning in the HV.

TABLE 15

HV Turning Left and TV Travelling Straight from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |

TABLE 15-continued

HV Turning Left and TV Travelling Straight from Cross Street

| HV | TV | HV Response |
|---|---|---|
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

For the scenarios when the host vehicle 10 is turning right and the remote vehicle 14 is travelling straight from a cross street so that the host vehicle 10 is turning into the path of the remote vehicle 14, there are a total of 16 possible combinations with three that could produce a warning in the HV.

TABLE 16

HV Turning Right and TV Travelling Straight from Cross Street

| HV | TV | HV Response |
|---|---|---|
| Stopped with brakes applied | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Stopped with brakes released | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | Hold brakes, issue warning |
| Creeping forward ($0 < v_{HV} < v_{threshold}$) | Stopped with brakes applied | No warning |
| | Stopped with brakes released | No warning |
| | Creeping forward ($0 < v_{TV} < v_{threshold}$) | No warning |
| | Approaching at speed ($v_{TV} > v_{threshold}$) | No warning |
| Approaching at speed ($v_{HV} > v_{threshold}$) | Stopped with brakes applied | No warning |
| | Stopped with brakes released | No warning |
| | Creeping forward ($0 < v_{TV} < v_{threshold}$) | Issue warning |
| | Approaching at speed ($v_{TV} > v_{threshold}$) | Issue warning |

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle intersection monitoring method comprising:
   generating host vehicle information with a navigation unit, the host vehicle information comprising a host vehicle location, a host vehicle trajectory including a host vehicle heading and a host vehicle velocity, and host vehicle component information including a host vehicle brake status;
   receiving remote vehicle information with a receiver, the remote vehicle information comprising a remote vehicle location, a remote vehicle trajectory including a remote vehicle heading and a remote vehicle velocity, and remote vehicle component information including a remote vehicle brake status;

determining with a controller an expected host vehicle travel path based on the host vehicle information, an expected remote vehicle travel path based on the remote vehicle information, and an expected intersection location based on the expected host vehicle travel path and the expected remote vehicle travel path;

selecting with the controller an intersection scenario, from a plurality of intersection scenarios stored in a storage unit, based on the expected host vehicle travel path and the expected remote vehicle travel path;

determining with the controller a host vehicle intent to approach the expected intersection location based on the host vehicle trajectory and the host vehicle brake status;

determining with the controller a remote vehicle intent to approach the expected intersection location based on the remote vehicle trajectory and the remote vehicle brake status; and selecting with the controller a host vehicle response corresponding to the intersection scenario, the determined host vehicle intent, and the determined remote vehicle intent, the host vehicle response including performing an intervening threat mitigation operation or refraining from performing an operation.

2. The vehicle intersection monitoring method according to claim 1, wherein
the selecting the host vehicle response further includes warning issued by the host vehicle.

3. The vehicle intersection monitoring method according to claim 2, wherein
the host vehicle information includes a host vehicle elevation, the remote vehicle information includes a remote vehicle elevation, and the determining the expected intersection location includes determining whether the host vehicle elevation and the remote vehicle elevation are substantially the same; and
the selecting the host vehicle response includes selecting at least one of issuing the warning and the performing the intervening threat mitigation operation when the host vehicle elevation and the remote vehicle elevation are substantially the same, and includes refraining from performing the operation when the host vehicle elevation and the remote vehicle elevation are not substantially the same.

4. The vehicle intersection monitoring method according to claim 1, wherein
the selecting of the intersection scenario includes determining whether the expected remote vehicle travel path includes turning left, turning right, or travelling straight, and the determining whether the expected host vehicle travel path includes turning left, turning right, or travelling straight.

5. A vehicle intersection monitoring system comprising:
a navigation device configured to generate host vehicle information comprising a host vehicle location, a host vehicle trajectory including a host vehicle heading and a host vehicle velocity, and host vehicle component information including a host vehicle brake status;
a receiver configured to receive remote vehicle information comprising a remote vehicle location, a remote vehicle trajectory including a remote vehicle heading and a remote vehicle velocity, and remote vehicle component information including a remote vehicle brake status;
a storage unit configured to store a plurality of intersection scenarios; and
a controller configured to determine an expected host vehicle travel path based on the host vehicle information, determine an expected remote vehicle travel path based on the remote vehicle information, determine an expected intersection location based on the expected host vehicle travel path and the expected remote vehicle travel path, select an intersection scenario from the plurality of intersection scenarios based on the expected host vehicle travel path and the expected remote vehicle travel path, determine a host vehicle intent to approach the expected intersection location based on the host vehicle trajectory and the host vehicle brake status, determine a remote vehicle intent to approach the expected intersection location based on the remote vehicle trajectory and the remote vehicle brake status, and select a host vehicle response corresponding to the intersection scenario, the determined host vehicle intent, and the determined remote vehicle intent, the host vehicle response including one of performing an intervening threat mitigation operation and refraining from performing an operation.

6. The vehicle intersection monitoring system according to claim 5, wherein
the controller is configured to select a warning issued by the host vehicle.

7. The vehicle intersection monitoring system according to claim 5, wherein the controller is configured to select the intersection scenario by determining whether the expected remote vehicle travel path includes turning left, turning right or travelling straight, and determining whether the expected host vehicle travel path includes turning left, turning right, or travelling straight.

8. The vehicle intersection monitoring method according to claim 1, wherein
the determining the host vehicle intent indicates an intent to approach the expected intersection location when the controller determines one of the following:
the host vehicle velocity is greater than a threshold velocity, and
the host vehicle velocity indicates a stopped state and the brake status indicates a brake released state.

9. The vehicle intersection monitoring method according to claim 1, wherein
the determining the host vehicle intent indicates a lack of intent to approach the expected intersection location when the controller determines one of the following:
the host vehicle velocity indicates a moving state having a velocity less than a threshold velocity, and
the host vehicle velocity indicates a stopped state, and the brake status indicates a brake applied state.

10. The vehicle intersection monitoring method according to claim 1, wherein
the determining the remote vehicle intent indicates an intent to approach the expected intersection location when the controller determines one of the following:
the remote vehicle velocity is greater than a threshold velocity, and
the remote vehicle velocity indicates a stopped state and the brake status indicates a brake released state.

11. The vehicle intersection monitoring method according to claim 1, wherein
the determining the remote vehicle intent indicates lack of intent to approach the expected intersection location when the controller determines one of the following:

the remote vehicle velocity indicates a moving state having a velocity less than a threshold velocity, and
the remote vehicle velocity indicates a stopped state, and the brake status indicates a brake applied state.

12. The vehicle intersection monitoring method according to claim 1, further comprising
continually monitoring with the controller a location relationship between the host vehicle location and the remote vehicle location to determine whether potential to contact exists, and
the selecting the host vehicle response includes the performing the intervening threat mitigation operation when the potential to contact is determined to exist, and includes refraining from performing the operation when the potential to contact is determined not to exist.

13. The vehicle intersection monitoring method according to claim 1, wherein
the selecting the host vehicle response includes the performing the intervening threat mitigation operation when the host vehicle location is within a predetermined distance from the expected intersection location, and includes refraining from performing an operation when the host vehicle location is greater than the predetermined distance from the expected intersection location.

14. The vehicle intersection monitoring method according to claim 13, wherein
the selecting the host vehicle response includes the performing the intervening threat mitigation operation when the remote vehicle location is within a second predetermined distance from the expected intersection location, and includes refraining from performing an operation when the remote vehicle location is greater than the second predetermined distance from the expected intersection location.

15. The vehicle intersection monitoring system according to claim 6, wherein
the navigation device is configured to generate the host vehicle information so as to include a host vehicle elevation, and the receiver is configured to receive the remote vehicle information including a remote vehicle elevation, and
the controller is configured to determine the expected intersection location by determining whether the host vehicle elevation and the remote vehicle elevation are substantially the same, and to select at least one of issuing the warning and the performing the intervening threat mitigation operation when the host vehicle elevation and the remote vehicle elevation are substantially the same, and to refrain from performing the operation when the host vehicle elevation and the remote vehicle elevation are not substantially the same.

16. The vehicle intersection monitoring system according to claim 5, wherein
the controller is configured to determine that the host vehicle intends to approach the expected intersection location when the controller determines one of the following:
the host vehicle velocity is greater than a threshold velocity, and
the host vehicle velocity indicates a stopped state and the brake status indicates a brake released state.

17. The vehicle intersection monitoring system according to claim 5, wherein the controller is configured to determine that the host vehicle lacks intent to approach the expected intersection location when the controller determines one of the following:
the host vehicle velocity indicates a moving state having a velocity less than a threshold velocity, and
the host vehicle velocity indicates a stopped state, and the brake status indicates a brake applied state.

18. The vehicle intersection monitoring system according to claim 5, wherein
the controller is configured to determine the remote vehicle intends to approach the expected intersection location when the controller determines one of the following:
the remote vehicle velocity is greater than a threshold velocity, and
the remote vehicle velocity indicates a stopped state and the brake status indicates a brake released state.

19. The vehicle intersection monitoring system according to claim 5, wherein
the controller is configured to determine that the remote vehicle lacks intent to approach to approach the expected intersection location when the controller determines one of the following:
the remote vehicle velocity indicates a moving state having a velocity less than a threshold velocity, and
the remote vehicle velocity indicates a stopped state, and the brake status indicates a brake applied state.

20. The vehicle intersection monitoring system according to claim 5, wherein
the controller is configured to continually monitor a location relationship between the host vehicle location and the remote vehicle location and determine whether potential to contact exists, and
configured to select the performing the intervening threat mitigation operation when the potential to contact is determined to exist, and includes refraining from performing the operation when the potential to contact is determined not to exist.

21. The vehicle intersection monitoring system according to claim 5, wherein
the controller is configured to select the performing the intervening threat mitigation operation when the host vehicle location is within a predetermined distance from the expected intersection location, and to refrain from performing an operation when the host vehicle location is greater than the predetermined distance from the expected intersection location.

22. The vehicle intersection monitoring system according to claim 21, wherein
the controller is configured to select the performing the intervening threat mitigation operation when the remote vehicle location is within a second predetermined distance from the expected intersection location, and to refrain from performing an operation when the remote vehicle location is greater than the second predetermined distance from the expected intersection location.

23. The vehicle intersection monitoring method according to claim 2, further comprising
continually monitoring with the controller a location relationship between the host vehicle location and the remote vehicle location to determine whether potential to contact exists, and
the selecting the host vehicle response includes issuing the warning and the performing the intervening threat mitigation operation when the potential to contact is determined to exist, and includes refraining from the issuing the warning and the performing the intervening threat mitigation operation when host vehicle brakes are applied.

24. The vehicle intersection monitoring system according to claim 6, wherein the controller is configured to continually monitor a location relationship between the host vehicle location and the remote vehicle location and determine whether potential to contact exists, and configured to select issuing the warning and the performing the intervening threat mitigation operation when the potential to contact is determined to exist, and being configured to refrain from performing the issuing the warning and the performing the intervening threat mitigation operation when host vehicle brakes are applied.

\* \* \* \* \*